US012811407B2

(12) United States Patent
McCartney et al.

(10) Patent No.: US 12,811,407 B2
(45) Date of Patent: Nov. 24, 2026

(54) MOBILE SOLAR AND STORAGE POWER GENERATION SYSTEM AND METHOD

(71) Applicant: AES Clean Energy Services, LLC, Salt Lake City, UT (US)

(72) Inventors: Shauna McCartney, Louisville, CO (US); Ryan Conlan, New York, NY (US); Christopher Boyer, Louisville, CO (US); Joseph Uddo, Alexandria, VA (US)

(73) Assignee: AES Clean Energy Services, LLC, Salt Lake City, UT (US)

(*) Notice: Subject to any disclaimer, the term of this patent is extended or adjusted under 35 U.S.C. 154(b) by 62 days.

(21) Appl. No.: 18/373,091

(22) Filed: Sep. 26, 2023

(65) Prior Publication Data

US 2024/0106243 A1 Mar. 28, 2024

Related U.S. Application Data

(60) Provisional application No. 63/410,195, filed on Sep. 26, 2022.

(51) Int. Cl.
*H02J 3/38* (2026.01)
*B65D 85/48* (2006.01)
(Continued)

(52) U.S. Cl.
CPC .............. *H02J 3/381* (2013.01); *B65D 85/48* (2013.01); *B65D 85/62* (2013.01); *B65D 88/121* (2013.01);
(Continued)

(58) Field of Classification Search
CPC ........... H02J 7/00; H01M 10/46; H01M 10/42
(Continued)

(56) References Cited

U.S. PATENT DOCUMENTS 8,315,745 B2 11/2012 Creed
9,331,497 B2 * 5/2016 Beaston .................... H02J 7/00
(Continued)

FOREIGN PATENT DOCUMENTS

CN 102742029 B 11/2015
CN 107645270 B 11/2019
(Continued)

OTHER PUBLICATIONS

Youtube: Solar Container—mobile solar plant—Nov. 17, 2014 (pp. 1-4); https://www.youtube.com/watch?v=sV5DWET3p8Y.
(Continued)

*Primary Examiner* — Rexford N Barnie
*Assistant Examiner* — Joshua James Sweet
(74) *Attorney, Agent, or Firm* — Lempia Summerfield Katz LLC

(57) ABSTRACT

A method and system for a mobile power generation system is disclosed. The mobile power generation system may comprise one or more shipping containers, which may be pre-wired and pre-configured so that configuration and deployment at the deployment site is simplified. The one or more shipping containers may include a PV subsystem, a battery subsystem, PCS, control electronics, and the like. The one or more shipping containers may be pre-configured for power transfer and for communication between the various devices so that less configuration is necessary at the deployment site.

24 Claims, 28 Drawing Sheets

(51) Int. Cl.

| | |
|---|---|
| ***B65D 85/62*** | (2006.01) |
| ***B65D 88/12*** | (2006.01) |
| ***B65D 90/00*** | (2006.01) |
| ***B65D 90/22*** | (2006.01) |
| ***H02J 101/24*** | (2026.01) |
| ***H02S 10/20*** | (2014.01) |
| ***H02S 30/20*** | (2014.01) |

(52) U.S. Cl.
CPC ......... *B65D 90/0073* (2013.01); *B65D 90/22* (2013.01); *H02S 10/20* (2014.12); *H02S 30/20* (2014.12); *H02J 2101/24* (2026.01)

(58) Field of Classification Search
USPC ...................................................... 307/43–87
See application file for complete search history.

(56) References Cited

U.S. PATENT DOCUMENTS

| | | | | |
|---|---|---|---|---|
| 9,866,167 | B2 | 1/2018 | Chambe | |
| 10,110,012 | B2 | 10/2018 | Li et al. | |
| 2010/0078942 | A1 | 4/2010 | Bois | |
| 2011/0084556 | A1 * | 4/2011 | Marroquin ............ | H10F 77/955 307/82 |
| 2011/0253614 | A1 | 10/2011 | Curran et al. | |
| 2011/0273302 | A1 * | 11/2011 | Fornage ................. | G01R 31/50 340/635 |
| 2012/0293111 | A1 | 11/2012 | Sentinelli et al. | |
| 2014/0097797 | A1 * | 4/2014 | Hendrix ............ | H01M 10/4207 320/118 |
| 2016/0141894 | A1 * | 5/2016 | Beaston .................. | H02J 7/342 320/103 |
| 2017/0047770 | A1 | 2/2017 | Imperial | |
| 2017/0222475 | A1 | 8/2017 | Van Straten | |
| 2018/0106509 | A1 | 4/2018 | Hollingsworth et al. | |
| 2019/0006984 | A1 * | 1/2019 | Albertella ............... | H02S 20/30 |
| 2021/0104851 | A1 * | 4/2021 | Bhat ....................... | B60L 55/00 |
| 2022/0018114 | A1 | 1/2022 | Akagawa et al. | |
| 2022/0069762 | A1 * | 3/2022 | Rogers .................... | H02S 10/40 |
| 2023/0105424 | A1 * | 4/2023 | Novak .................... | B60L 53/30 307/26 |

FOREIGN PATENT DOCUMENTS

| | | | | |
|---|---|---|---|---|
| CN | 110633948 | A | 12/2019 | |
| CN | 111509845 | A | 8/2020 | |
| CN | 111654055 | A | 9/2020 | |
| CN | 112532167 | A | 3/2021 | |
| CN | 113890088 | A | 1/2022 | |
| KR | 20200022631 | A | 3/2020 | |
| RU | 2647984 | C2 | 3/2018 | |
| TW | I602374 | B | 10/2017 | |
| WO | WO-2020058873 | A1 * | 3/2020 | ........... B65D 88/121 |

OTHER PUBLICATIONS

"Go Electric Expeditionary Microgrid for Forward Operating Bases"—Oct. 2019 (pp. 1-2).

Power-moveit "Mobile Solar Container"—2022 (pp. 1-19) https://www.power-moveit.tech/mobile-solar-container/.

Mobisun Mobile Off-Grid Mobile Power & Storage "Mobile Solar Generator Solutions" (believed published at least by Aug. 11, 2022) From: https://mobismart.ca/mobisun-mobile-solar-generators/.

Briggs & Stratton "Pure Power Solutions Completes Containerized Solar Microgrid with SimpliPhi Power Energy Storage for Off-Grid Ranch"—Nov. 15, 2016 (pp. 1-6) https://simpliphipower.com/company/news/press-releases/pure-power-solutions-completes-containerized-solar-microgrid-simpliphi-power-energy-storage-off-grid-ranch/.

Youtube: Solar Mobile Storage Container—Jun. 16, 2016 https://www.youtube.com/watch?v=HDcZjsvsOvk.

OkSolar.com Solar Trailer Renewable Energy Solutions (believed published at least by Jul. 27, 2022) https://www.oksolar.com/lion/item/000777000/solar-trailer.

AkuoEnergy "Product Solutions" Sep. 19, 2022 (pp. 1-5) www.akuoenergy.com_en_products-solutions.

International Search Report and Written Opinion for International Application PCT/US2023/033736 mailed on Feb. 26, 2024.

* cited by examiner

MOBILE SOLAR AND STORAGE POWER GENERATION SYSTEM AND METHOD

REFERENCE TO RELATED APPLICATION

The present application claims priority to U.S. Provisional Application No. 63/410,195, which is incorporated by reference herein in its entirety.

FIELD OF THE INVENTION

The present application relates generally to the field of a solar and storage system. Specifically, the disclosure relates to a mobile solar and storage power generation system and method.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Oftentimes, there is a need for electric power in a variety of contexts. In one example, there may be a need for electric power where the electric grid is available, such as in the context where additional electric power may be required or where the electric grid is unable to supply electric power. In another example, electric power where no electric grid is present or available, such as for remote temporary operations, emergency response, exploration, remote villages, remote communications stations, and remote mining operations, to name a few. One solution is to use generators, such as diesel generators, which can be configured in remote areas. With such generators, power may be provided to remote locations. Another solution is to deploy solar panel and battery systems to provide the requested power.

SUMMARY OF THE INVENTION

In one or some embodiments, a mobile power generation system is disclosed. The mobile power generation system includes one or more shipping containers configured for any one, any combination, or all of housing, transportation, and deployment of a renewable hybrid energy system. The one or more shipping containers includes one or both of: at least one photovoltaic (PV) subsystem for shipping within the one or more shipping containers and deployment at the deployment site; or at least one battery subsystem for shipping within the one or more shipping containers and storage at the deployment site within the one or more shipping containers; mechanical structure for shipping of the one or both of the at least one PV subsystem or the at least one battery subsystem within the one or more shipping containers; at least one power conversion system (PCS) for shipping within the one or more shipping containers and storage at the deployment site within the one or more shipping containers; mechanical structure for shipping of the at least one PCS within the one or more shipping containers; and at least one load output connector integrated in or positioned on at least one side of the one or more shipping containers, the at least one load output connector being electrically wired to the at least one PCS prior to shipment of the one or more shipping containers to the deployment site and configured to transmit AC power to a load electrically connected to the at least one output connector.

In one or some embodiments, a method of transporting, deploying and configuring a mobile power generation system is disclosed. The method includes: transporting one or more shipping containers to a deployment site; The one or more shipping containers includes: one or both of: at least one photovoltaic (PV) subsystem for shipping within the one or more shipping containers and deployment at the deployment site; or at least one battery subsystem for shipping within the one or more shipping containers and storage at the deployment site within the one or more shipping containers; mechanical structure for shipping of the one or both of the at least one PV subsystem or the at least one battery subsystem within the one or more shipping containers; at least one power conversion system (PCS) for shipping within the one or more shipping containers and storage at the deployment site within the one or more shipping containers; mechanical structure for shipping of the at least one PCS within the one or more shipping containers; and at least one load output connector integrated in or positioned on at least one side of the one or more shipping containers, the at least one load output connector being electrically wired to the at least one PCS prior to shipment of the one or more shipping containers to the deployment site and configured to transmit AC power to a load electrically connected to the at least one output connector.

The method further includes: removing the at least one PV subsystem from the one or more shipping containers; deploying the at least one PV subsystem; and electrically connecting a load to the at least one load output connector.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION OF THE INVENTION

Figure 1A:
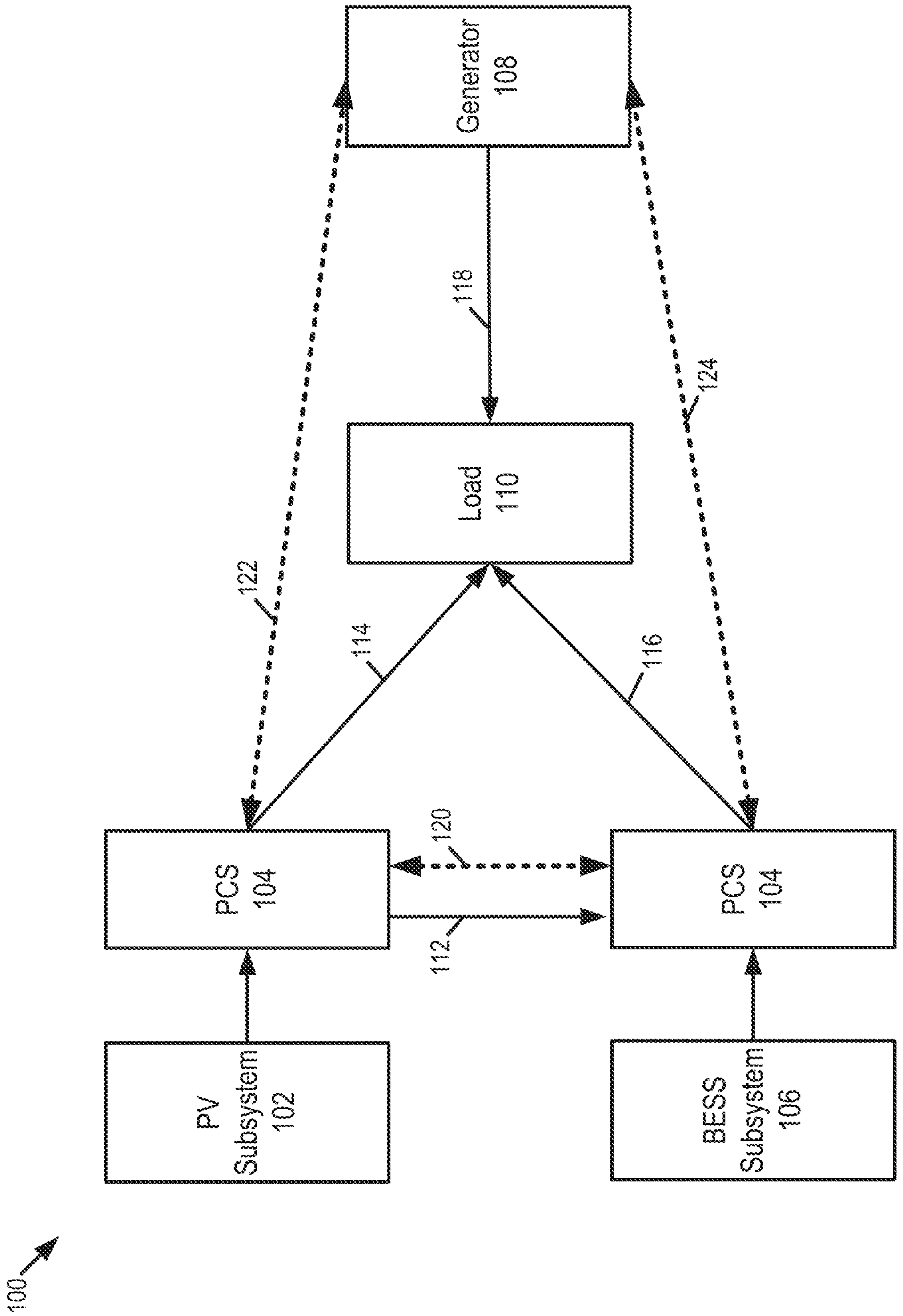
FIG. 1A is an example block diagram illustrating a high-level system architecture for a mobile solar and storage power generation system.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, a variety of locations, including remote and non-remote locations (e.g., remote mining), requiring electric power have traditionally relied on diesel generators. However, such applications may present logistical risks. Merely by way of example, remote locations may present logistical risks, such as fuel deployment (including logistical difficulty regarding global fuel supply chains), safety risks associated with fuel delivery in some applications (e.g., military applications), potentially hazardous emissions risks, and carbon emissions risks. Likewise, typical solar-based power solutions are either overly limited in the power generated or overly large/complicated (e.g., difficult to transport and/or deploy/install). As one example, existing larger off-grid systems may be capable of supplying residential, commercial, or industrial loads, but typically have mobility or transportability issues or are unable to be rapidly and easily deployed. As another example, smaller portable solar and storage solutions with sizes on the order of 100 W may be used for camping or other outdoor recreational purposes but are incapable of providing clean mobile power for operations in the range of 50 kW to multiple MWs.

In this regard, in one or some embodiments, a system is disclosed that is configured for simple or easy transportability and/or mobility. Alternatively, or in addition, a system is disclosed for rapid and/or easy deployment. As such, in one or some embodiments, a system is disclosed which may be configured for remote and/or non-remote locations, and may include any one, any combination, or all of: tailored to be easily transported, including challenging environments; tailored to be easily deployed, configured, maintained, and re-packed and re-deployed without needing excessive special expertise or training.

Typically, the system includes any one, any combination, or all of: power conversion system (PCS); batteries; a PV subsystem; or one or more safety mechanisms. However, these different systems are typically packaged, transported, and deployed in a disjointed manner. For example, the PCS may include one or more functions, such as any one, any combination, or all of: one or more electrical power converts configured to convert DC power to AC power and/or vice versa (e.g., by using one or more PCS or inverting functionality); maintain continuous operation of a load (e.g., provide constant power to the load); supply power to load(s) (e.g., for a local microgrid or to the utility grid); include one or more safety mechanisms, such as contactors, breakers, fuses or the like. Thus, one function of the PCS is for power conversion (e.g., PCS may perform power conversion, such as one or both of DC to AC conversion or vice versa). In this regard, any discussion herein regarding the PCS may be generally applied to power conversion, such as one or both of DC to AC conversion or vice versa. For example, an inverter is a device that includes one type of power conversion (e.g., either DC to AC conversion or vice versa). As such, any discussion herein regarding the PCS may be generally applied to an inverter.

Batteries may be in the form of a Battery Energy Storage System (BESS), which comprises a plurality of batteries configured to provide or store electrical power. The PV subsystem may be composed of PV modules (with each PV module including a plurality of PV cells). The PV modules may be both physically and electrically connected together into a PV string prior to installation within the container. Any discussion herein regarding a container may comprise a shipping container. In one or some embodiments, the shipping container comprises a container with strength suitable to withstand shipment, storage, and handling. In a specific embodiment, the shipping container may comprise large reusable steel boxes used for intermodal shipments. For example, one type of shipping container comprises an intermodal container, also called a shipping container or ISO Container, which is a large standardized container designed and built for intermodal freight transport. The ISO container may be used across different modes of transport, such as from ship to rail to truck, without unloading and reloading their cargo.

Further, a plurality of PV strings may comprise a PV unit. Thus, PVs may be arranged into various groupings including PV modules, PV strings, PV units, etc. Therefore, any discussion herein regarding PV grouping or PV subsystem may include any one, any combination, or all of the various types of groupings contemplated herein. The one or more safety mechanisms may be configured to address associated risks with power generation systems (batteries, electrical, environmental, etc.).

Thus, in one or some embodiments, a container may be pre-configured, such as one or both of electrical pre-configuration or mechanical pre-configuration, for efficient transport, deployment and/or operation. In one or some embodiments, electrical pre-configuration may comprise any one, any combination, or all of the following: pre-wiring for purposes of power transfer; pre-configuration for communication between the different elements within the container or external to the container (e.g., in one instance, pre-wiring for communication between the different elements; in another instance, pre-configuring for wireless communication with wireless receivers/transmitters so that, upon powering the wireless receivers/transmitters at the deployment site, communication may be performed without additional configuration); or pre-wiring for purposes of grounding. Alternatively, or in addition, electrical pre-configuration may comprise including one or more electrical devices within or on the container.

As one example, pre-wiring for purposes of power transfer may comprise pre-configuring one or both of an AC bus or DC bus that is resident within the container. As discussed in more detail below, in one or some embodiments, the AC bus may be pre-wired for electrical connection to the AC output of the PCS and to one or more electrical connectors (e.g., an output electrical AC connection for driving a load; one or more input electrical AC connections for receiving AC input from generator(s), other AC sources, or the like), with the electrical connectors being resident on the container (e.g., accessible on an exterior of the container). In this way, pre-wiring may enable all AC electrical connections, except for plugging in the AC cables into the output electrical AC connection in order to drive the load or except for plugging in the AC cables into the input electrical AC connection in order to receive AC power input from generator(s) or other AC sources. Alternatively, or in addition to an AC bus resident in the container, a DC bus may be pre-wired for electrical connection to any one, any combination, or all of: the BESS; the PV; the DC input to the PCS; or one or more electrical connectors (e.g., one or more input electrical DC connections for receiving DC input from a deployed PV, a BESS that is resident in a separate container, etc.).

Alternatively, or in addition to an AC bus and/or a DC bus, pre-wiring may be used to supply power to one or more electronic devices (e.g., electronic devices resident within the container) and/or route power. As one example, the Aux power, which may comprise an uninterruptible power supply, may be electrically pre-wired to one or more electrical devices within the container, such as any one, any combination, or all of the control electronics, the PCS, the sensor (s), or the fan(s). In this way, the electronic devices may be immediately powered upon deployment. Alternatively, or in addition, the Aux power may be pre-wired for electrical connection to the PCS for recharging during operation. As another example, the DC output of the BESS may be wired directly to the DC input of the PCS.

In another example, pre-configuration for purposes of control may comprise wired and/or wireless pre-configuration so that the control electronics may communicate with one or more electronic devices (e.g., receive data input from electronic devices resident within the container and/or send commands for controlling electronic devices resident within the container). As discussed above, the pre-configuration may comprise pre-wiring. Alternatively, or in addition, the pre-configuration may comprise installing wireless communication (with or without receivers/transmitters) between the different electronic devices so that upon powering the receivers/transmitters at the site, wireless communication may be performed without any additional configuration at the deployment site. In a first particular example, pre-wiring may enable one or more sensors resident within the container to communicate with control electronics. In turn, using the sensor data (transmitted via the pre-wiring from the one or more sensors resident in the container to the control electronics), the control electronics may transmit one or more commands to various electronic devices resident within the container (e.g., the PCS, the BESS and/or the fan). In a second particular example, pre-wiring may enable the control electronics to control of various devices resident within the container, such as the PCS and/or the BESS resident within the container. In a third particular example, pre-wiring may enable control, via one or more electrical connectors positioned on an exterior of the container, of various devices resident external to the container, such as a PCS and/or a BESS that is resident in a separate container (e.g., the PCS and/or the BESS may electrically connect to the control electronics via the electrical connectors in order to receive commands via the electrical connectors). Thus, pre-wiring for purposes of control may be entirely performed prior to transport with little to no configuration needed at the site.

As yet another example, pre-wiring for purposes of grounding may comprise electrically connecting the electronics housed within the container (e.g., individual devices housed within the container, such as the PCS, BESS, control electronics, etc.; the AC bus; or the DC bus) to the chassis of the container. In practice, with a portion of the chassis exposed, at the site, a user may electrically connect a metal connector to exposed portion of the chassis, with the metal connector being electrically wired to a metal stake, which is driven into earth ground. In this way, for purposes of grounding the electronics, the user need only electrically connect the metal connector to the chassis and to drive the metal stake into the ground.

In one or some embodiments, electrical pre-configuration may comprise including one or more electrical devices within or on the container. As one example, the container may include a user interface that is mounted to or on the container (such as to an external panel of the container). In particular, the user interface may comprise a display, such as a touchscreen, and may be embedded or integrated into an exterior, such as a wall, of the container. Further, the user interface may be pre-wired to the control electronics. In one or some embodiments, the user interface may include a cover that is hinged so that during transit of the container or during inclement weather, the user interface may be covered. In one or some embodiments, the user interface may be configured for one or more functions, such as one or both of: requesting the status of any part of the system (e.g., the state of charge of the BESS, the current amount of energy production of the PV subsystem); or controlling any part of the system (e.g., fans, control electronics). As another example, the container may include one or more electrical connectors, as discussed above.

Alternatively, or in addition, mechanical pre-configuration may comprise any one, any combination, or all of the following: co-locating both for transport and for operation within the container (e.g., BESS, PCS, controls, Aux power, sensor(s), fan(s)); co-locating the PV subsystem for transport within the container with any one, any combination, or all of the BESS, PCS, controls, Aux power, sensor(s), fan(s)); or including within the container one or more deployment systems for deploying part or all of the PV subsystem. As one example, any one, any combination, or all of the BESS, PCS, controls, Aux power, sensor(s), fan(s) may be positioned within and mechanically supported within the container using one or more racks for transport within the container and for use at the ultimate site. As another example, part of all of the PV subsystem may be positioned within the container for transport. In one or some embodiments, the container may house one or more PV subsystems. As still another example, one or more deployment systems may be resident in, and transported with, the container. In this way, the one or more deployment systems may be used to deploy the PV subsystems when the container is delivered to the final site.

Thus, as discussed above, the system includes any one, any combination, or all of: PV subsystem(s) (e.g., glass solar panels, glassless solar panels, flexible solar panels, or non-flexible solar panels, such as laminated solar panels, that resist breaking during movement or deployment); batteries (e.g., ruggedized batteries that can resist breaking during movement or deployment); or control electronics tailored to be transported, deployed, packed, and re-deployed (e.g., the PCS is configured to operate with or without communication with one or more other electronic devices in the environment). In one or some embodiments, ruggedized may comprise being configured to perform any one, any combination, or all of: resist wear; resist tear; perform under stress; or resist abuse to the electronics. In one or some embodiments, the components of the various may be ruggedized based on features associated with the respective components. As one example, the PV subsystem may be ruggedized in one or more features, such as being glassless. As another example, the batteries may be ruggedized by being sealed, maintenance-free batteries with a rugged battery enclosure.

In this regard, container(s) to transport parts of the system are configured for easier transport and/or for easier configuration than traditional distributed energy resources (DERs). Thus, various embodiments are contemplated in order to tailor the mechanical and/or electrical configuration of the containers. In one particular example, the container may be configured for transport of both the PV subsystem and the BESS. In another particular example, separate containers may be tailored for the PV subsystem and for the BESS subsystem, such as a PV container tailored for transport and/or configuration of the PV subsystems and a Battery container tailored for transport and/or configuration of the BESS.

In a first embodiment, the PV container includes both of: (i) a plurality of PV strings; and (ii) power electronics to convert from DC to AC (e.g., the PCS). In practice, the PV subsystems generate DC power. Further, in practice, separate strings of PVs (see FIG. 9B) may generate separate outputs for DC power. The power (whether DC or AC) may be routed to a central location. Using power electronics, such as one or more PCS, the system may convert the DC power to AC power. In one embodiment, the conversion using the PCS may be performed centrally (e.g., DC power is transmitted to the central location, with the DC-to-AC conversion being performed at the central location). In this regard, certain containers do not include housed therein a PCS; rather, DC power generated by a respective PV string may be routed to a central container with a PCS, which may then perform the DC to AC conversion. Alternatively, the conversion using the PCSs may be performed locally (e.g., the respective container includes a PCS so that the DC-to-AC conversion is performed where the PV strings generate the DC power, with the AC power being transmitted to the central location). In such a system where the DC-to-AC conversion is performed remotely (apart from the central location), the PV container may include the power electronics, such as one or more PCS. Still alternatively, DC-to-AC conversion may be performed at the PV strings (e.g., PCSs are embedded within the PV panels so that DC-to-AC conversion is performed in the field) so that AC power is output from the PV strings. As such, conversion using a PCS or the like is unnecessary.

Further, the PV container may be tailored to the power electronics. As discussed above, the PCS(s) may be integrated in one or more ways with the container, such as one or both of: mechanically integrated in the container (e.g., physically mounted within or bolted to the container); or electrically integrated in the container (e.g., internal wiring, such as grounding, of the PCS(s) may be electrically connected to the chassis of the PV container, and in turn to an exposed ground pad of the PV container; during configuration of the PCS on site, the ground pad of the PV container may be connected to physical earth in order to remotely ground the PCS(s). In this regard, configuration may be much easier than the prior art, which requires physically transporting the PCS(s) to the PV panels (interchangeably termed PVs) since the PV panels and the PCS(s)are transported in different containers. Moreover, part or all of the wiring, including grounding of the electronics, power, or communication, may be entirely (or nearly entirely) performed while configuring the container. As one example discussed above, in practice, to ground the PCS, the operator need simply electrically connect the exposed ground pad from the chassis to the physical earth via a grounding stake. As such, configuration is considerably easier by using the PV container (e.g., the chassis of the container and the wiring) to ground the PCS.

In addition, the PV container may be tailored to easily deploy the PVs stored therein. In one or some embodiments, wheel-based system(s), such as deployment system(s), may be integrated within the PV container that contains the PVs in order to remove the PVs from within the PV container in order to deploy at the final site. In one or some embodiments, the wheel-based system(s) are connected to the PVs while the container is in transport, thereby obviating the need to connect the wheel-based system(s) to the PVs prior to deployment at the site. In this way, connecting both the PVs and the wheel-based system(s) in transport may provide additional rigidity so as to reduce the possibility of damage of the constituent parts in transport. Alternatively, one, some, or each of the wheel-based system(s) in the PV container are disconnected from the PVs during transport, and are connected to the PVs only after transport of the PV container to the site.

In one or some embodiments, the PV container may include one or more PV groupings (e.g., whether one or more PV strings; one or more PV units; etc.). In practice, a respective set of PV grouping(s) include structure both to hold the plurality of PV grouping(s) while in transit and to remove the respective PV grouping(s) from the PV container for deployment. In a first embodiment, a wheel-based deployment system, which may include tracks, is assigned to each PV grouping. For example, a container that includes three sets of PV strings may include three separate deployment systems, each assigned to a respective one of the three sets of PV strings. In one embodiment, one, some, or each of the deployment systems are connected to the respective PV string in transit. Alternatively, none of the deployment systems in the PV container are connected to its respective PV string in transit, and are only connected to the respective PV string after arriving at the final site. Alternatively, the number of deployment systems in the PV container is less than the number of PV strings within the container. For example, a PV container may contain three sets of PV strings, but only include one deployment system (either connected in transit or disconnected in transit) assigned to a first PV string. The remaining two PV strings need not be assigned a track drive in transit. Rather, the remaining two sets of PVs may include a respective slot for insertion of a track drive. In practice, after the first set of PVs is deployed using the assigned track drive, the assigned track drive may be removed from the first set of PVs and connected to one of the remaining two sets of PVs (which are still in the PV container) for removal and deployment.

Further, the PV container may include guide rails that may be integrated work within the structure of the container and may work in combination with the wheel-based system(s). For example, the guide rails may be hinged at one end and may be connectable on the other end (e.g., connectable at a top of the container). When the container is in transit, the guide rails may be connected at the other end in order for the guide rails to be positioned in the stowed position. Thus, in the stowed position, the guide rails may provide additional rigidity to the PV grouping(s) while in transit. After the container reaches the site, the guide rails may be disconnected at the one end so that the guide rails may create a ramp which may be used by the wheel-based system(s), such as the track drive(s), to remove the set(s) of PVs from the PV container.

As discussed above, in a second embodiment, the Battery container includes both: (i) a plurality of PV grouping(s); and (ii) power electronics to convert from DC to AC.

More specifically, in one or some embodiments, the system may include control devices in (or associated with) one, some, or all of the PVs, the battery energy storage system(s) (BESS), or electronics (such as electrical connectors) to receive power from one or more generator(s). As discussed above, the control electronics may be configured to control the associated device(s) dependent on whether communication is available with other device(s). One example control device comprises a PCS. Other control devices are contemplated. As discussed above, the system may be configured to operate autonomously and, as such, need not rely on wired and/or wireless communication. In this regard, the system may be easily and quickly deployed, packed, and re-deployed. Moreover, in one or some embodiments, the various components in the system may be co-located, such as the PCS with the BESS subsystem, thus allowing for pre-wiring of the container prior to shipment, such as installing pre-wired communication (e.g., Ethernet cabling) and/or wireless communication (e.g., local wireless communication networks, mesh networks, or the like) between components, as discussed above. Alternatively, parts of the system may be deployed remotely from one another (e.g., the PV grouping(s) may be remote from the BESS subsystem) so that wired communication or wireless communication is either infeasible or unavailable. For example, certain parts of the system may be co-located (e.g., PV strings and BESS subsystem; PV strings and generator; BESS subsystem and generator) thus allowing for communication whereas other parts may not be co-located thus making communication infeasible. As such, in one or some embodiments, the controls of the device(s) in the system may be tailored (e.g., to take advantage of communication between one or more components if available at all) to deployment in such environments and configured to operate even without communication with one or more other devices in the system (e.g., the PVs are unable to communicate with BESS and vice-versa).

As discussed above, in one embodiment, the PV grouping(s) are removed from the PV container prior to deployment at the site. Alternatively, the PV grouping(s) may be deployed at the site while still connected to the PV container. In particular, the PV grouping(s) may include structure that both: (i) connects to the PV container (including structure directly connects the PV grouping(s) to the PV container or structure that connects the PV grouping(s), via one or more intermediary structures, to the PV container) in order to provide structural support for the PV; and (ii) enables deployment of the PV grouping(s) while structurally supported by the PV container. Various types of deployment of the PVs are contemplated. In one embodiment, the PV grouping(s) may be hinged on at least one side, and may be configured in a stored position (e.g., the PV strings are folded, such as at least partly overlapping one another and/or at least partly within the PV container) and in a deployed position (e.g., the PV strings are then opened, not overlapping one another and not within the PV container). Alternatively, or in addition, the PV grouping(s) may be multi-tiered, such as multi-tiered in the stored position (e.g., the PV strings are at least partly on top of one another) and in the deployed position (e.g., the PV strings, when deployed, do not overlap one another and also are positioned at different heights relative to the top of the PV container).

As such, in one or some embodiments, the system may be easily configurable, in one of several ways including any one, any combination, or all of: easily packaged for transport; easily deployed at the final site; and easily configurable at the site. Merely by way of example, the system may comprise a plug and play power distribution, which may allow for spot generation or distributed microgrid capability and which may or may not require the installation of multiple relays, power meters, etc. to effectively provide power to multiple loads. In addition, the system may include an intuitive Human Machine Interface (HMI), controls and power distribution connections, which do not require substantial training, thereby enabling straightforward configuration at the site.

Referring to the figures, FIG. 1A is an example block diagram 100 illustrating a high level system architecture for mobile solar and storage power generation system. For example, the architecture may include any one, any combination, or all of: PV subsystem(s) 102 (which may include one or more PV subsystems); BESS subsystem(s) 106 (which may include one or more BESS subsystems); one or more generators 108; and load(s) 110 (which may include one or more loads, such as one or more AC loads). As discussed in more detail below, the AC loads may comprise a discrete load, a microgrid, or a utility grid. Further, as discussed in more detail below with regard to FIGS. 2A-E and 3A-B, various configurations and various loads are contemplated. In one or some embodiments, the architecture includes one or more power conversion systems (PCSs) 104.

In practice, power may be provided to load(s) 110 via one or more means, such as from PV subsystem 102 (via PCS 104) through electrical connection 114, from BESS subsystem 106 (via PCS 104) through electrical connection_116, and/or from Generator 108 through electrical connection 118. Further, when not routing power to the load(s) 110, PV subsystem 102 may route power to the BESS subsystem 106, such as via line 112 and PCS 104. The system may further include any one, any combination, or all of: various controllers; wiring; heat exchangers; power meters; or uninterruptable power supplies (UPSs). Further, one or more parts of the system (such as the PVs) may generate DC power, whereas the loads may operate on AC power. As such, the architecture may include DC-to-AC conversion, such as by one or more PCSs. The DC-to-AC conversion may be performed in one of two ways including: (1) de-centrally, such as proximate to where the DC power is generated (e.g., the PVs generate DC power; PCS(s) at the output of the PVs convert the DC power to AC, with the AC power then being transported to a central location, such as where storage batteries are housed); or (2) centrally (e.g., meaning that the DC power generated by the PV panels is transported to the central location, with the DC-to-AC power conversion being performed there). In this regard, the containers for deployment at the site may be tailored to either the decentralized or the centralized DC-to-AC conversion. As one example, decentralized DC-to-AC conversion may be performed so that one or more containers may locally perform the DC-to-AC conversion, such as illustrated in FIG. 1H (discussed below), with the AC power being transmitted to another container (such as a centralized container) for potential combination of AC power from other sources. As another example, centralized DC-to-AC conversion may be performed so that one or more containers may operate in the DC universe, such as illustrated in FIG. 1I (discussed below), with the DC power being transmitted to a centralized container for the centralized DC-to-AC conversion (see e.g., DC power generated by the PV subsystem may be transmitted to another container for DC-to-AC conversion and/or BESS subsystem power may be transmitted to another container for DC-to-AC conversion).

In addition, the various devices in FIG. 1A may communicate with each other, such as via wired and/or wireless communications. This is illustrated, for example via communication link 120 (between PCS 104 associated with PV subsystem 102 and PCS 104 associated with BESS subsystem 106), communication link 122 (between PCS 104 associated with PV subsystem 102 and generator 108) and communication link 124 (between PCS 104 associated with BESS subsystem 106 and generator 108). As discussed in more detail below, the various PCSs 104 may determine which devices are available for communication, and to control the system accordingly.

It is noted that FIG. 1A illustrates one example implementation. Other implementations are contemplated. Merely by way of example, the architecture may include any one, any combination, or all of: different types of batteries (such as non-battery energy storage); different types of power electronics; or different types of PV modules (e.g., different cell types, front and backsheets (e.g., glass, plastic, or other), and other variations on balance-of-module components). Further, the internal connections of the batteries to the power electronics may vary. The invention may be implemented to use more or less ruggedized materials for the container, packaging, and other components as required by specific applications.

Moreover, the system, as illustrated in FIG. 1A and discussed further below, is modular and flexible in its integration. Each unit, such as each PV subsystem 102 and/or each BESS subsystem 106 and/or each generator 108, may be used to supply individual buildings or loads. Or, multiple units may be connected together and may operate as a microgrid supplying multiple loads, as discussed in more detail below. In this regard, the system may be used in an off-grid implementation. Alternatively, or in addition, the system may be used in a grid-tied application. Further, the mobile power generation system may be applied in a variety of configurations, examples of which include spot generation (see FIGS. 2A-E) and microgrid (see FIGS. 3A-B and 4).

FIGS. 1B-I are example block diagrams 130, 150, 162, 166, 172, 174, 176, 182, 192, 193 illustrating different configurations of the container 131. As discussed above, the container 131 may be tailored or pre-configured in one or more ways including any one, any combination, or all of:

- including different combinations of electronic devices (including any one, any combination, or all of: PV subsystem 102; BESS subsystem 106; PCS 104; Aux power 132; additional electronics 134 (e.g., sensor(s) and/or fan); or controls 136 (e.g., control electronics);
- including one or more external interfaces (including any one, any combination, or all of: load output 137;

generator input 138; additional AC input 140; chassis ground connection 142; additional DC input 144; user interface 146; or mechanicals 148 (e.g., vent(s));

electrical pre-configuration (e.g., including any one, any combination, or all of: pre-wiring for purposes of power transfer; pre-wiring for purposes of communication between the different elements within the container or external to the container; or pre-wiring for purposes of grounding); or mechanical pre-configuration.

Figure 1B:
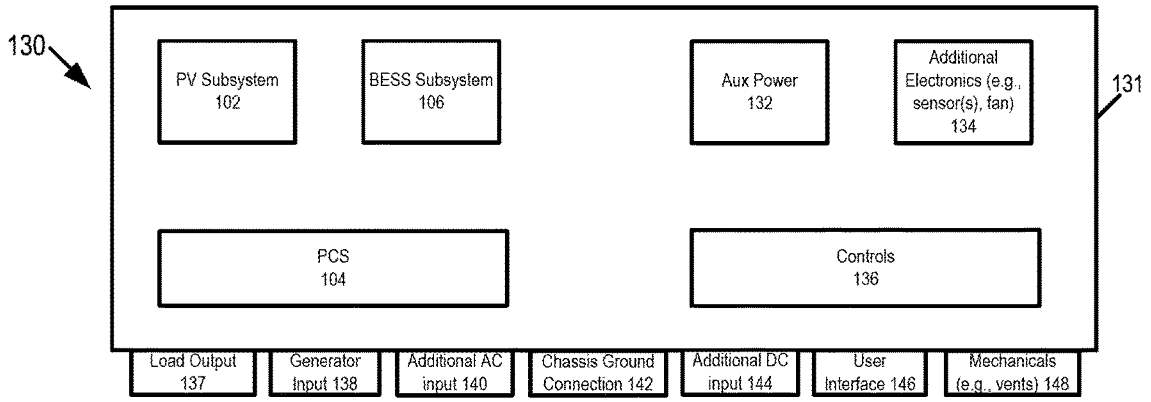
FIGS. 1B-M are example block diagrams illustrating different configurations of the container(s).
Figure 1C:
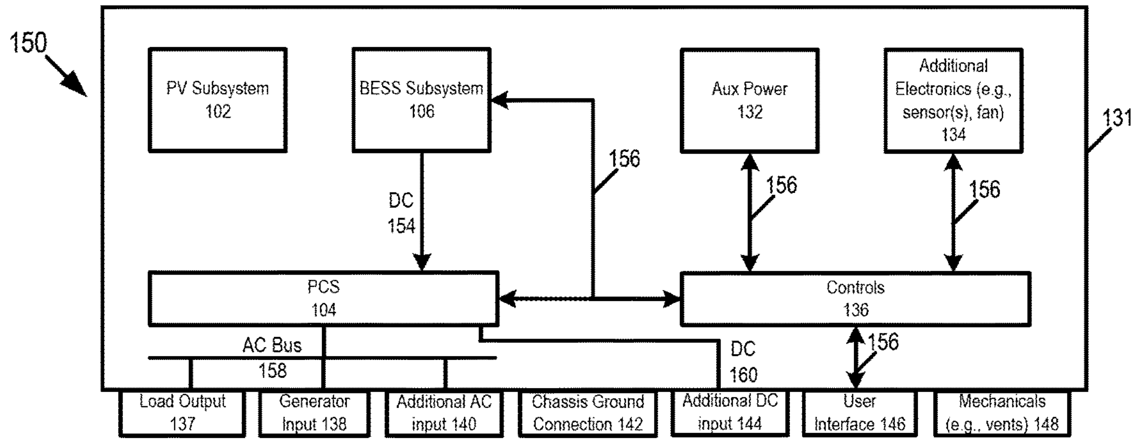
Figure 1D:
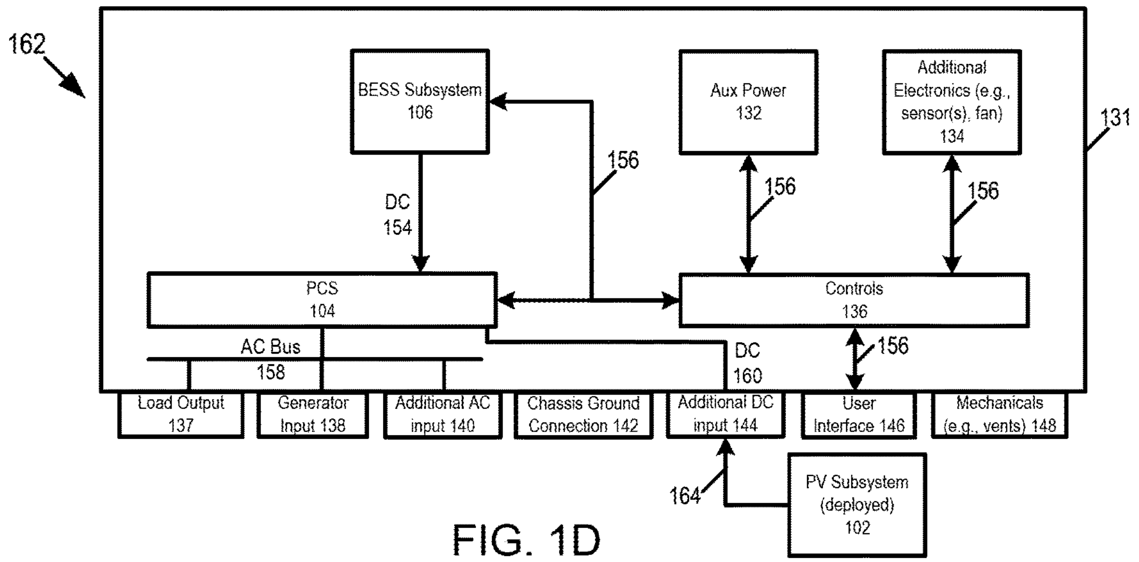
Figure 1E:
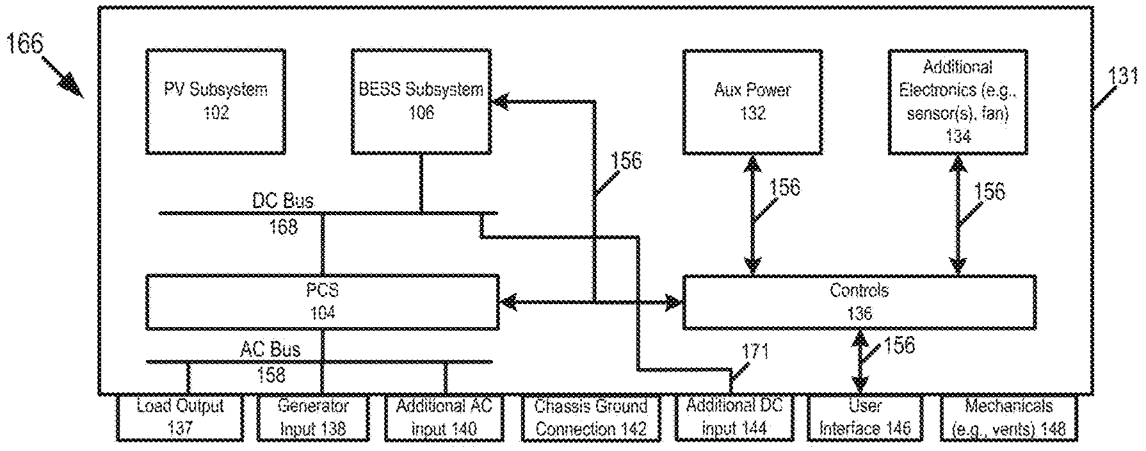
Figure 1F:
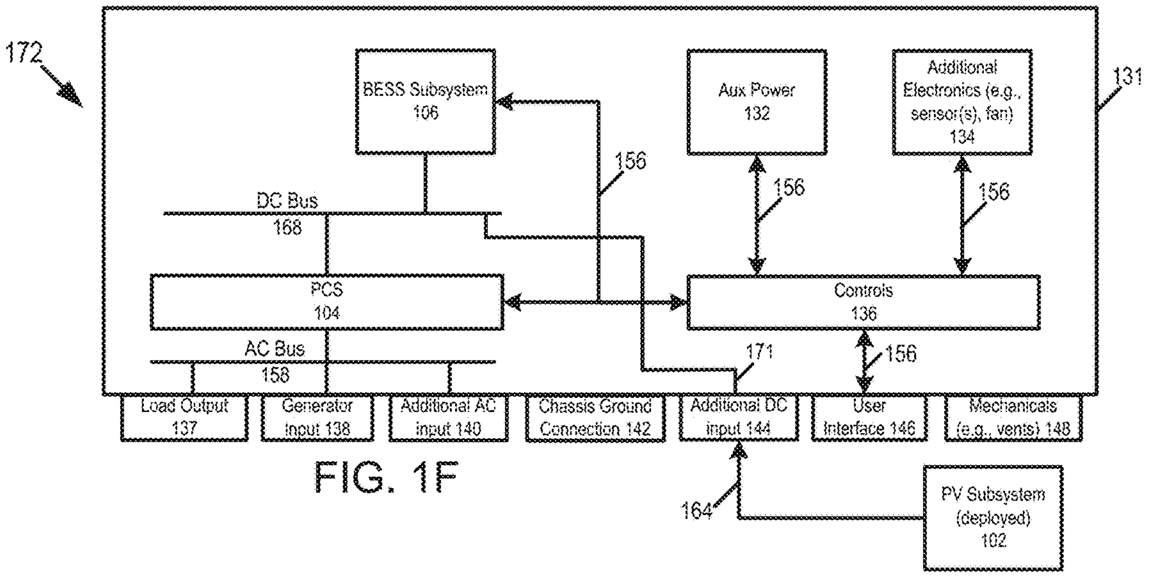
Figure 1G:
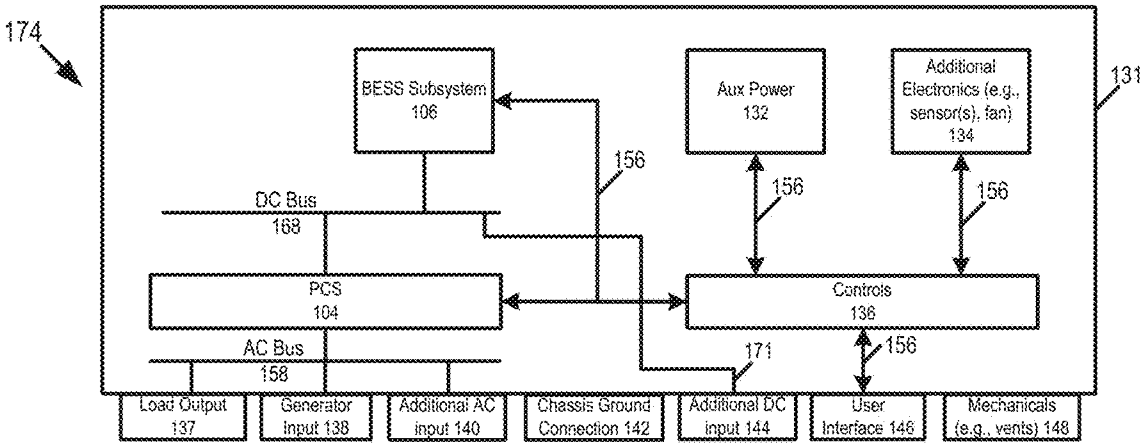
Figure 1H:
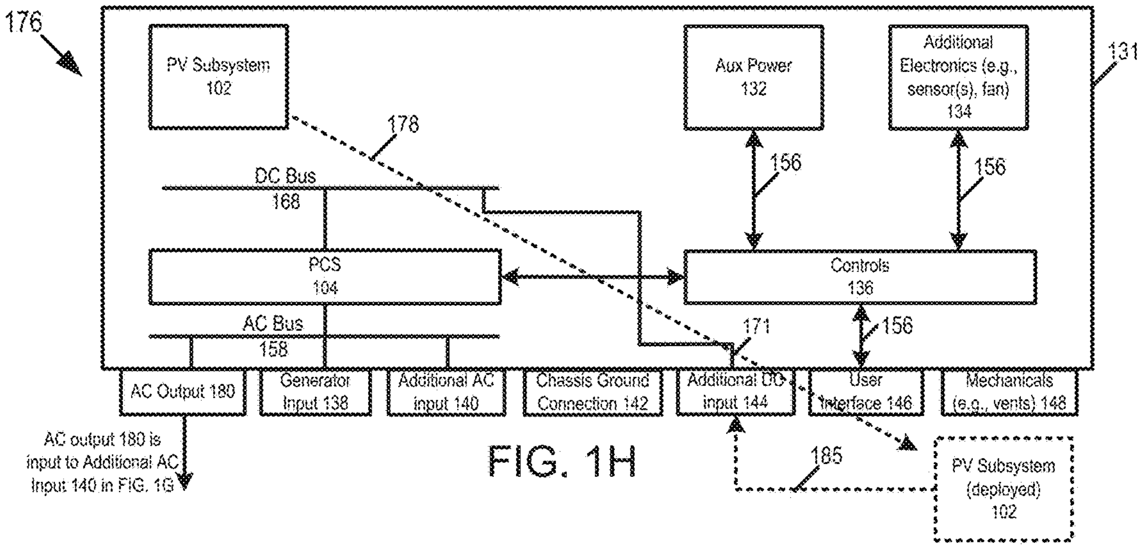
Figure 1I:
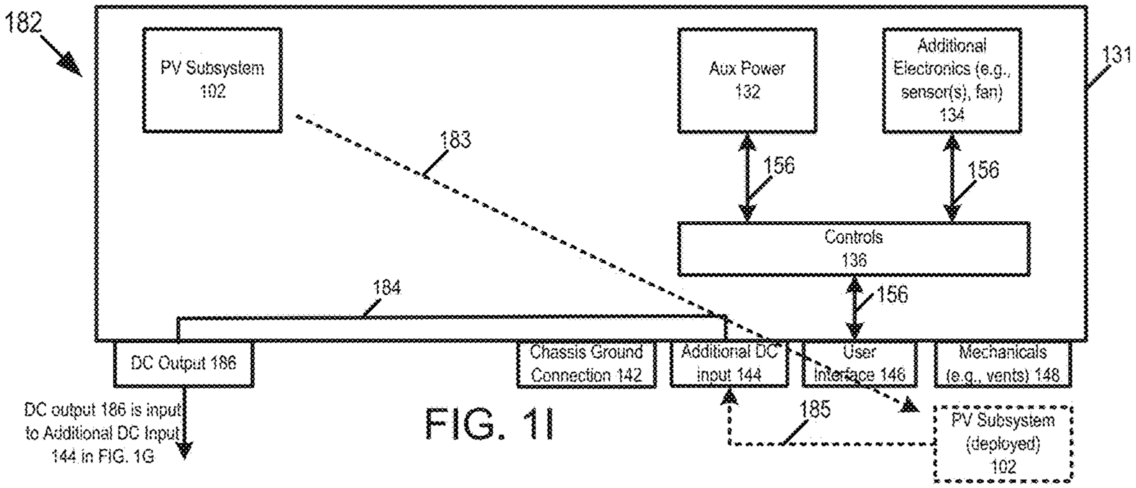

Thus, FIGS. 1B-I illustrate example block diagrams of the different configurations of the container 131. For example, FIG. 1B illustrates the various electronic devices that may be included within or on container 131. As discussed above, PV subsystem 102 may include any PV grouping, as discussed above. Further, BESS subsystem 106 may include one or more different racks of BESSs. As discussed above, Aux power 132 may comprise an uninterruptible power supply (UPS) that may be prewired, as discussed further below, to power one or more electronic devices, such as controls 136. In one or some embodiments, the UPS may supply power to one or more electronic devices as depicted in FIG. 1B, such as the PCS 104, controls 136, and/or BESS subsystem 106. In one or some embodiments, controls 136 may distribute power to the batteries, which, in turn, may wake up and then recharge the UPS. Thus, recharging of the UPS may be performed either before or after deployment of the PV subsystem 102. For example, if recharging is performed after deployment, the DC power from the PV subsystem 102 may be routed into the Aux power 132, which may then distribute power to the PCS 104, controls 136 (which may be used to power up the BESS subsystem 106). Alternatively, if the PV subsystem 102 has not been deployed, power from the UPS (without recharging) may be used to initialize the system.

Figure 11:
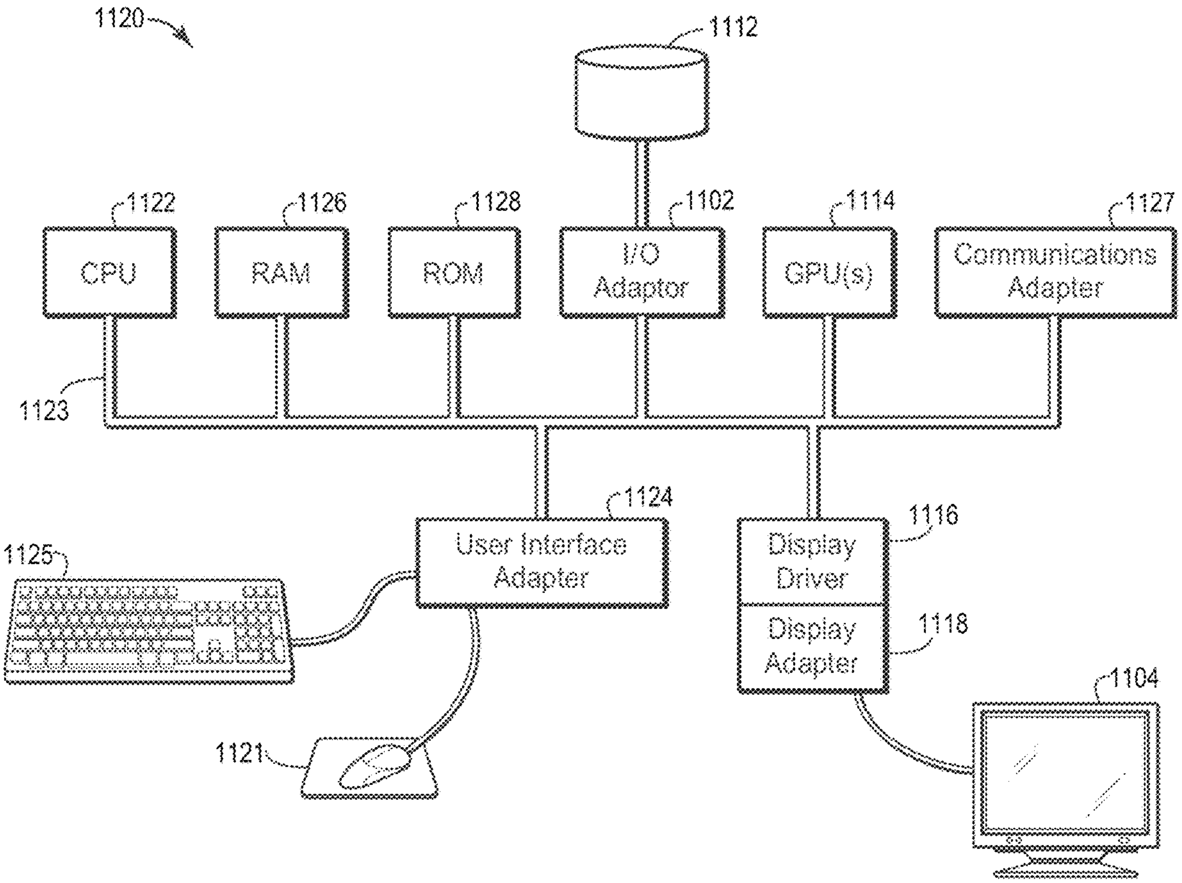
FIG. 11 is a diagram of an exemplary computer system that may be utilized to implement the methods described herein.

Controls 136 may include control electronics and include computational functionality as described below with regard to FIG. 11 in order to control one or more electronic devices depicted in FIG. 1B (and optionally control devices electrically connected via load output 137, additional AC input 140, or additional DC input 144). Merely by way of example, controls 136 may be configured (via pre-wiring or pre-configuration, discussed further below) to receive data input, such as via one or more sensors (e.g., temperature sensor positioned within the container; power meter within the container; etc.), and to control one or more devices. For example, the controls 136 may, responsive to data generated by the temperature sensor, control the fan(s) or other type of thermal management system within the container in order to cool the container. Alternatively, or in addition, the controls 136 may, responsive to data generated by the power meter, control the PCS to modify the AC output, such as increase/decrease the power, or modifying one or both of frequency or voltage. In this regard, the power meter may communicate with the PCS, such as directly or via controls 136, in order for the data generated by the power meter to control operation of the PCS. Alternatively, various electronic devices (e.g., the PCS) within the container may be liquid cooled, obviating the need for a fan to cool the electronic devices.

As discussed above, controls 136 may further initially power the batteries. In this regard, one or more power meters may be used to assist the PCS in power control. In a specific example, a first power meter may measure the power input from one or more power sources, such as a general AC source (e.g., a generator, to the extent a generator is used in the system and inputs its power via generator input 138) and/or a general DC source. Further, a second power meter may measure the power leaving the container (e.g., at load output 137) so that the PCS 104 knows the amount of power being output, and can adjust the power output accordingly. Thus, the PCS 104 may use the one or more power meters installed in a pre-wired to sense the various inputs or outputs as described. Alternatively, or in addition, controls 136 may control one or more of BESS subsystem 106, PCS 104, or user interface 146.

Figure 5A:
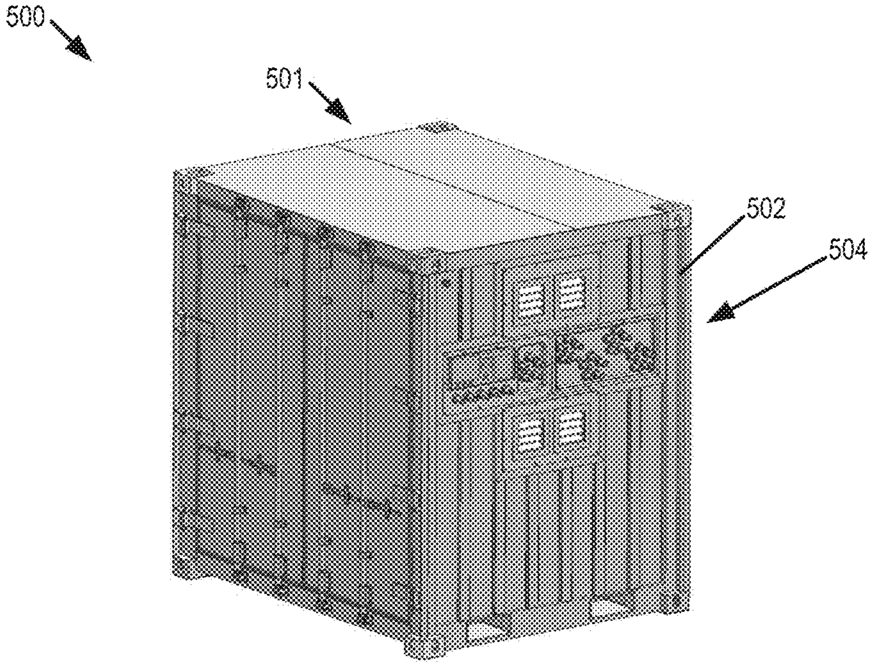
FIG. 5A is a perspective view of a closed container in which BESS subsystem(s) and PCS(s) are enclosed.

Further, FIG. 1B illustrates a plurality of external interfaces. In one or some embodiments, the plurality of external interfaces may be on at least one side of the container 131, such as the external side of the container, such as illustrated in FIG. 5A. Alternatively, one or more of the plurality of external interfaces may be positioned on an interior wall of the container 131, such as on the hinged door of the container 131. Still alternatively, the plurality of external interfaces may be positioned on more than one side of the container 131. Regardless, the positioning of (and the electrical and/or communication wiring for connection to) one or more of the external interfaces depicted in FIG. 1B may be part of the pre-configuration of the container prior to shipping of the container to the final site where the system is deployed.

Figure 5B:
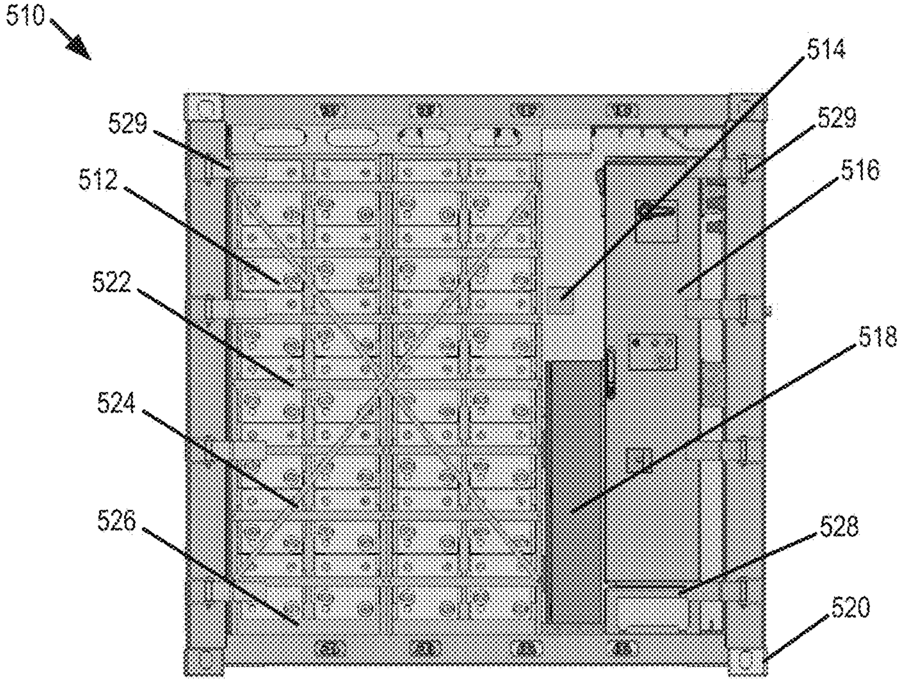
FIG. 5B is a representation of the container depicted in FIG. 5A with the container opened.
Figure 5C:
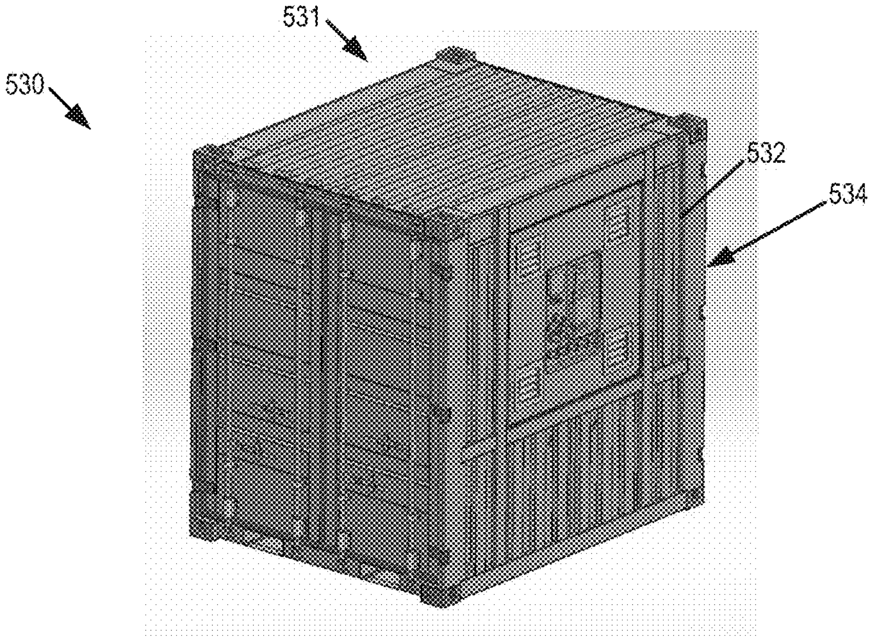
FIG. 5C is a perspective view of a closed container in which PV subsystem(s) and Power Conversion System(s) are enclosed.
Figure 5D:
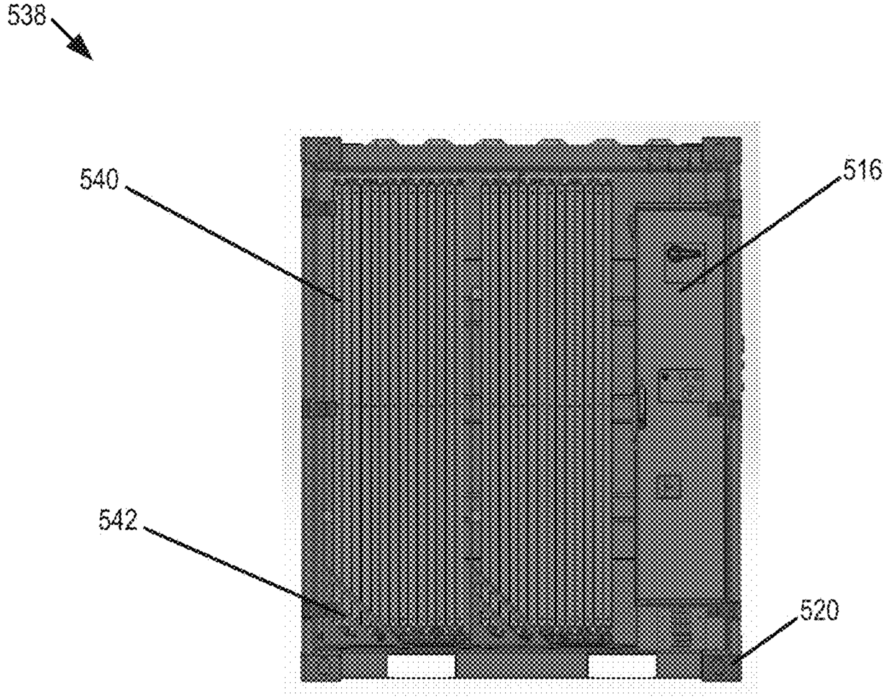
FIG. 5D is a representation of the container depicted in FIG. 5C with the container opened.
Figure 5E:
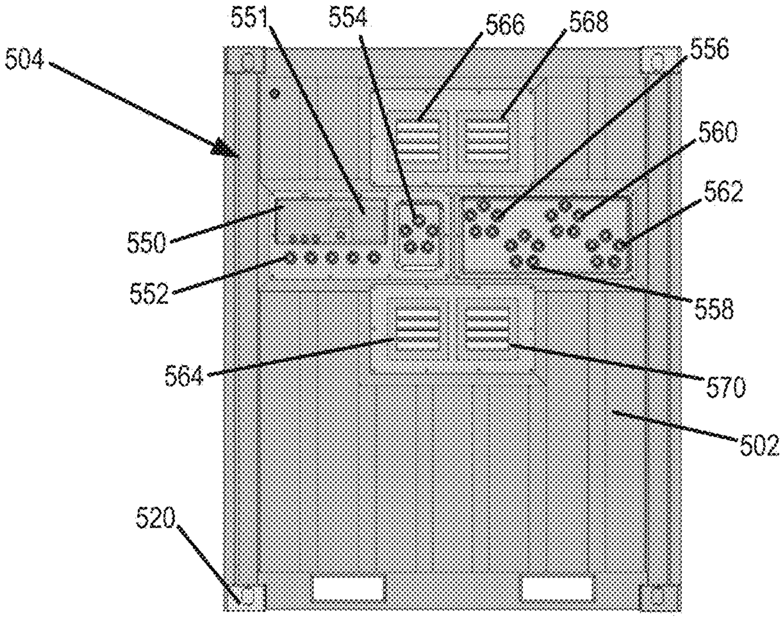
FIG. 5E shows one side of the exterior of the container depicted in FIG. 5A.
Figure 5F:
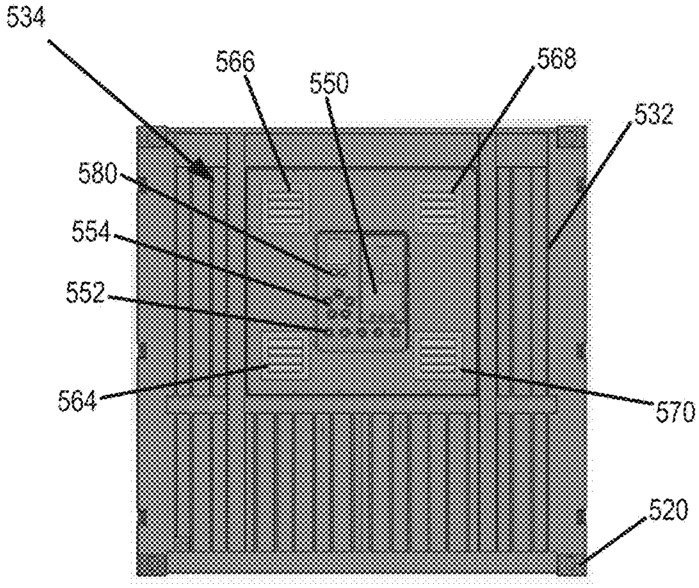
FIG. 5F shows one side of the exterior of the container depicted in FIG. 5C.

Load output 137 may comprise electrical connection(s), such as illustrated in FIGS. 5A and 5E-F, discussed further below, to transmit AC output to a load, such as illustrated in FIG. 1A. Generator input 138 may comprise electrical connection(s), such as illustrated in FIGS. 5A and 5E-F, discussed further below, to receive AC power generated by a generator, such as illustrated in FIG. 1A. Additional AC input 140 may comprise electrical connection(s), such as illustrated in FIGS. 5A and 5E. In one or some embodiments, additional AC input may be generated, separate from generated by a generator, from one or more PV strings that have already been converted into AC, as discussed in further detail below. Moreover, as discussed above, various types of loads are contemplated, such as a discrete load (e.g., the AC power powers the discrete load), a microgrid (e.g., the AC power powers the microgrid), or a utility grid (e.g., the AC power supplies power to the microgrid), Additional DC input 144 may comprise electrical connection(s), such as illustrated in FIG. 5F. In one or some embodiments, additional DC input may be generated from one or more PV strings that have not yet been converted into AC, as discussed in further detail below.

Figure 6A:
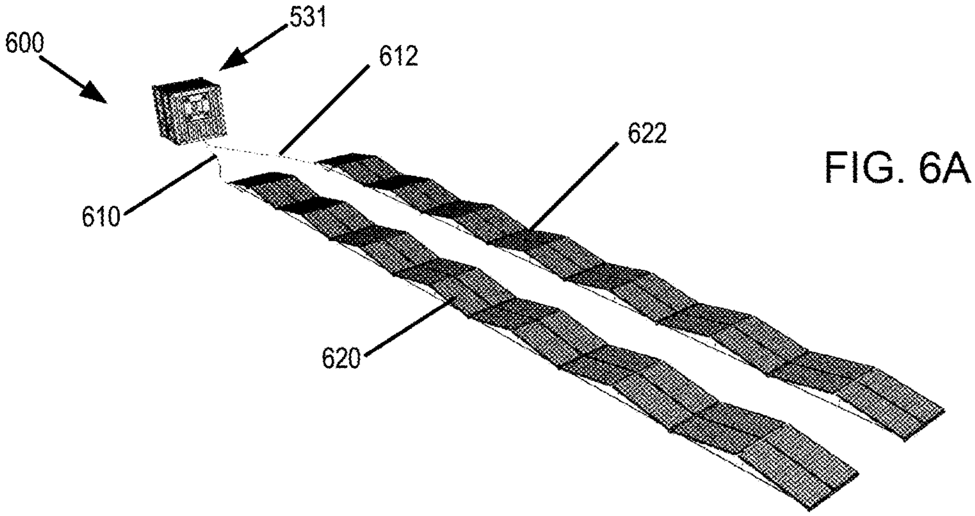
FIGS. 6A-B are representations of a PV subsystem deployed and the container connected thereto.
Figure 6B:
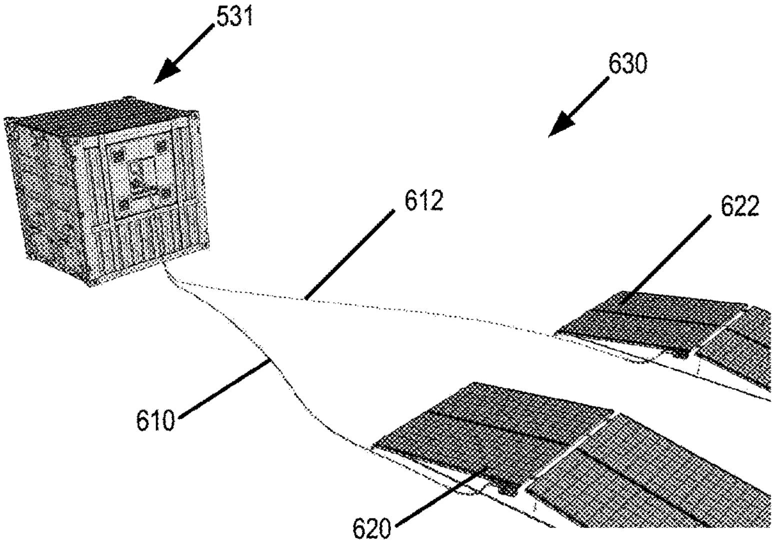
Figure 6C:
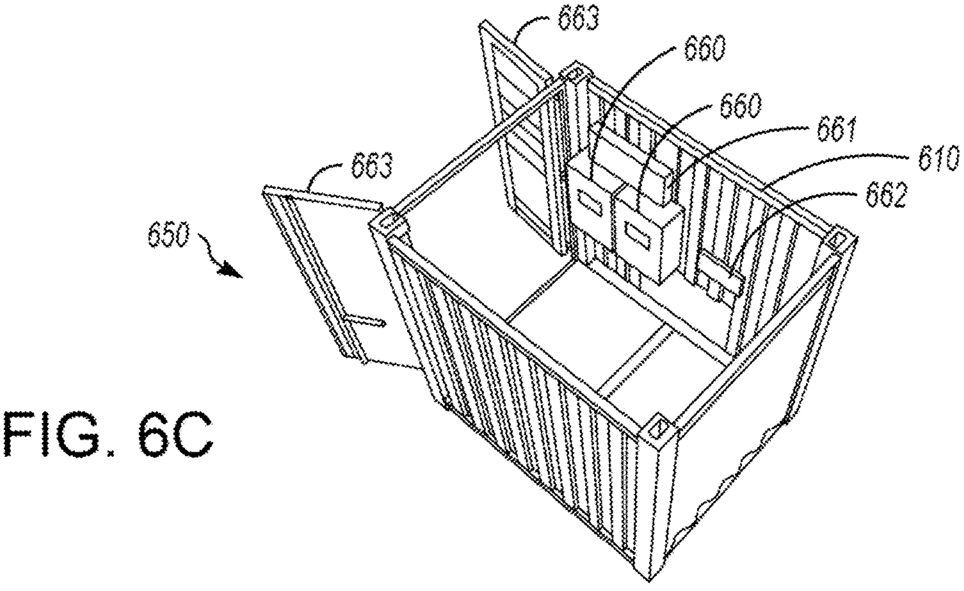
FIG. 6C is a representation of a container, with the doors open and the PV subsystem(s) removed and the PCS therein.
Figure 6D:
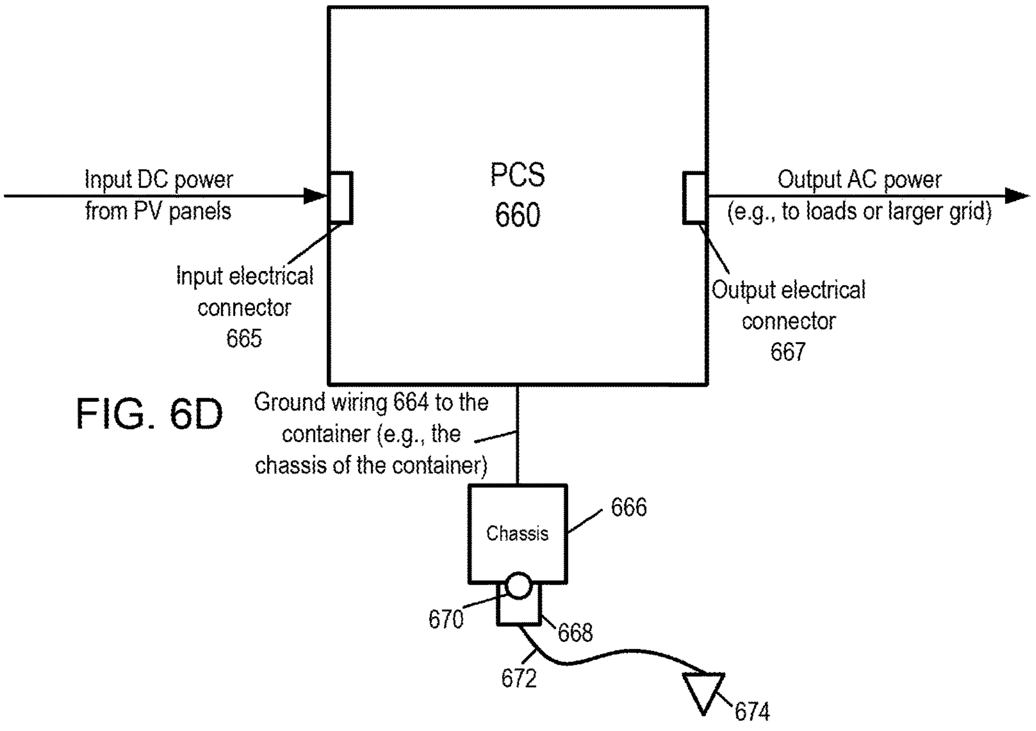
FIG. 6D is a block diagram of a PCS which may be integrated into the PV container.
Figure 6E:
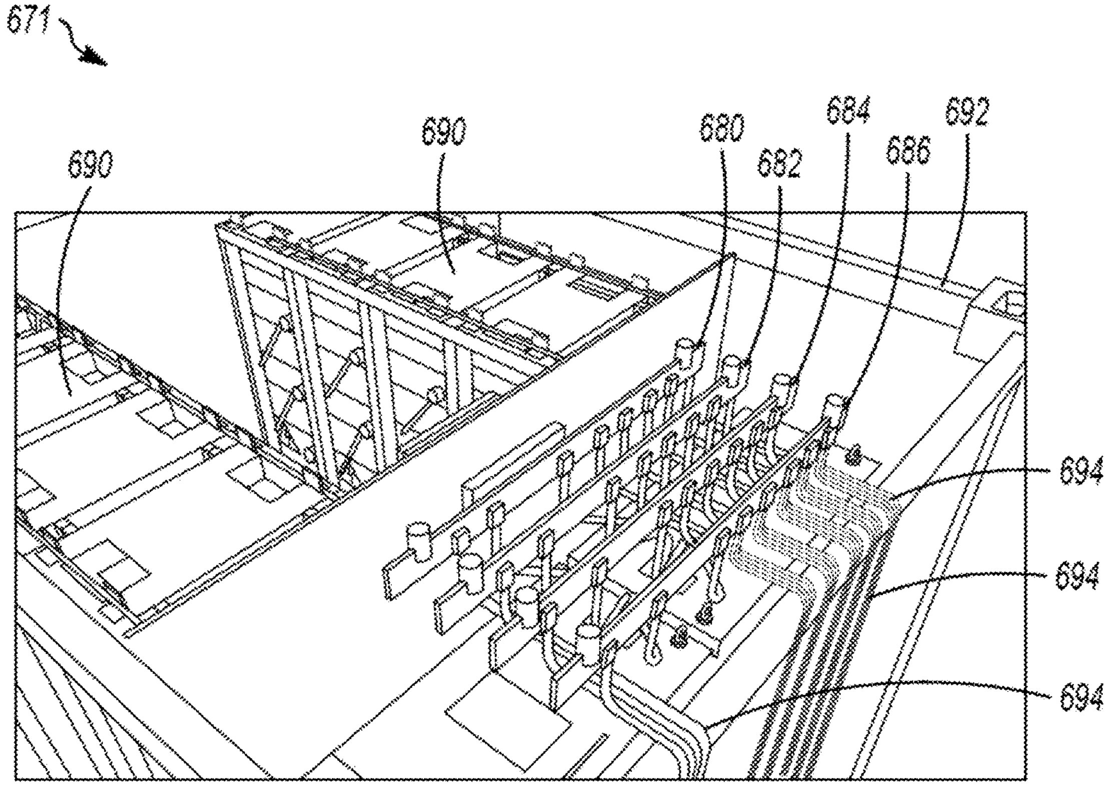
FIG. 6E is a representation of a container with the top removed showing batteries and an AC power bus.

Chassis ground connection 142 is discussed in further detail in schematic in FIG. 6D and visually in FIG. 5A. In one or some embodiments, chassis ground connection 142 comprises the metallic connection to the chassis of container 131 to which a metal connector may be physically and electrically connected to. In turn, the metal connector is electrically connected to a stake, with the stake being inserted into the earth to establish earth ground for the chassis of the container 131. In this regard, because of the pre-wiring of ground for various devices to the chassis of the container 131, the ease of connecting the chassis to earth ground renders establishing earth ground for the devices in or relying on the container 131 for ground simple as well. Specifically, as discussed further below, chassis ground may be pre-wired for electrical connection to the various devices within the container 131, such as PCS 104, BESS subsystem 106, controls 136, Aux power 132, additional electronics 134, and one or more buses pre-wired in the container 131, such as AC bus 158 and/or DC bus 168, discussed further below. As discussed further below, an example of the AC bus 158 is illustrated in FIG. 6E. Further, the DC bus 168 may include two rails (e.g., a positive rail and a negative rail), with another rail for earth ground (which may comprise chassis ground). Thus, the two rails of the DC bus 168 may have been previously mounted to the chassis while being electrically isolated from chassis ground. Alternatively, or in addition, chassis ground may be used to provide earth ground to one or more devices that are electrically connected to container, such as providing earth ground to the load (via load output 137).

User interface 146 may comprises a touchscreen or the like in order for a user to perform one or both of: obtaining status of one or more electronic devices in the system (e.g., interacting with controls 136 in order to determine level of charge of BESS subsystem 106; to determine operation of PCS 104; to determine amount of power generated by PV subsystem 102 (that is connected to one of additional AC input 140 or additional DC input 144)); or controlling one or more electronic devices in the system (e.g., controlling PCS 104, BESS subsystem 106; PV subsystem 102, Aux power 132; or additional electronics 134, such as fan).

Container 131 may further include mechanicals 148 on an exterior of the container 131, such as one or more vents, which is illustrated in FIGS. 5A, 5C, 5E, and 5F.

As discussed above, container may be pre-wired for power and/or for communication prior to transport to the final site. An example of this is illustrated in FIG. 1C, in which wires 156 (which may carry power line(s) and/or control line(s)) may connect controls 136 to one or more devices, such as PCS 104, BESS subsystem 106, Aux power 132, additional electronics 134, and user interface 146. Moreover, BESS subsystem 106 may be connected to PCS 104, such as shown by DC line 154 into PCS 104. Additional DC lines may be pre-wired to PCS 104 using DC line 160, which may connect additional DC input 144. As discussed in more detail below, FIGS. 5C, 5F, 6A, and 6B illustrate DC connectors, which are examples of inputting DC power generated by PV groupings and which are examples of additional DC input 144.

Finally, FIG. 1C illustrates AC bus 158, which may comprise a common AC bus for a plurality of devices, such as load (via load output 137), generator (via generator input 138), and additional AC input 140 (e.g., as discussed in more detail below, AC power may be generated by another container, such as a PCS in another container converting DC power from a PV subsystem and/or a BESS subsystem; the AC power may be routed to container 131 via additional AC input 140). An example of the AC bus 158 is illustrated in FIG. 6E, discussed further below. In one or some embodiments, the AC bus 158 may be electrically connected to earth ground via chassis ground connection 142, as shown in FIG. 1C.

FIG. 1D illustrates an example site configuration of the system depicted in FIG. 1C, including deploying PV subsystem 102 in the field, at the final site. It is noted that because of the pre-wiring, fewer connections are required. In fact, in one or some embodiments, only cabling 164 need be connected from deployed PV subsystem 102 to additional DC input 144 in order to route the DC power generated by the deployed PV subsystem 102 to PCS 104.

As mentioned above, the container may include one or both of an AC bus or a DC bus. FIGS. 1C-D illustrate AC bus 158, but no DC bus (instead, the DC power from BESS subsystem 106 and deployed PV subsystem 102 are separately input to PCS 104). Alternatively, both AC bus 158 and DC bus 168 may be pre-wired in container 131, such as illustrated in FIG. 1E. As such, both the power output from BESS subsystem 106 and the connector for additional DC input 144 may be electrically pre-wired via wiring 171 to DC bus 168, which is also pre-wired to PCS 104. Further, similar to AC bus 158, chassis ground connection 142 may be connected to DC bus 168 so that when chassis ground connection 142 is configured as shown in FIG. 6D (with an electrical connection to a stake in the earth).

FIG. 1F illustrates an example site configuration of the system depicted in FIG. 1E, including deploying PV subsystem 102 in the field, at the final site. Again, because of the pre-wiring, fewer connections are required. In fact, in one or some embodiments, only cabling 164 need be connected from deployed PV subsystem 102 to additional DC input 144 in order to route the DC power generated by the deployed PV subsystem 102 to DC bus 168.

Further, as discussed above, the container 131 may be tailored to various needs. In one or some embodiments, any one, any combination, or all of the PV subsystem 102, the BESS subsystem 106, or the PCS 104 may be resident within (and pre-wired) in the container 131. Alternatively, only two of PV subsystem 102, the BESS subsystem 106, or the PCS 104 may be resident within (and pre-wired) in the container 131. As one example, FIG. 1G illustrates that the container 131 may include only BESS subsystem 106 and PCS 104, without PV subsystem 102 being included in container 131 for transport. As another example, container 131 may include only PV subsystem 102 and PCS 104, without BESS subsystem 106 being included in container 131 for transport. This is illustrated in FIG. 1H, in which the PV subsystem 102 is deployed (as shown by arrow 178), with its DC power electrically connected via cable to additional DC input 144. Because PCS 104 is resident in container 131 in FIG. 1H, the DC power from PV subsystem 102 is converted into AC power, which may then be routed via AC output 180 to another container, such as by connecting a cable from AC output 180 to additional AC input 140 in FIG. 1G.

As still another example, container 131 may include only PV subsystem 102 and BESS subsystem 106, without PCS 104 being included in container 131 for transport (e.g., the DC power output from both PV subsystem 102 and BESS subsystem 106 may be routed to a container 131 with a PCS 104 included therein and with multiple additional DC input 144 connectors for electrical connection to the DC power output from both PV subsystem 102 and BESS subsystem 106; after which, PCS 104 may convert the DC power from PV subsystem 102 and BESS subsystem 106 into AC power).

Still alternatively, only one of PV subsystem 102, the BESS subsystem 106, or the PCS 104 may be resident within (and pre-wired) in the container 131. This is illustrated, for example, in FIGS. 1I, in which the PV subsystem 102 is deployed (as shown by arrow 183), with its DC power electrically connected via cable 185 to additional DC input 144. Because PCS 104 is not resident in container 131 in FIG. 1I, the DC power from PV subsystem 102 is routed via pre-wiring 184 to DC output 186, which may be routed to another container, such as by connecting a cable from DC output 186 to additional DC input 144 in FIG. 1G.

Figure 1J:
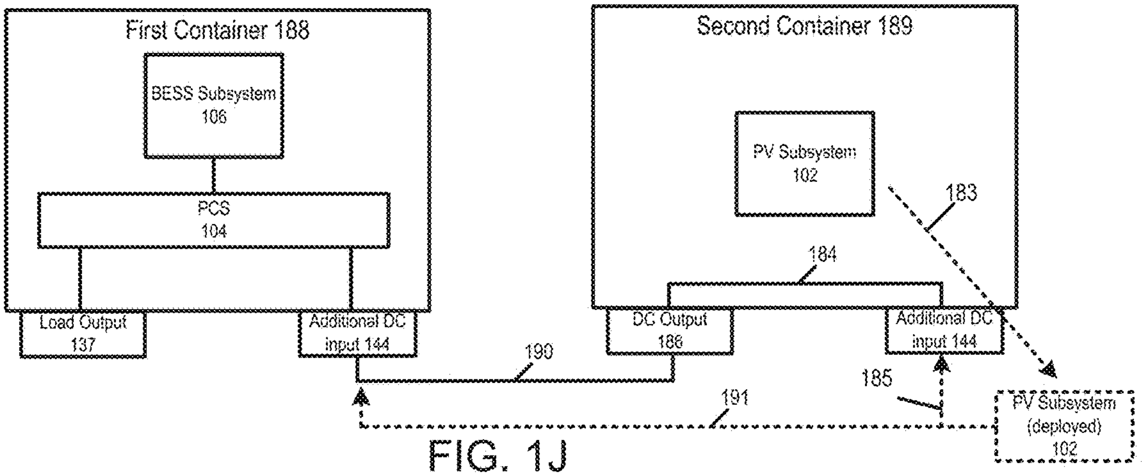

As discussed above, more than one shipping container may be used to ship the PV subsystem 102, the BESS subsystem 106, and the PCS 104. As one example, FIG. 1J illustrates a first container 188 that includes the BESS subsystem 106 and the PCS 104 and a second container 189 that includes the PV subsystem 102. In practice, the PV subsystem 102 may be deployed, as shown by arrow 183. After which, the DC power generated by the PV subsystem 102 may be routed to the PCS 104 in the first container in one of several ways. In one way, the DC power generated by the PV subsystem may be routed via the second container 189, such as via cable 185 to additional DC input 144, via pre-wiring 184 to DC output 186, and then via cable 190 between DC output 186 and additional DC input 144, ultimately being input to PCS 104. In another way, a cable 191 may be routed directly between the deployed PV subsystem 102 to additional DC input 144. In either instance, the DC power generated by the deployed PV subsystem 102 may be routed to the PCS 104. In this regard, FIG. 1J illustrates DC power being routed between containers.

Figure 1K:
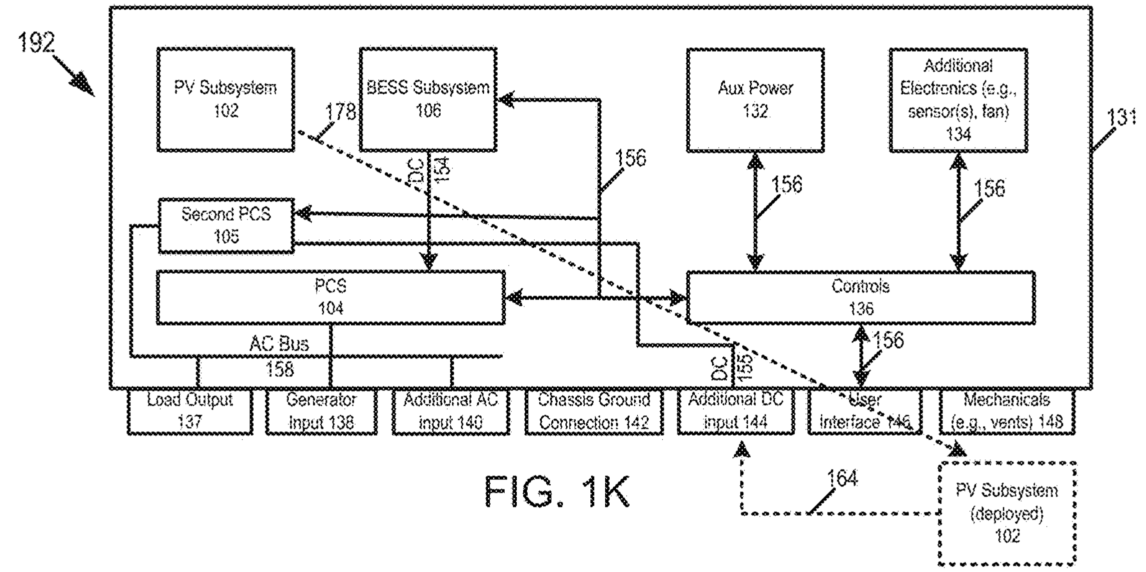
Figure 1L:
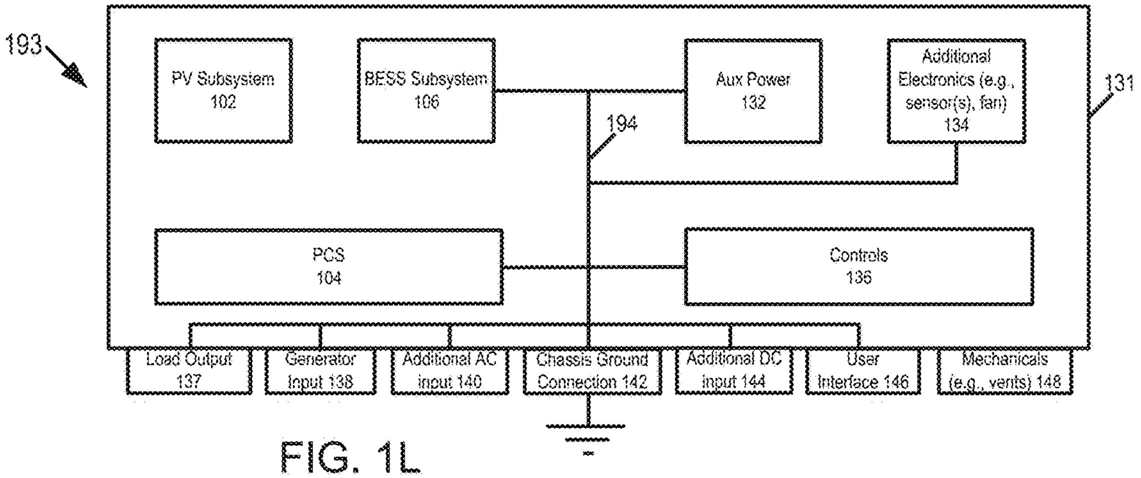
Figure 1M:
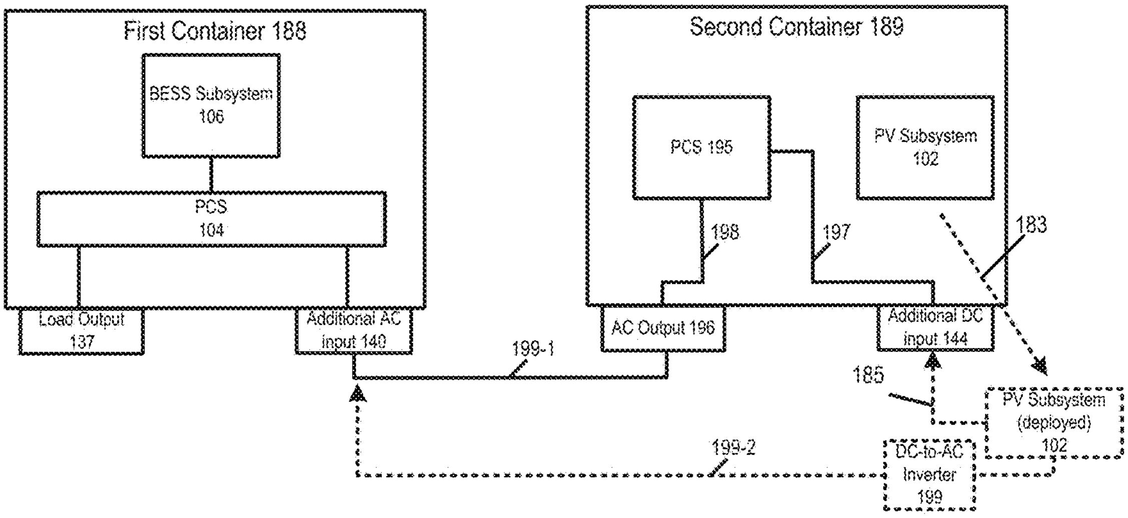

Alternatively, AC power may be routed between containers, such as illustrated in FIG. 1M. In particular, FIG. 1M illustrates second container 189 including inversion functionality, such as by including PCS 195. As shown, in a first instance, the PV subsystem 102 is deployed and connected via cable 185 to additional DC input 144. Due to prewiring, both of wiring 197 of the additional DC input 144 to PCS 195 and of wiring 198 of the AC output from PCS 195 to AC output 196. Thus, in this first instance, AC power may be output from second container 189 via AC output 196. At the deployment site, a cable 199-1 may be connected between AC output 196 and additional AC input 140 in order to route the AC power generated by PCS 195 to PCS 104. In a second instance, the DC power generated by the deployed PV subsystem 102 may be converted in the field (using DC-to-AC converter 199) to AC power. Thus, in this second instance, the PCS 195 is not necessary to convert DC power to AC power (since the AC power conversion is performed elsewhere). Rather, a cable 199-2 may be connected between DC-to-AC converter 199 and additional AC input 140 in order to route the AC power generated by DC-to-AC converter 199 to PCS 104.

As discussed above, more than one PCS may be included in the one or more containers. As one example, a single PCS may be included in multiple different containers. Alternatively, multiple PCSs may be mechanically supported within and electrically wired with a single container, such as shown in FIG. 1K. As shown, two PCSs (including PCS 104 and second PCS 105 are illustrated, with the additional DC input 144 being wired as a DC input to second PCS 105. In turn, the AC output of second PCS 105, which may be tailored to a PV application, is electrically pre-wired to AC bus 158. Thus, in practice, PV subsystem 102 from container 131 may be deployed, as shown in FIG. 1K, with a cable 164 connecting from the deployed. Further, second PCS 105 may be prewired via DC line 155 so that DC power generated by deployed PV subsystem 102 may be input to second PCS 105 via additional DC input 144. Further, controls 136 may be pre-wired to second PCS 105 in order to monitor and/or control second PCS 105 (e.g., similar to PCS 104). In turn, again due to prewiring prior to shipping, the output of second PCS 105 is electrically connected to AC bus 158. Thus, FIG. 1K is an example of an AC coupling (e.g., coupling via the AC bus 158).

As discussed above (and in more detail further below), the chassis may be used (along with pre-wiring) in order to provide earth ground to one or more devices within a respective container or for a device electrically connected to a respective container. For example, FIG. 1L illustrates wiring 194 electrically connects the chassis (a part of which may be the chassis ground connection 142) to various devices within the container, such as any one, any combination, or all of: PCS 104; BESS subsystem 106; Aux power 132; additional electronics 134; controls 136; or user interface 146.

As merely one example, FIG. 1L illustrates that BESS subsystem 106 is connected to chassis ground. The BESS may generally float (e.g., not be connected to ground); however, the racking that holds or houses the BESS may be grounded, such as having the mechanical structure supporting the BESS be connected to earth ground. Thus, in this embodiment, the BESS subsystem may include both the BESS and the mechanical structure (which is pre-wired to the chassis).

Further, chassis ground may be electrically connected to one or more inputs to container 131, such as any one, any combination, or all of: load output 137 (in order to provide earth ground to the load); generator input 138 (in order to provide earth ground to the generator, which provides generator power input to container 131); additional AC input 140 (in order to provide earth ground to the source of the AC input, such as PV power that is converted in the field (via local inverters) to AC power and routed to container 131); or additional DC input 144 ((in order to provide earth ground to device(s) that provide DC power, such as a deployed PV subsystem 102). Alternatively, one or both of the AC power or the DC power input to container 131 may be grounded elsewhere. Further, as discussed in more detail with regard to FIG. 6D, the chassis ground connection 142 may be electrically connected at the deployment site to a metallic stake, spike, or the like, which at the deployment site is inserted into the earth in order to bring chassis (and devices wired 194 to it) to earth ground.

In this regard, FIGS. 1B-M illustrate examples block diagrams of the ability to tailor the contents of the container(s), the pre-wiring of the container(s), and the functionality of the container(s) to suit the end-users needs. Various different needs are contemplated. Merely by way of example, in one or some embodiments, there may be different services provided within each of the spot generation configuration or the microgrid configuration. Based on the operational use cases, the spot generation configuration and/or the microgrid configuration may further be divided into multiple sub-configurations. See FIGS. 2A-E, 3A-B, and 4A-B. In particular, in one or some embodiments, there may be different constraints for one, some, or each of the sub-configurations, with the containers and the attendant control schemes tailored to the different constraints. As such, the controls may be configured in such a way that the system responds to some or all of the different sub configurations discussed below.

For example, FIGS. 2A-F illustrate different configurations in which spot generation may be deployed. In one or some embodiments, spot generation comprises a simple configuration that has a single source or a combination of sources but has only one output. The spot generation configuration may be designed in such a way that each generation unit (e.g., PV subsystem and/or BESS subsystem) may be deployed individually, or may be a combination of assets. The constraint on a spot generation is that it may have only one output, which may limit the configuration to a single asset of each type (e.g., PV subsystem, BESS subsystem, Generator unit). Various different sub-configurations in which a spot generation may be deployed are contemplated including any one, any combination, or all of: PV subsystem only; BESS subsystem only; PV subsystem+BESS subsystem; Generator+BESS subsystem; or PV subsystem+BESS subsystem+Generator.

Figure 2A:
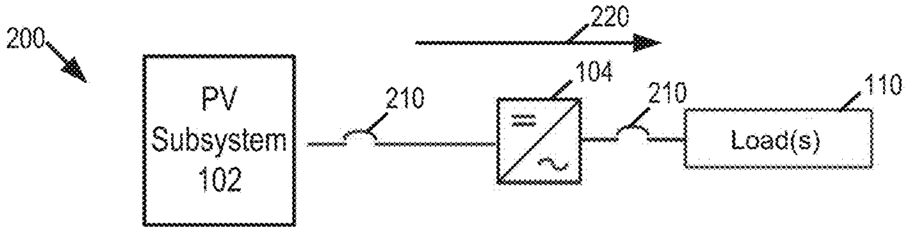
FIGS. 2A-F illustrate different configurations in which spot generation may be deployed.

The PV only configuration has a single solar unit as the source to provide power to small loads. FIG. 2A is a single-line diagram 200 for a PV-only configuration illustrating PV subsystem 102, breakers 210, PCS 104 and load(s) 110 with current flow 220.

Figure 2B:
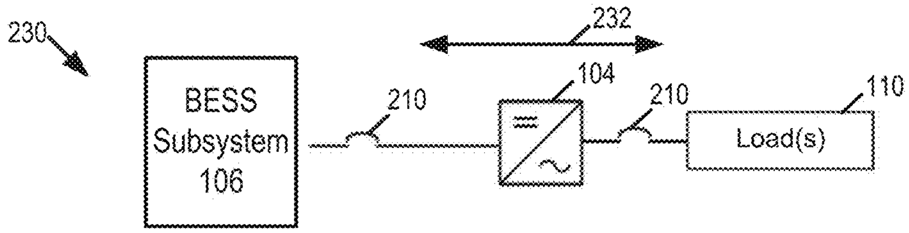

Similar to the PV-only configuration illustrated in FIG. 2A, FIG. 2B is a diagram 230 of the BESS-only configuration including a standalone battery energy storage system unit (BESS subsystem 106) as the source to power up the load(s) 110 with current flow 232.

Figure 2C:
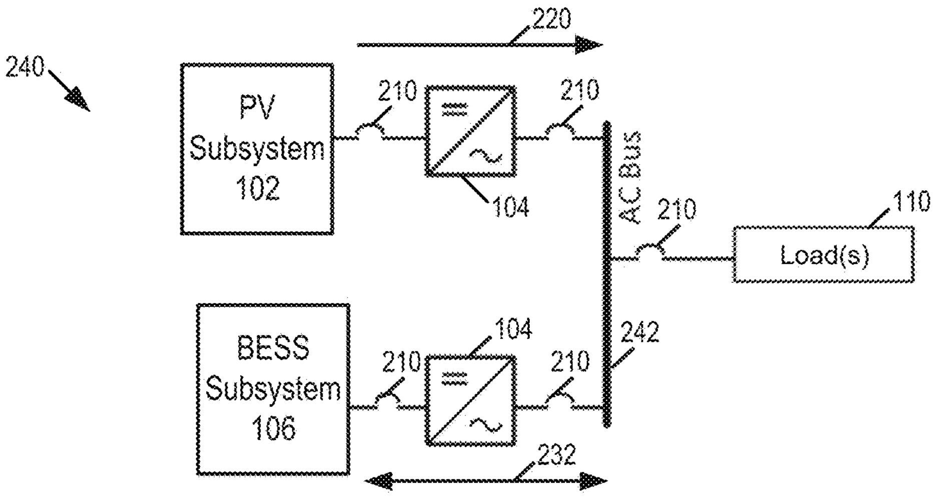
Figure 2D:
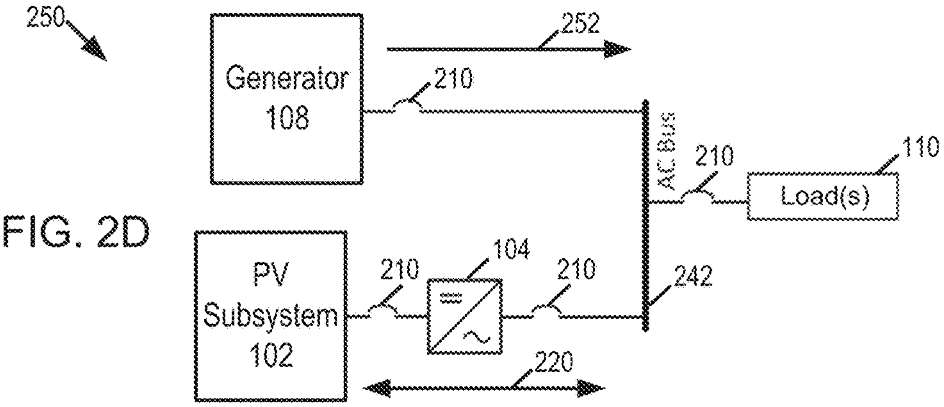
Figure 2E:
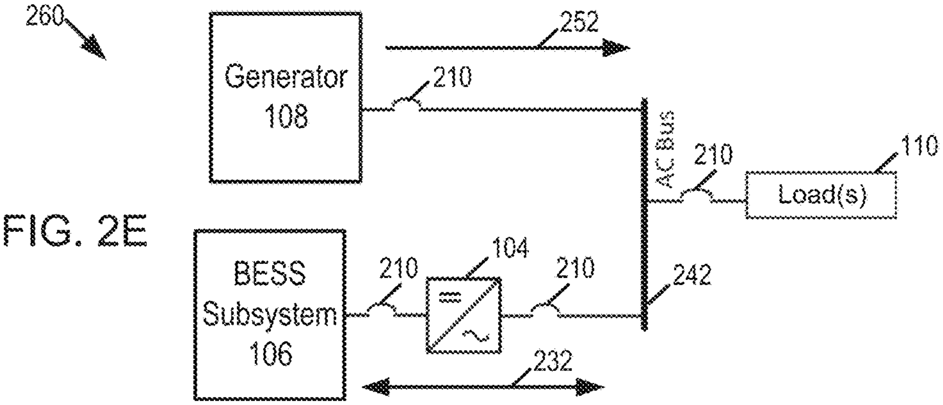
Figure 2F:
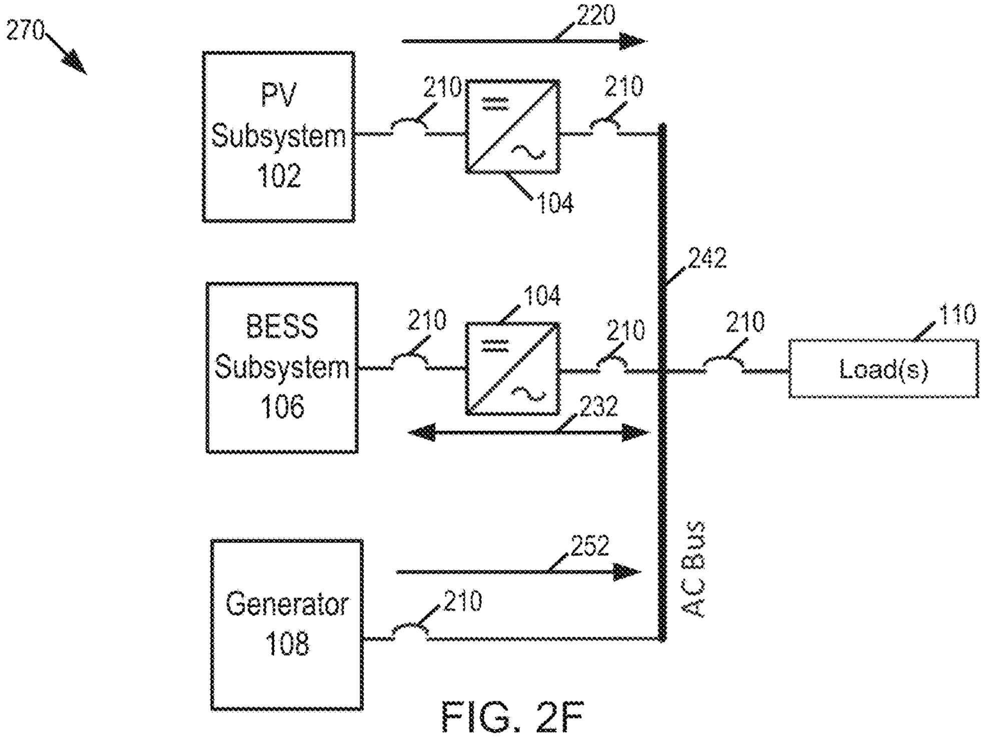
Figure 3A:
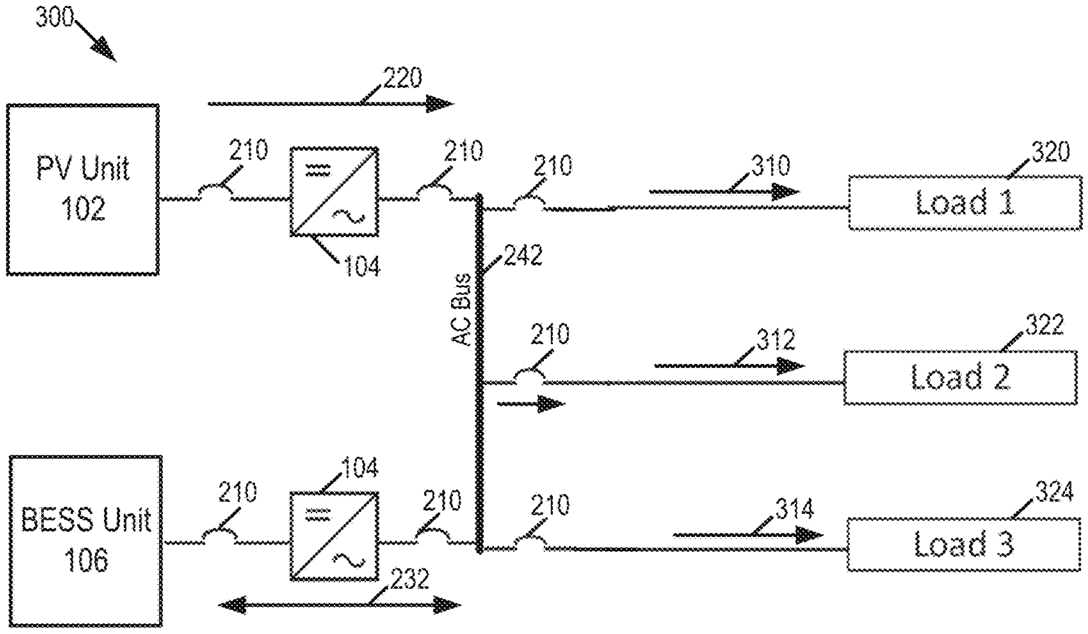
FIGS. 3A-B illustrate different central microgrid configurations, including without a generator (FIG. 3A) and with a generator (FIG. 3B).
Figure 3B:
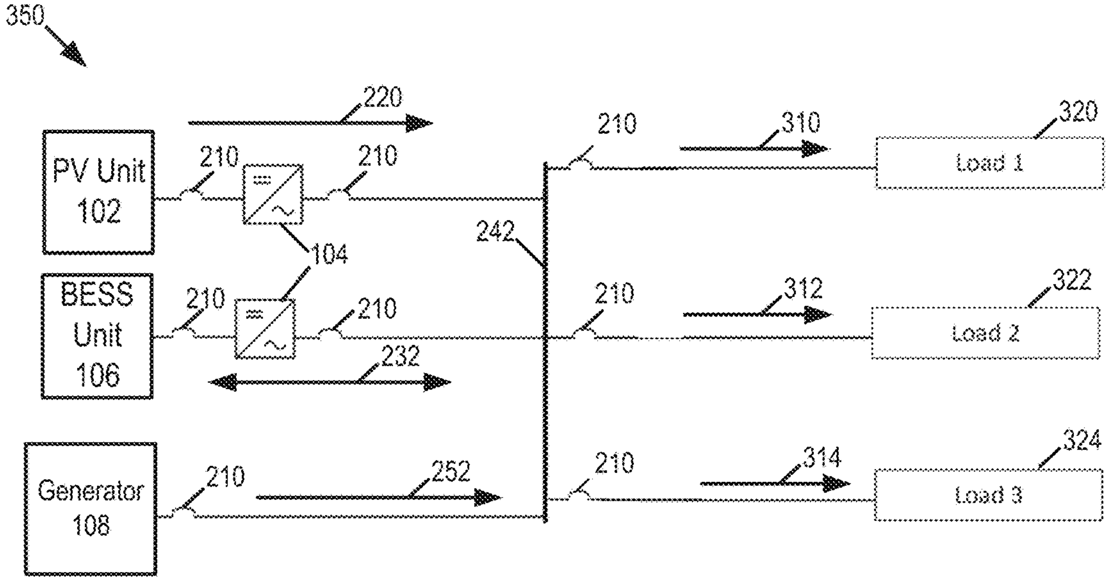

In one or some embodiments, the PV+BESS configuration comprises a combination of a single solar unit and a single energy storage unit. For example, FIG. 2C illustrates a diagram 240 of single PV subsystem 102 and single BESS subsystem 106 connected via AC bus 242 to load(s) 110. In one or some embodiments, AC bus 242 may comprise a bus in a microgrid. Alternatively, AC bus 242 may be connected to a utility grid in order to support one or more loads on the utility grid. In this way, excess solar power may be used to charge the battery unit and the battery unit may be utilized to complement the PV subsystem by discharging during low solar irradiance. In one or some embodiments, generator(s) 108 (with current 252 generated by generator 108) may be added to these configurations (see diagrams 250, 260, 270 in FIGS. 2D-F, respectively) such that power may be maintained during times when solar and energy storage are unavailable or insufficient. The generator(s) 108 may also be used to charge the BESS subsystem 106 during low solar irradiance. As such FIGS. 2C-F illustrate the single-line diagram for these configurations. Alternatively, multiple line configurations are contemplated. Further, spot generation or microgrids are contemplated configurations. For example, spot generation may comprise a system in which power source(s) are connected to load(s) via one electrical connection. See FIG. 2F.

Though not illustrated in FIGS. 2A-F, one or more safety mechanisms may be used to address associated risks with power generation systems (batteries, electrical, environmental, etc.). As one example, embedded within the PCS may comprise one or more safety mechanisms, such as any one, any combination, or all of contactors, breakers, or fuses.

As discussed above, a Microgrid configuration alternatively may be used, such as for a more resilient power grid. In this way, the use of the renewable power generation assets and fuel reserves may be optimized. A microgrid configuration can be classified as either a central microgrid (see FIGS. 3A-B) or a distributed microgrid (see FIGS. 4A-B). For example, the microgrid configuration need not include a generator 108 (see diagram 300 in FIG. 3A in which currents 310, 312, 314 flow to respective loads 320, 322, 324) and with a generator 108 (see diagram 350 in FIG. 3B).

In a central microgrid configuration (such as illustrated in diagrams 300, 350), power generation assets may be in a centralized location and may have a single Point of Interconnection (POI) to the existing electrical grid. While such a configuration may be optimal for space considerations, there remains a single point of failure at the POI.

Figure 4A:
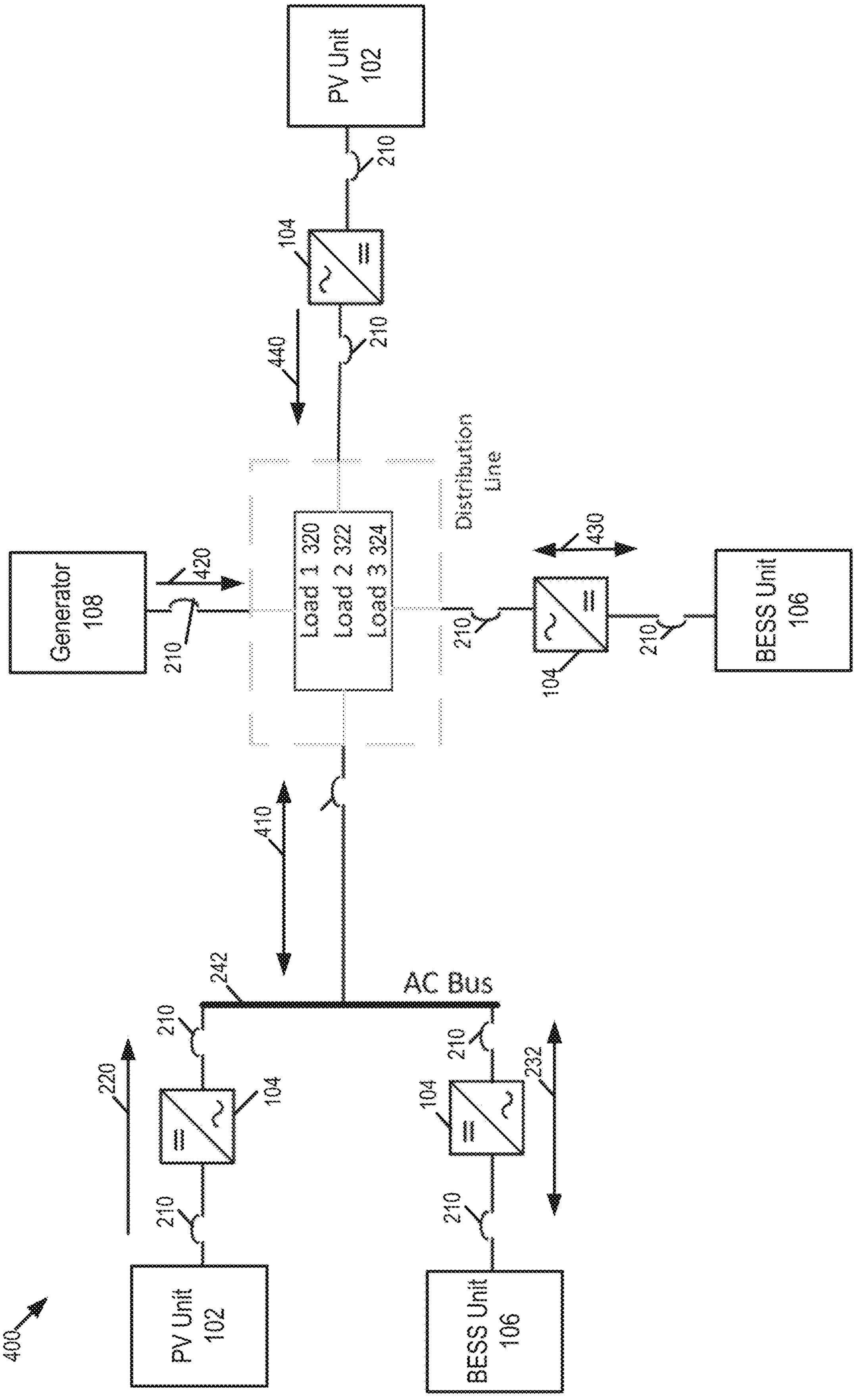
FIG. 4A illustrates a first example of a distributed microgrid configuration.
Figure 4B:
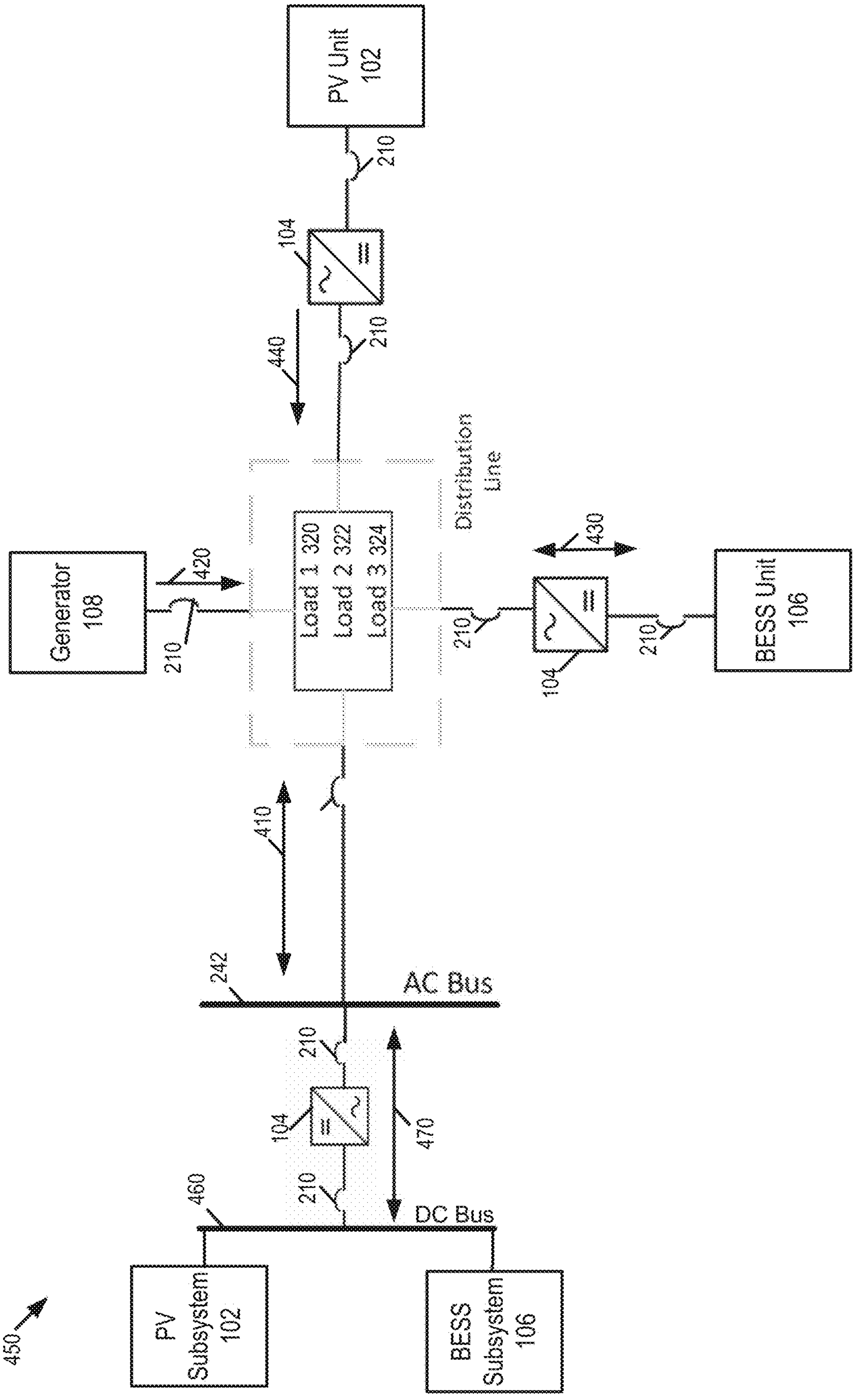
FIG. 4B illustrates a second example of a distributed microgrid configuration.

In a distributed microgrid configuration (illustrated in diagram 400 in FIG. 4A and diagram 450 in FIG. 4B), the generation units may be physically distributed across an entire location and may be connected such that there is no longer a single point of failure (see currents from AC bus 242 (410), from generator 108 (420), from BESS subsystem 106 (430) and PV subsystem 102 (440)), therefore creating a more reliable source of power, which may prevent power outages during asset maintenance or failure. More specifically, FIG. 4A illustrates a microgrid configuration with an AC bus 242, whereas FIG. 4B illustrates a microgrid configuration with both an AC bus 242 and a DC bus 460 (e.g., DC output from PV subsystem 102 and DC output from BESS Subsystem 106 are each routed to DC bus 460, which in turn is converted to AC using PCS 104). As shown, each of FIGS. 2A-F, 3A-B, and 4A-B are example configurations. Other configurations are contemplated. Further, the configurations may allow for resiliency and redundancy, such as through the use of any one, any combination, or all of: bypass diodes; multiple solar strings; multiple PCSs; or the PV subsystem(s) (e.g., flexible, non-glass solar panels).

In one or some embodiments, the mobile power system may operate under one or more constraints, including constraints to any one, any combination, or all of: the PV subsystem; the BESS subsystem; or the generator system. Further, there may be failure modes within the overall system, such as any one, any combination, or all of: communication failure (e.g., PCS/human machine interface (HMI) communication); system availability (e.g., BESS at minimum or maximum state of charge; low fuel for generator; low solar irradiance); system failure (e.g., equipment failures); system stability (e.g., stability in one or both of Voltage and Frequency).

With regard to PV constraints, the PV subsystem may be constrained by any one, any combination, or all of: low solar irradiance; PCS rating; PV losses (e.g., resistive loss due to impedance on the power cables or efficiency of the PCS); or equipment loss (e.g., PCS, PV modules, and/or junction box). The PV losses may begin at the AC PCS terminal through the POI and may be a combination of fixed power losses and losses proportional to the power output (e.g., resistive or impedance losses). Other losses in a PV subsystem may include any one, any combination, or all of: soiling loss (e.g., loss due to snow, dirt, dust and other particles on a PV module); DC wiring loss (e.g., loss caused by ohmic resistance of the cabling that interconnects PV devices and strings); light induced degradation of PV modules over time; or thermal loss (e.g., loss due to difference between cell temperature and ambient temperature).

For example, PV losses may be represented by:

$$\text{PV Losses}=(\text{Fixed Aux Power})+R\mathbf{33}\ \text{PV} \quad (1)$$

where Fixed Aux Power is the auxiliary power required to run the sub systems such as PCS, controllers, and breakers; R is the system resistive or impedance loss; and PV is power output from PV subsystem. The total PV Output Power at a given time may be a function of weather minus the PV Losses specified above, such as shown below:

$$\text{PV Output Power}=\text{Fn(Weather)}-\text{PV Losses} \quad (2)$$

With regard to BESS, the constraints may include any one, any combination, or all of: battery charge or discharge limit (e.g., the BESS charging and discharging may be subject to power limit constraints and may be defined based upon the chemical and mechanical makeup of the battery module itself); battery State of Charge (SOC) (e.g., the fraction of the total energy or battery capacity that has been used over the total available from the battery, expressed as a percentage; it is noted that the total available energy may diminish over the life of the battery; battery charge or discharge loss; or efficiency.

Further, power from the BESS may be considered positive if BESS is providing power to the load (e.g., discharging), and negative when storing power (e.g., charging). The BESS contribution to energy flow has associated constraints when discharging and/or charging. For discharging:

$$P_{BESS} < \text{Max Discharge Limit, positive values are discharging} \quad (3)$$

$$P_{BESS} < (SOC - SOC_{Min}) \times CA / (\text{Time Period}) \quad (4)$$

For Charging:

$$P_{BESS} > \text{Max Charge Limit, negative numbers are charging} \quad (5)$$

$$P_{BESS} > (SOC - SOC_{Max}) \times CA / (\text{Time Period}) \quad (6)$$

$$SOC = \text{Energy Stored}/\text{Energy Capacity} \quad (7)$$

$$CA = Cap \times (1 - \theta CapacityLoss)) \times \eta ESS \quad (8)$$

where CA is the capacity available in the BESS in kWH; Cap is the actual energy capacity [kWh]; $P_{BESS}$ is the BESS power in kW (positive value is for discharge, negative value is for charge); θCapacityLoss is the capacity difference due to operating at a C-rate different from the Standard Test Condition (STC); C-rate is the measurement of current in which a battery is charged and discharged at; ηBESS is the charge or discharge efficiency=(1−Internal Losses) and may be adjusted as a function of the C-rate; Max Discharge limit is the maximum BESS discharge capacity; and Max Charge limit is maximum charge the BESS may absorb.

In one or some embodiments, the SOC value may be communicated from the Battery Management System (BMS). The change in the SOC with a time step may be estimated as:

$$\Delta SOC = BESS / [Cap \times (1 - \theta CapacityLoss) \times \eta BESS / (\text{Time Period})] \quad (9)$$

The total dischargeable energy, at a constant rate, may be represented by:

$$Cap \times (1 - \theta DischargeLoss) \times \eta BESS\_Discharge \quad (10)$$

The Round-Trip Efficiency (RTE) of the BESS may be represented by:

$$\eta BESS\_Charge \times \eta BESS\_Discharge \times (1 - \theta DischargeLoss)/(1 - \theta ChargeLoss) \quad (11)$$

With regard to the generator constraints, generator efficiency may be primarily constrained by any one, any combination, or all of: the fuel efficiency; iron loss (e.g., hysteresis and eddy current losses); frictional loss (e.g., loss due to friction in the moving parts); or copper losses (e.g., power lost as heat in the windings). The total energy output (kWh) from a generator may be represented by:

$$E = P \times h \times d \quad (12)$$

The total consumption of fuel (F) may be represented by:

$$F = E \times C \quad (13)$$

where P is the active power kW; h is the number of hours the gent set runs; d is the number of days; E is the energy output (kWh); and C is the fuel consumption per kWh.

As discussed above, one aspect comprises pre-configuring the container with one or more external interfaces, such as any one, any combination, or all of: a user interface (e.g., a touchscreen); an AC input connector (e.g., to receive AC power generated by a generator); an AC output connector (e.g., to drive a load); a DC input connector (e.g., to receive DC power generated by a PV subsystem); or a DC output connector (e.g., the transfer DC power to a second container for AC conversion by a PCS resident in the second container).

FIG. 5A is a representation 500 of a closed container 501 in which BESS(s) subsystem and one or more PCSs are enclosed. As discussed above, various electronic devices may be transported within a container 501, such as illustrated in FIG. 1B. Further, as discussed above, one or more sides of the container 501 may include one or more interfaces. An example of a plurality of interfaces 504 are shown on side 502. The interfaces 504 are discussed in more detail in FIG. 5E.

FIG. 5B is a representation 510 of the container 501, with one or more doors removed from its hinges 529 showing the enclosed BESS subsystem(s) 512, PCS(s) 516, Aux power and controls in 518 (although it is contemplated that Aux power and controls may be housed in separate containers), and one or more sensors 514 (such as a power meter, which may be integrated within and pre-wired for wired communication with controls 518 and/or PCS 516; alternatively, power meter may have a previously installed wireless transceiver, which upon activation at the deployment site, wirelessly transmits to controls 518 and/or PCS 516). In one or some embodiments, multiple PCS s 516 may be included within a container, thereby enabling the system to provide 50% capacity if one PCS fails. Further, FIG. 5B illustrates multiple strings of batteries (MIL-PRF-32565), which may be divided per PCS, with four strings per BESS subsystem 512 in a respective container. In one or some embodiments, the batteries may be configured within container 501 in stackable racks, such as illustrated in FIG. 5B. Further, the BESS subsystem 512 may be mechanically supported or contained within one or more structures 522, 524, 526, such as illustrated in FIG. 5B. In one or some embodiments, there are a plurality of batteries per string (e.g., at least 30 batteries in a string), with the system still providing 75% capacity should one module or string incur damage. For example, it is contemplated that the batteries may be connected in a variety of configurations, such as in series and/or in parallel in order to accomplish the desired power and/or energy levels. Similarly, PCS 516 may be supported or contained within one or more structures 528, such as illustrated in FIG. 5B.

In one or some embodiments, the container may comply with military standards for military packaging, military preservation, and/or military packing. In addition, in one or some embodiments, the container is ⅓ of a standard 20 ft ISO container. Further, container may include one or more sets of doors, such as three sets of doors.

As discussed above, the chassis of the container may provide a conduit to earth ground, with prewiring of the devices in the container connected to the chassis, and a part of the chassis in turn being connected to earth ground at the site. FIG. 5B illustrates an example of the part of the chassis 520 that another electrically conductive device may be electrically connected to (see FIG. 6D in which metal connector 668 is connected to chassis 666 via a metal bolt 670, and with metal stake 674, electrically connected to metal connector 668, being driven into the earth to effect the earth grounding).

In one or some embodiments, the container may be configured such that devices contained therein may generate sufficient power (e.g., at least 50 kW; at least 100 kW; at least 200 kW; at least 500 kW; at least 1 MW; etc.) when transported to the site while still being easily transportable. Thus, in one or some embodiments, the container may conform to standard ISO, DOT, MILSPEC containers for shipping. Further, as shown in FIG. 5B, the PCS units for the batteries may be packaged within the same container as the storage system to minimize the count of equipment shipped and deployed.

Similarly, the PV subsystem may be transported in containers (e.g., PV containers), such as illustrated in FIGS. 5C-D. Specifically, FIG. 5C is a representation 538 of a closed container 531 in which PV subsystem(s) 540 are enclosed therein. As discussed above, one or more sides of the container (such as a PV container 531) may include one or more interfaces. An example of a plurality of interfaces 534 are shown on side 532. The interfaces 534 are discussed in more detail in FIG. 5F. FIG. 5D is a representation 538 of the container 531, with a door removed to show the PCS 516 and the enclosed PV subsystem(s) 540 packaged therein, with one or more mechanical structures 542.

In one or some embodiments, the PV subsystems, shown as PV panels, may be folded up and placed inside of a container 531 (see FIG. 5D), which enables a unique type of packaging for easy transportation the PV subsystems while allowing for rapid deployment, packing, and re-deployment. As discussed above, the PV panels selected may include one or more qualities, separate from the ability to fold into container 531, such as laminated or glassless solar panels. Further, in one or some embodiments, the PCS units for the PV subsystem may be packaged in the same container as the folded PV panels during shipment, as shown in FIG. 5D. For example, two PCSs may be included in container 531, such that the system can continue to provide output power if one fails. Finally, the PV subsystems, similar to the BESS subsystems, may be more ruggedized and thus be able to withstand harsh environments and may be transported frequently over difficult terrain.

FIG. 5E shows one side 502 of the exterior of the container 501 depicted in FIG. 5A with interfaces 504. As shown, one or more vents 564, 566, 568, 570 may be included on the side 502. In one or some embodiments, vents 566 and 568 are the inlet and vents 564 and 570 are the outlet, so that, working with the fan control by the control electronics, may cool the electronics within the container, such as the PCS as it heats up when performing the DC-to-AC conversion.

Further, a user interface 550, which may comprise a touchscreen, may be included on the side 532. Thus, user interface 550 may comprise a human machine interface (HMI), which may be for control and/or monitoring of the system. In one or some embodiments, the user interface 550 may include a plurality of different pages or screens, with the different pages or screens including, for example, an amount of power generated by system; system faults; or system control (e.g., to provide the auxiliary power without a generator or without an external grid; performing blackstart in which the system is started or restarted). For example, the UPS may be used to perform blackstart, as discussed above.

Further, an additional user interface 551, which may comprise a circuit breaker, may be used to inform the user of status within the container. As discussed above, user interface 550 may be pre-wired to control electronics, such as 138. In addition, side 502 may include one or more AC connectors (e.g., one or more AC output connectors and/or one or more AC input connectors) and/or one or more DC connectors (e.g., one or more DC output connectors and/or one or more DC input connectors). As shown in FIG. 5E, AC connectors 552 (which are depicted as a row of 5, which may correspond to the 4 rails for the AC bus (e.g., Line 1, Line 2, Line 3, and neutral)) may comprise the AC connectors for the load output (e.g., load output 137), which may be pre-wired to the PCS 516 contained within the container 501. Also, AC connectors 554 (which are depicted as the shape of a pentagon) may comprise the AC connectors for the generator input (e.g., generator input 138), again which may be pre-wired to the PCS 516, such as via an AC bus resident within the container 501. FIG. 5E further depicts 4 sets of AC connectors 556, 558, 560, 562 (which are each depicted as the shape of a pentagon) and may comprise the AC connectors for the AC input (e.g., additional AC input 140), similarly pre-wired to the PCS 516, such as via an AC bus. Thus, the side 502 may be configured in one of several ways.

FIG. 5F shows one side 532 of the exterior of the container 531 depicted in FIG. 5C with interfaces 534. As shown, one or more vents 564, 566, 568, 570 may be included on the side 532. Further, a user interface 550, which may comprise a touchscreen, may be included on the side 532. As discussed above, user interface 550 may be pre-wired to control electronics, such as 138. In addition, side 532 may include one or more AC connectors and/or one or more DC connectors. Separate from the AC connectors 552 for the load output (e.g., load output 137) and separate from the AC connectors for the AC input (e.g., for generator input (see generator input 138) or for additional AC input (see additional AC input 140)), side may include one or more DC connectors (e.g., one or more DC output connectors and/or one or more DC input connectors). For example, DC connectors 580 may comprise the DC connectors for the DC input (e.g., additional DC input 144), which may be pre-wired to the PCS 516 contained within the container 531 (e.g., either directly input to the PCS 516 or via a DC bus resident within the container). FIGS. 6A-B are representations 600, 630 of a PV subsystem 620, 622 deployed and the container 531 connected thereto. As shown, cables 610, 612 from each PV subsystem 620, 622 connect the PV subsystem 620, 622 to a respective DC connector 580.

As shown, FIG. 6C is a representation 650 of a container 531, with the doors 663 open and the PV panels 640 removed. In one or some embodiments, each container, such as containers illustrated in FIGS. 5A-F, when fully loaded may be less than 10,000 lbs.

As shown in FIGS. 5D, the containers 531 may include both the PV subsystem and the PCS. One example of the PCS is illustrated in FIG. 6C, which includes the PCS(s) 660, and AC bus box 661 (e.g., an example of the AC bus, which may comprise the electronic device at which all of AC lines are connected together). Further, FIG. 6C illustrates two PCS 660, which is in contrast to typical containers that separate the PV panels and the PCS(s) into different containers. The container 531 that includes both the PV panels 640 and the PCS(s) 660 may allow for easier deployment for multiple reasons. First, the PV panels 640 may be deployed proximate to the container 531 (such as illustrated in FIGS. 6A-B and 9A-B). In this way, the container 531, which includes the PCS(s) 660, may enable easier configuration since the PCS(s) are already proximate to the PV panels 640. Second, the PCS(s) 660 may be integrated, such as one or both of mechanically or electrically, with container 531, as discussed above. Mechanically, the container 531 may include one or more structures to support the PCS(s) 660 both in transit as well as after configuration. Electrically, the container 531 may include various wiring, such as ground wiring 664 to ground the PCS(s) 660. In one or some embodiments, the ground wiring 664 is connected to the chassis 666 of the container. In turn, to electrically connect the chassis to earth ground, a metal connector 668 may be connected to the chassis 666 via a metal bolt 670 or the like.

Further, the metal connector 668 may be preconnected to a metal wire 672, which is electrically connected to a metal stake 674, which may be driven into the earth to effect the earth grounding.

PCS 660 may further generate an AC output, which may comprise one or more lines. As one example, PCS 660 may generate a 4-line output for an AC bus, with 4 of the lines corresponding to the rails 680, 682, 684, 686 and comprising Line 1, Line 2, Line 3, and neutral, as illustrated in FIG. 6E. In this regard, rails 680, 682, 684, 686 may be mechanically mounted to the chassis, but are electrically isolated from the chassis. As discussed above at length, the container may be prewired. An example of the prewiring is shown via wires 694 with regard to the AC bus.

In one or some embodiments, the exposed ground pad may be integrated with the container 501, 531, and may be an exposed part of the chassis of the container 501, 531. In practice, after removing of the PV subsystem 620, 622 (see FIGS. 6A-B and 7A-B), the PV subsystem via wiring, such as cables 610, 612 may be electrically connected to the PCS(s) 660, such as via connecting the wiring that carries the DC power output of the PV subsystem 620, 622 to input electrical connector 665, so as to input DC power to PCS(s) 660. See FIG. 6D. Similarly, the output of the PCS(s) 660 may output AC power, such as to load(s) or to a larger grid. In this regard, in one embodiment, the AC load may comprise a microgrid. Alternatively, the AC load may comprise a utility power grid (e.g., the utility power grid may be electrically connected to the AC bus discussed herein. Wiring may be connected to the output electrical connector 667 (which is an example of AC output 180) in order for the wiring to carry the AC output generated by the PCS(s) 660 to another device, such as central container 960, discussed further below. Further, the exposed ground pad (which may be part of chassis 666), which is already connected to PCS(s) 660 via ground wiring 664, may be exposed, such as by opening the door 662. See FIG. 9A. After which, the exposed ground pad may be staked into Earth ground in order to ground the PCS(s) 660. In this way, the pre-wiring and the ease of connecting the cables to the connectors reduces or eliminates incorrect connections.

As discussed above, the power from various sources, such as the different sets of PV panels (see FIGS. 9A-B) may be routed to a central location. The central location may include a central system control and a plurality of batteries 690, an example of which is illustrated in the representation 671 in FIG. 6E. Specifically, FIG. 6E illustrates a container with the top removed showing batteries 690 and an AC rail system. The AC rail system may include a plurality of rails, such as 4 rails shown in FIG. 6E including rails 680, 682, 684, 686 for phase 1, phase 2, phase 3, and neutral, respectively. In practice, in addition to the 4 rails, a ground wire (e.g., to Earth ground) may be included. In one or some embodiments, part or all of the AC rail system, including one, some, or each of rails 680, 682, 684, 686 may be mechanically and/or electrically integrated with the respective container 692, part of which is shown in FIG. 6E.

The exact dimensions and type of container for the PV and the BESS may vary. In one or some embodiments, the size, weight, packaging, and integration methods for each of the containers (such as the containers for the BESS subsystem or for PV subsystem) may be unique. Alternatively, the containers transporting BESS subsystems and PV subsystems, such as illustrated in FIGS. 5A-F, may be identical in their overall dimensions.

Thus, as shown in FIGS. 5B and 5D, the BESS subsystem and the PV subsystem may be transported separately in separate containers. Alternatively, the BESS subsystem, the PV subsystem, and PCS(s) may be shipped and/or integrated together within a single container, as discussed above.

Figure 7A:
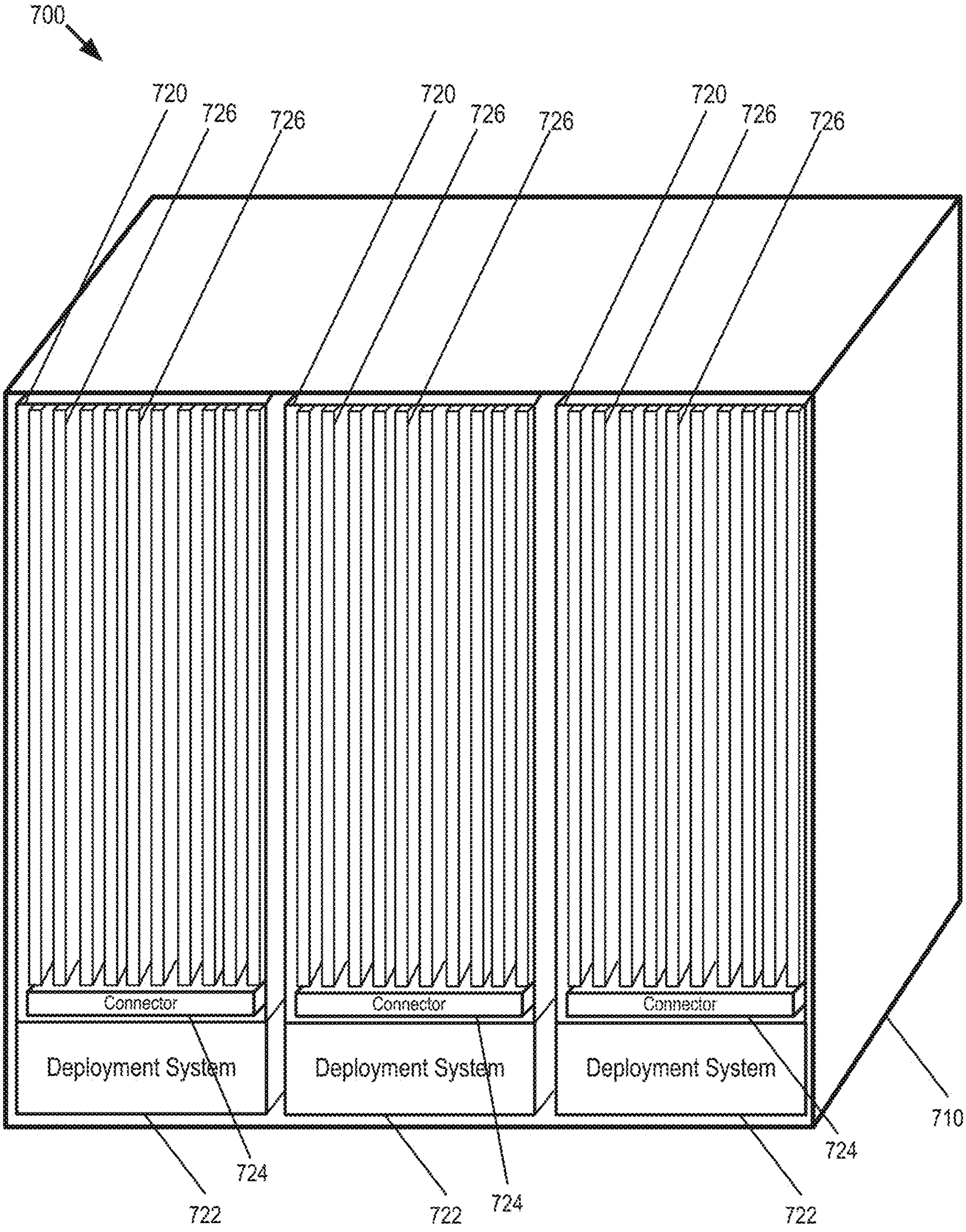
FIG. 7A is a representation of a container, with the doors removed, illustrating three sets of: PV subsystems, a deployment system, connector to connect the deployment system to the PV subsystems, and overall structure for the respective set.

As discussed above, in one embodiment, the container 710 has each respective set of PV subsystem 726 with an associated deployment system 722 (illustrated in FIG. 7A). Alternatively, fewer than all of the sets of PV subsystem 726 have an associated deployment system 722 (illustrated in FIG. 7B). In particular, FIG. 7A is a representation 700 of a container 710, with the doors removed, illustrating three sets of: PV subsystem 726, a deployment system 722, connector 724 to connect the deployment system 722 to the PV subsystem 726, and overall structure 720 for the respective set. In one or some embodiments, a single container may include a plurality of sets of PV subsystem, such as illustrated in FIG. 8C. In practice, a respective PV set may be removed one at a time from the container, such as illustrated in FIG. 8C. Various ways are contemplated to remove the respective PV set, such as via a wheel-based system or a track-based system, including a deployment system 722.

In one or some embodiments, the deployment system 722 is mechanically connected, via connector 724, to the set of PV subsystem 726 while the container 710 is in transit. Alternatively, the deployment system 722 is not mechanically connected to the set of PV subsystem 726 while the container 710 is in transit. Rather, after arrival at the site, the deployment system 722 is mechanically connected, via connector 724, to the set of PV subsystem 726. Regardless, after the deployment system 722 is mechanically connected to the set of PV subsystem 726, the devices connected within overall structure 720, including deployment system 722, connector 724, and set of PV subsystem 726, may be removed from container 710 via the deployment system 722 and one or more rails, discussed further with regard to FIGS. 7C-D.

Figure 7B:
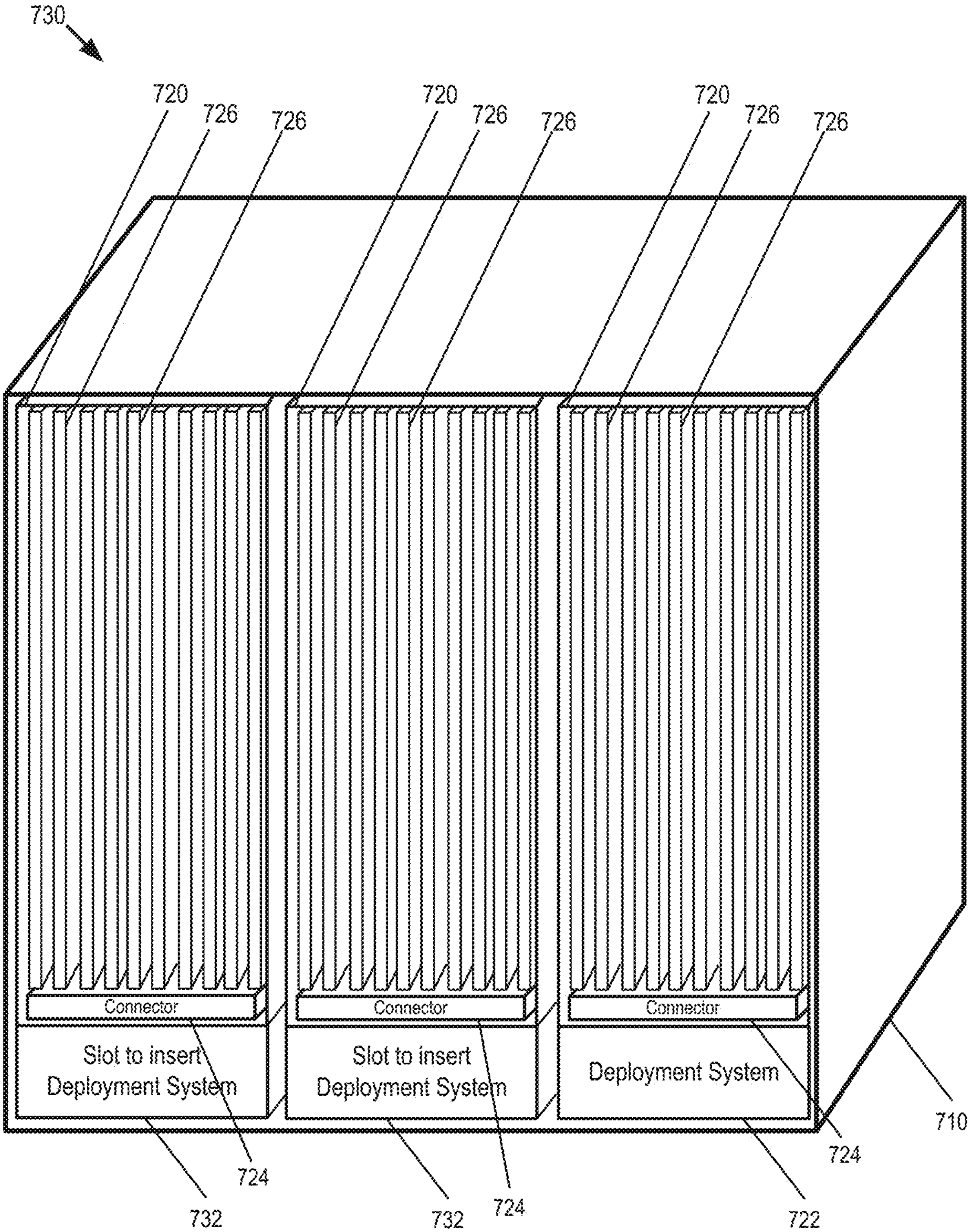
FIG. 7B is a representation of a container, with the doors removed, illustrating one set of a PV subsystem, a deployment system, connector to connect the deployment system to the PV subsystems, and overall structure for the one set, and two additional sets of PV subsystems, a slot for the deployment system, connector to connect the deployment system to the PVs (when the deployment system is inserted into the respective slot), and overall structure for the respective set.
Figure 8A:
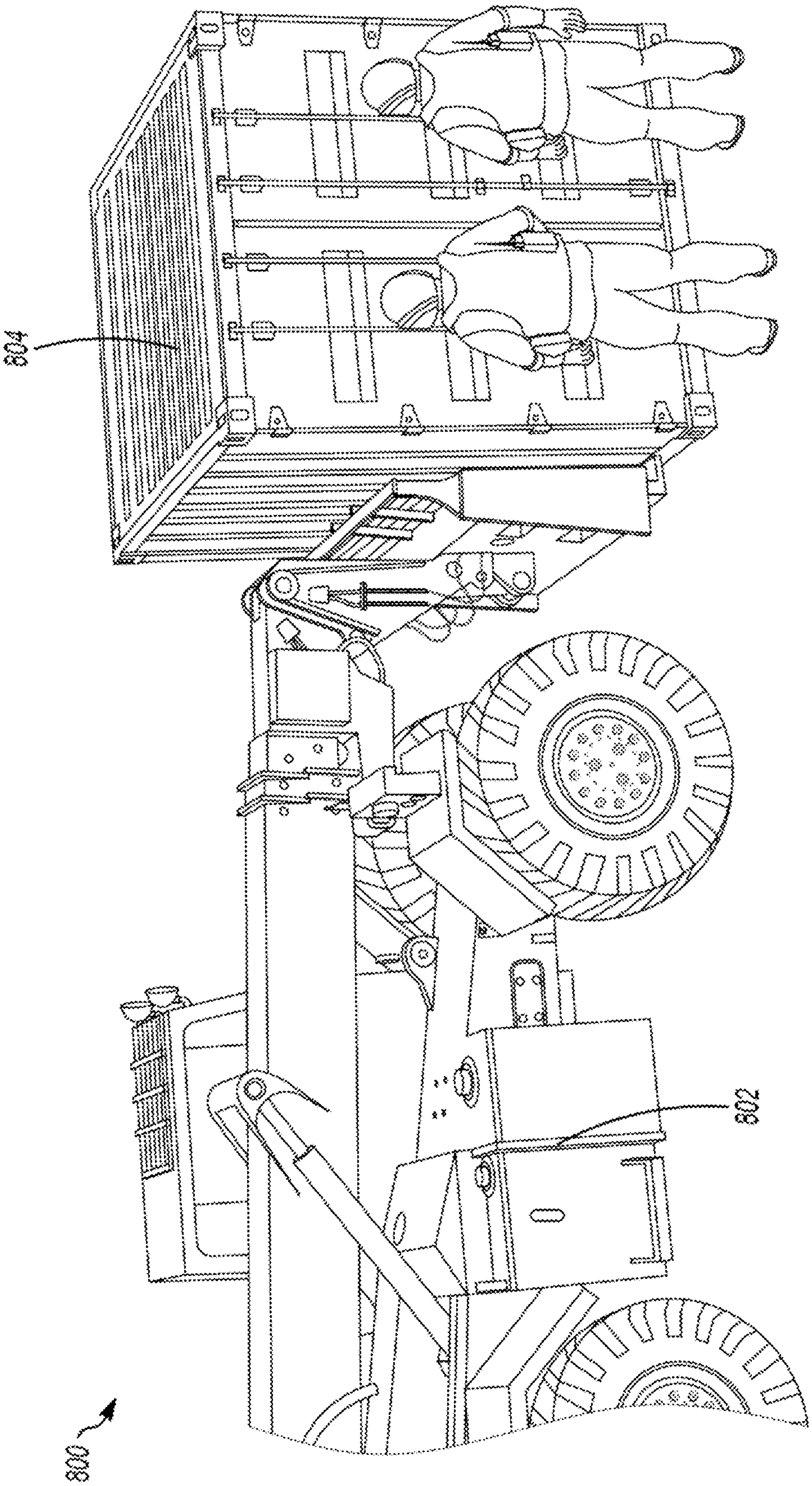
FIGS. 8A-E are a series of representations illustrating an example deployment of the container or deploying the PV subsystem.
Figure 8B:
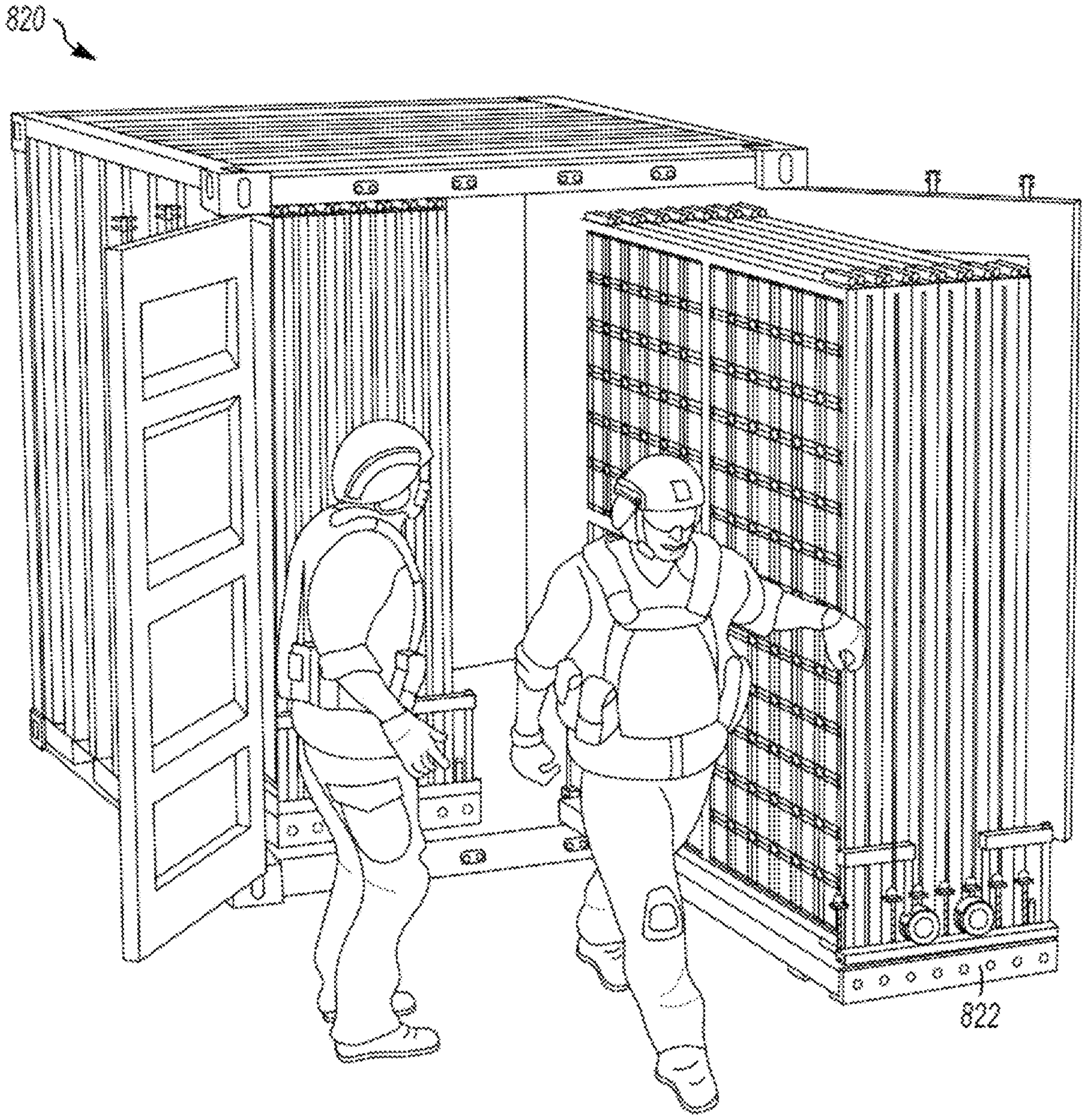
Figure 8C:
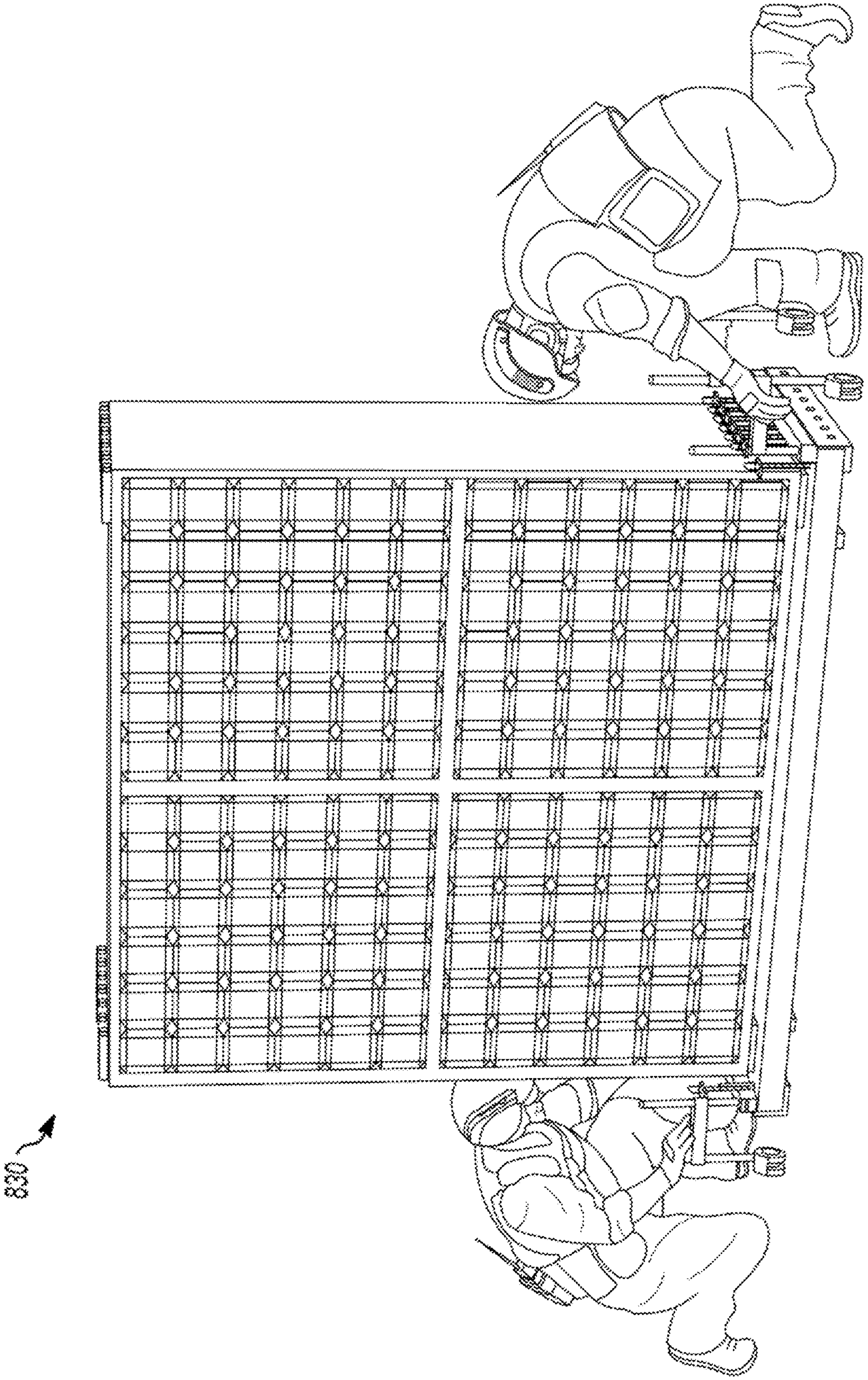
Figure 8D:
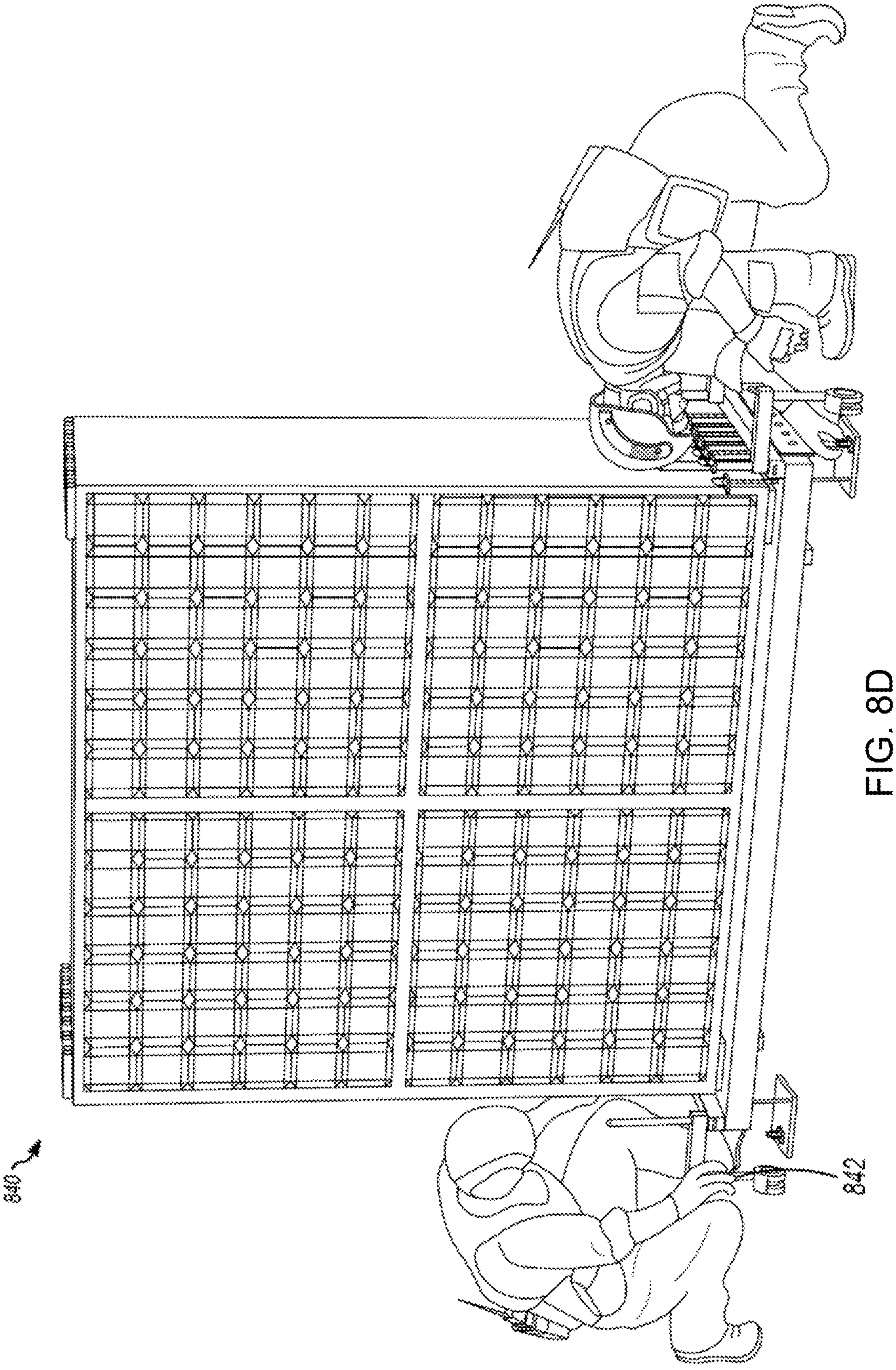
Figure 8E:
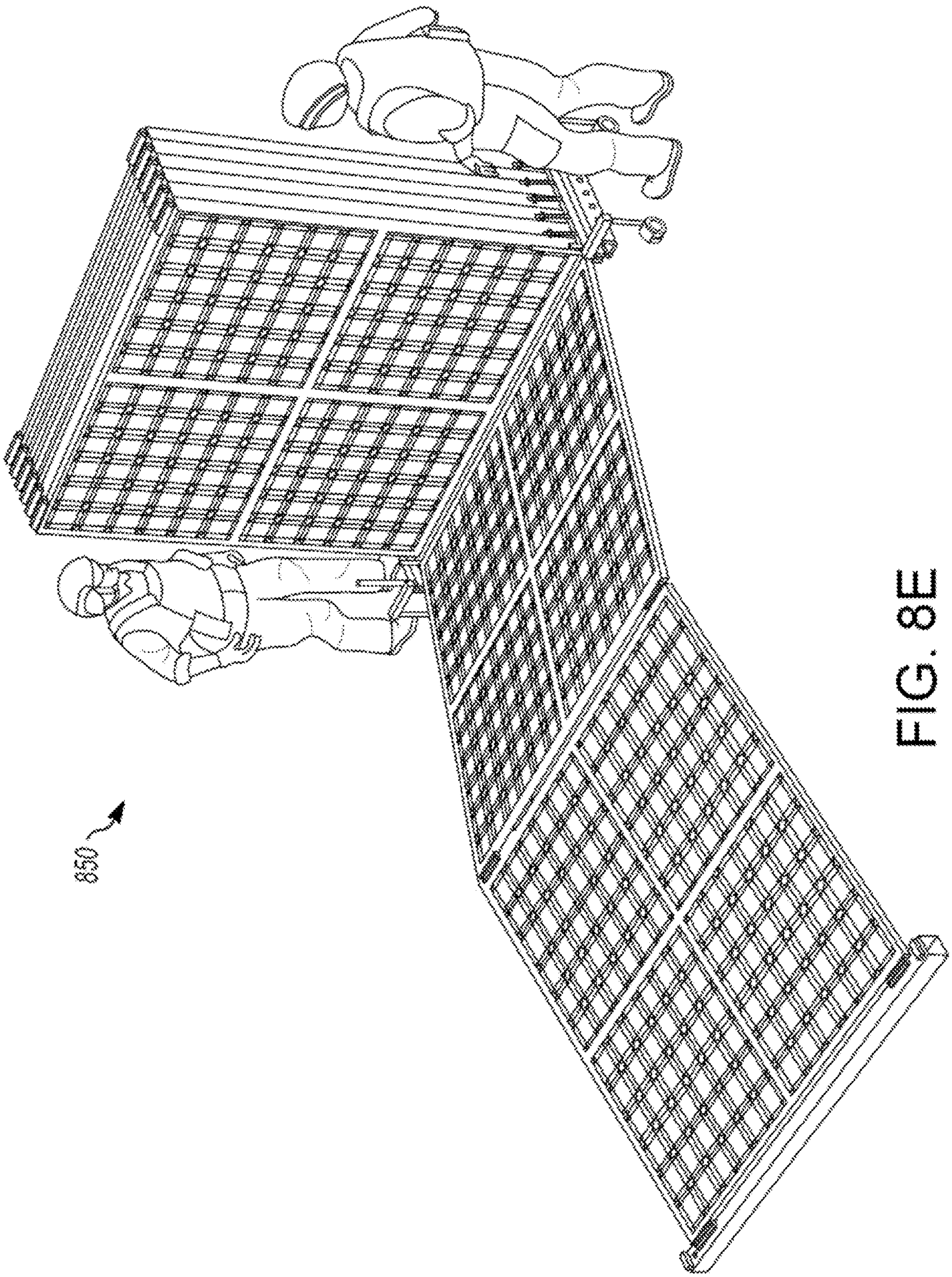

FIG. 7B is a representation 730 of a container 710, with the doors removed, illustrating one set of PV subsystem 726, a deployment system 722, connector 724 to connect the deployment system to the PV subsystem 726, and overall structure 720 for the one set, and two additional sets of PV subsystem 726, a slot 732 to insert the deployment system 722, connector 724 to connect the deployment system 722 to the PV subsystem 726 (when the deployment system 722 is inserted into the respective slot 732), and overall structure 720 for the respective set. In practice, a first set of PV subsystem 726 (shown on the far right in FIG. 7B) connected to the deployment system 722 may be removed from container 710, and deployed. After deployment of the first set of PV subsystem 726, the deployment system 722 may be reused, such as inserted into slot 732 and then connected to a different set of PV subsystem via connector 724. The process may be continued until all of the sets of PV subsystem 726 are removed from container 710.

Figure 7C:
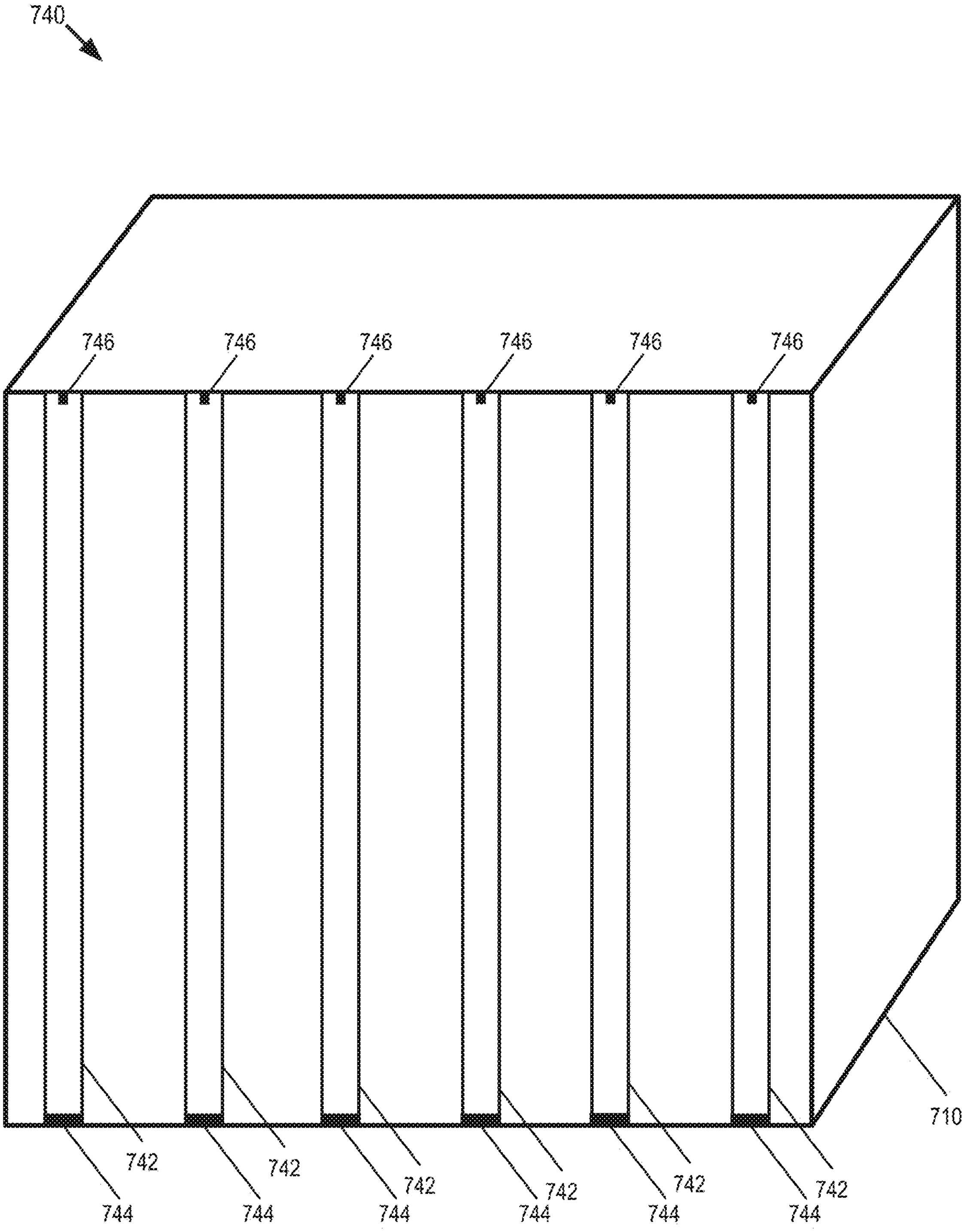
FIG. 7C is a representation of a container, with the doors and the sets of PV subsystems illustrated in FIGS. 7A-B removed, showing rails (stored in the upright position during transport) for use by the deployment system during deployment.
Figure 7D:
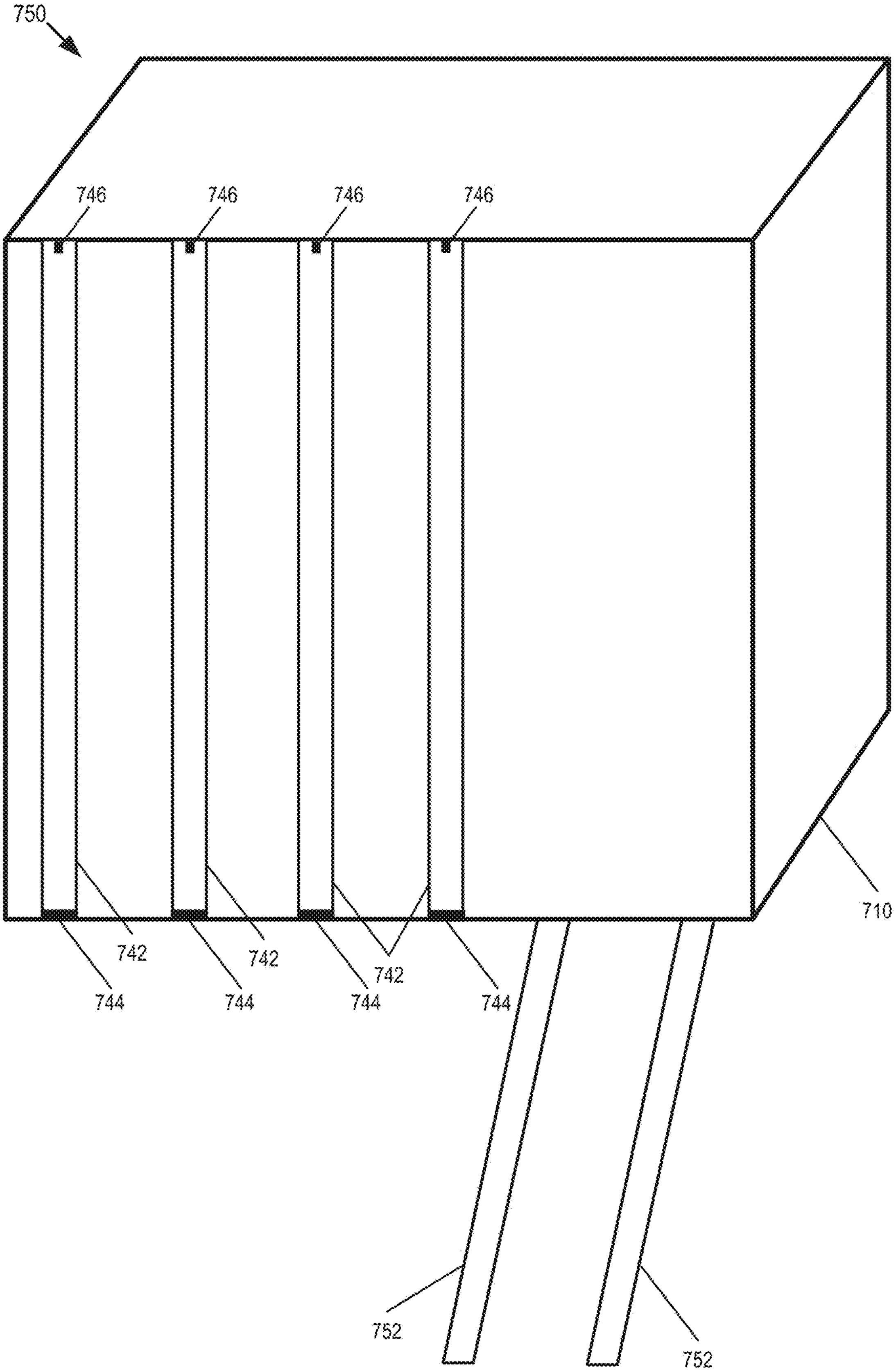
FIG. 7D is a representation similar to FIG. 7C, with the rails in deployed position for use by the deployment system during deployment.

As discussed above, various structures, such as rails 742 (interchangeably termed guides) may be used in combination with deployment system 722 in order to physically move the set of PV subsystem 726 from the container 710. One example is illustrated in FIG. 7C, which is a representation 740 of a container 710, with the doors and the sets of PV subsystem illustrated in FIGS. 7A-B removed, showing rails 742 in the upright position. For example, rails 742 may be hinged using hinges 744 at a lower end of the container 710, as shown in FIGS. 7C-D, and at an opposite end reversibly attached to an upper end of the container 710 via clasps 746. In one or some embodiments, the rails 742 may be stored in the upright position, with the rails 742 connected to the upper end of the container 710 during transport. In this way, the rails 742 may provide for additional rigidity of the contents stored within the container 710.

FIG. 7D is a representation 750, similar to FIG. 7C, with the rails 742 in deployed position (752) for use by the deployment system 722 during deployment. As shown in FIG. 7D, two rails 742 are deployed so that one set of PV subsystem 726 (e.g., the set of PV subsystem 726 on the far right as illustrated in FIGS. 7A-B) may be removed via the deployment system 722.

FIGS. 8A-E are a series of representations 800, 810, 820, 830, 840, 850 illustrating an example deployment of PV subsystem. In one or some embodiments, the system may come pre-assembled and may take less than one day to install without requiring specialized labor. Alternatively, or in addition, each unit may be packed up within one hour (e.g., in less than two hours) to quickly move locations and redeploy. This is illustrated in FIGS. 8A-E in which a forklift 802 (in FIG. 8A) is used to move the container 804 from an airplane (or other transport device), and to move the container 804 proximate to the final site. After which, the container 804 may be opened, with one or more racks of folded PV panels being removed from the container (see FIG. 8B). In one or some embodiments, the rack(s) of folded PV panels may be supported by a structure 822, such as on wheels. In this regard, after detaching the structure 822 from the container, the structure 822 may be rolled via the wheels to the final site (see FIG. 8C), at least partly raised (see transition from FIG. 8C to FIG. 8D) and then bolted to the ground via one or more bolts 842 (see FIG. 8D), and with the structure 822 then being rolled to deploy the PV panels (see representation 850 in FIG. 8E).

Figure 9A:
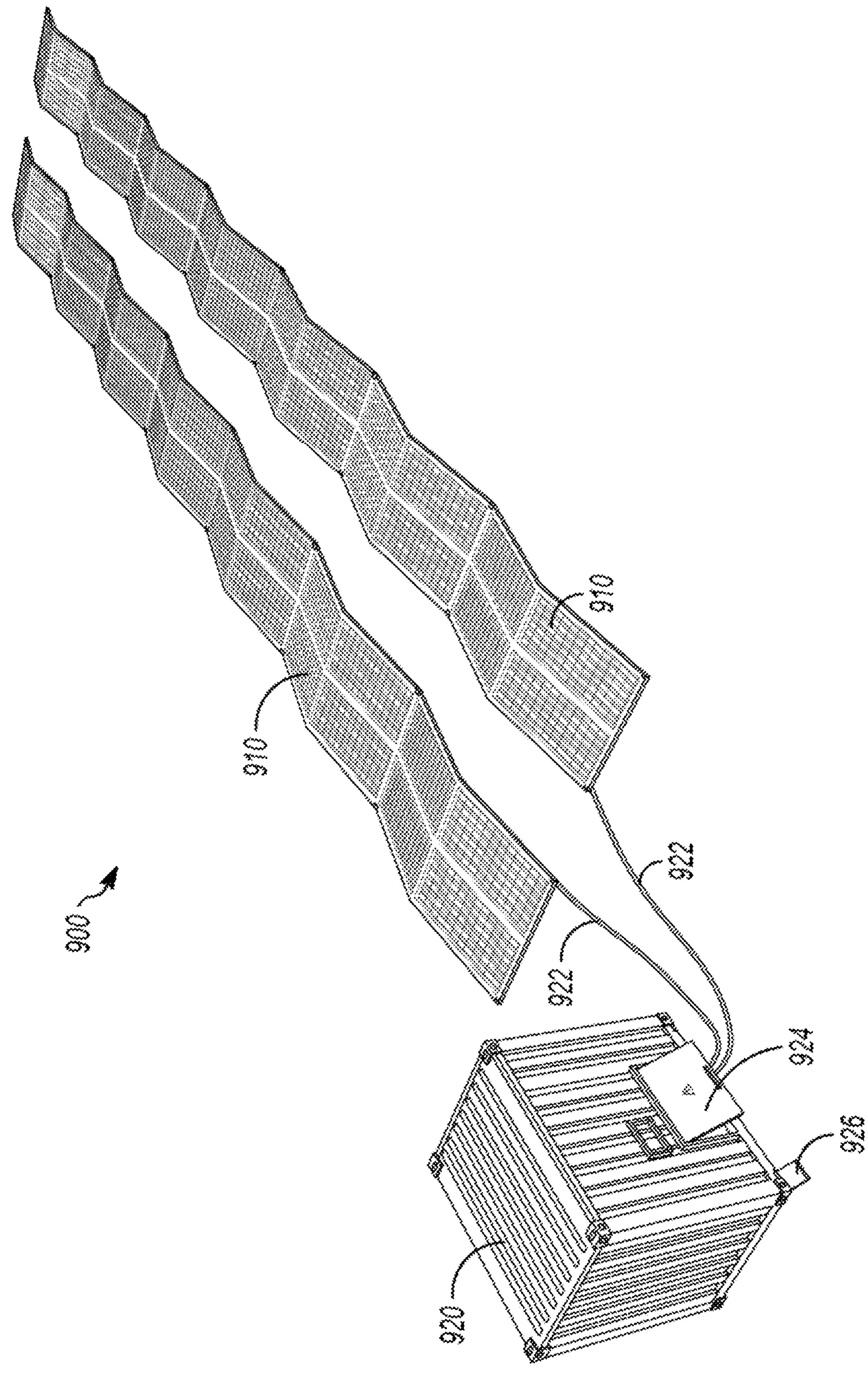
FIG. 9A-B are examples of fully deployed PV subsystems depicting a modular system, which may be used in a variety of contexts, such as in a microgrid or for spot generation.
Figure 9B:
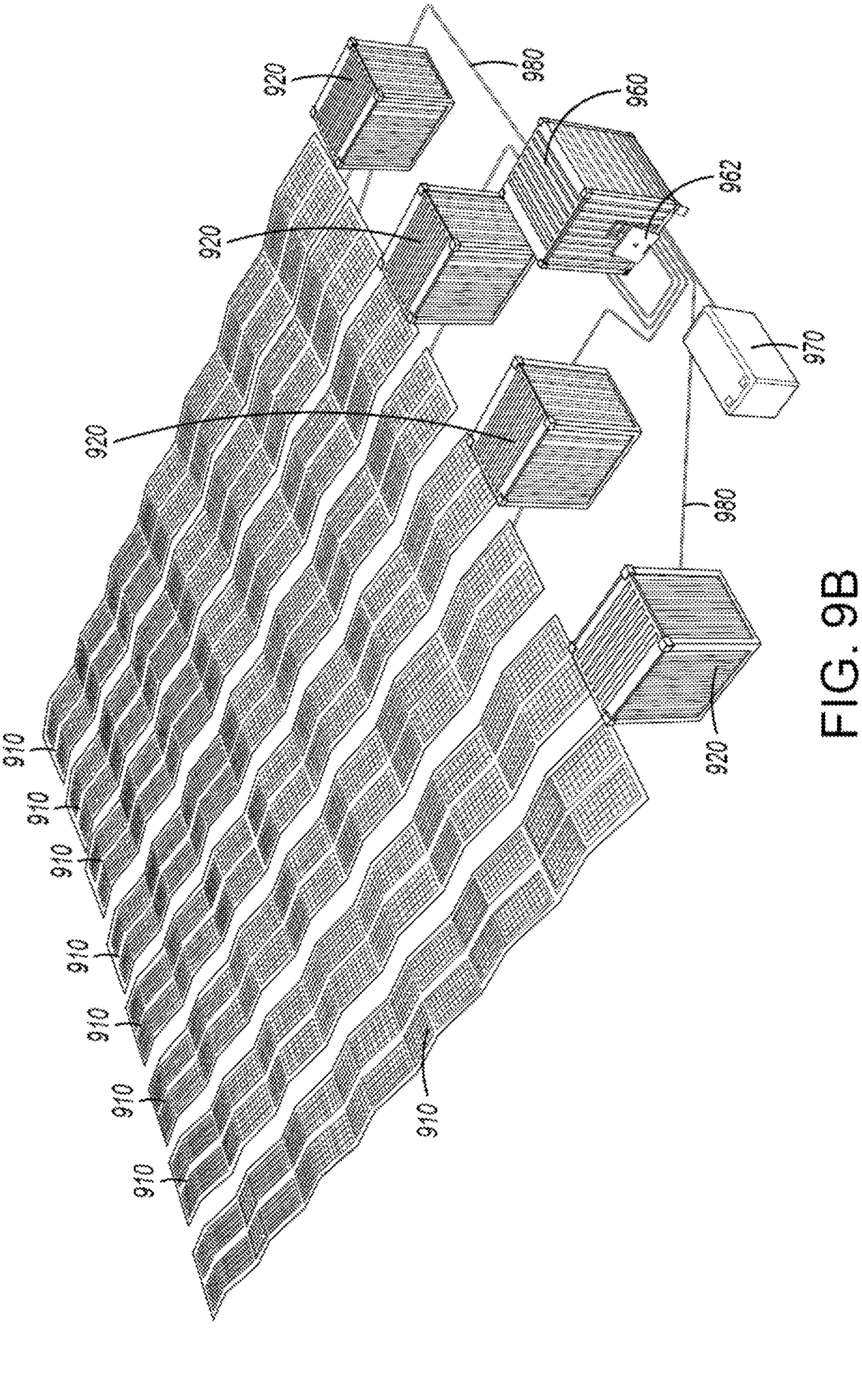

Fully deployed PV subsystems are illustrated in representations 900, 950 in FIG. 9A-B (with two rows of PV panels 910 illustrated in FIG. 9A and four rows of PV panels 910 illustrated in FIG. 9B for spot generation power distribution or to reduce the connection points to the grid). In one or some embodiments, wiring 922 from separate sets of PV panels 910 may be connected to a device, such as a PCS (not shown in FIG. 9A), that is positioned internally to the PV container 920. For example, the PV container 920 may include a door 924 that may be opened, through which the wiring 922 may be connected to the PCS. In particular, as shown in FIG. 9A, there are two wires that are connected to PV container 920, one wire bundle or cable from each set of PV panels 910. In one or some embodiments, the wire bundle may comprise 5 wires (e.g., two positives, two negatives and one ground) per frame, or may be more or less than 5 wires depending on how many PV strings are present.

As discussed above, the output from the PV panels may be DC power. As such, the PCS (such as PCS 660) may be integrated with the PV container 920, such as one or both of mechanically integrated and/or electrically integrated with PV container 920. With regard to electrical integration, the DC power inputs to the PCS (which are supplied by wiring 922) may be located on an exterior of the PV container 920 or may be accessible from the exterior of the PV container 920 (such as behind door 924), as illustrated in FIG. 9A. Further, the output(s) of the PCS, such as the AC power output, may likewise be located on an exterior of the PV container 920 or may be accessible from the exterior of the PV container 920 (such as behind door 924). In this way, the configuration of the wiring may be more easily performed due to the integration of the PCS within PV container 920 and due to the easy accessibility from the exterior of the PV container 920 to plug wiring into one or more electrical connectors. Further, PV container 920 may include an exposed ground pad, which may be connected to Earth ground via an earthing stake or ground rod 926.

FIG. 9B illustrates a representation 950 of eight rows of PV panels 910, illustrating the modularity of the system for use in powering a microgrid, with each of the panels connected to a respective PCS (not shown). Further, each PV container 920 is associated with two rows of PV panels 910, with each PV container 920 including 2 PCS 660, such as illustrated in FIG. 6C. The PCS 660 convert the DC power generated by the PV panels 910 into AC power, and transmit the AC power via wiring 980 to central container 960, which may include batteries and AC bus (e.g., AC busbar/rail system), an example of which is illustrated in FIG. 6E. Alternatively, the batteries may reside in container 970.

Thus, similar to the PV container 920, central container 960 may receive as input one or more cables (shown as element 980) emanating from the PV containers 920 (four of which are illustrated in FIG. 9B) that are configured to transmit AC power into central container 960. The central container 960 may further include one or more output wires that are configured to transmit AC power to one or more loads. Similar to PV container 920, central container 960 may be electrically integrated with wiring. For example, the wiring for inputting AC power (see element 980) may be connected to one or more electrical connectors (such as four electrical connectors for the four wires emanating from the four respective PV containers 920 illustrated in FIG. 9B). Similarly, the connector for outputting the AC power to the load(s) may be located on an exterior of the central container 960 or may be accessible from the exterior of the central container 960 (such as behind door 962). In this way, the configuration of the wiring may be more easily performed due to the integration of the electronics within central container 960 and due to the easy accessibility from the exterior of the central container 960 to plug wiring into one or more electrical connectors.

In one or some embodiments, a generator may be connected to the BESS subsystem along with a plurality of PV containers (such as the 4 PV containers 920 illustrated in FIG. 9B) for a total of 5 input connections, each operating on AC voltage, 5 wire.

The specially configured containers described herein may assist in the quick-deployment (and quick packing) of various parts of the system, including any one, any combination, or all of PV panels, a battery bank inside the BESS container, and Power Conversion Systems (PCS). The various parts of the system may be packaged into robust standard ISO/DOT/MILSPEC enclosures, which may allow the various parts to be highly transportable via land, sea, or air. In one or some embodiments, the deployment of the system may require little to no civil preparation and maintains a high power density (kW/m$^2$) for the deployed solar unit and may be high energy density (kWh/m$^2$) for the energy storage system. Further, the system may withstand harsh environments, including chemical and marine environments as well as wide operation and storage temperature ranges.

The large power and energy system size maintains a small footprint, while being lightweight (high power and energy per kilogram) and modular, providing power from 50 kW up to several MW. This system can accommodate a distributed microgrid power distribution through the integration with multiples of these units and/or with generators to provide an efficient electrical network of sources and loads, further increasing reliability. However, should the loads require a spot generation-type power distribution, a water-tight pass-through power port is available on the BESS container to allow the solar and generator outputs to enter the container.

A similar port is available in the PV container to connect the solar panels to the power conversion system located within the PV subsystem. An example of one implementation of physical integration of the PV onto the BESS container per this invention is illustrated in FIGS. 9A-B.

Figure 10A:
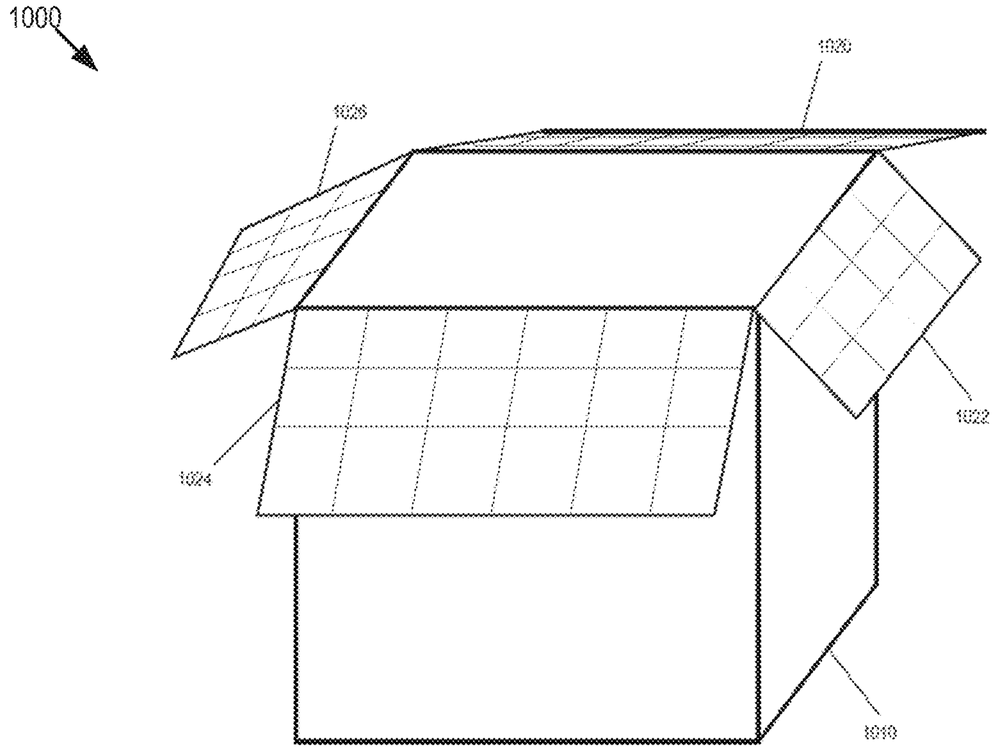
FIG. 10A is a representation of a container, with a plurality of PVs deployed in a single tier that use the container as supporting structure for the deployment.
Figure 10B:
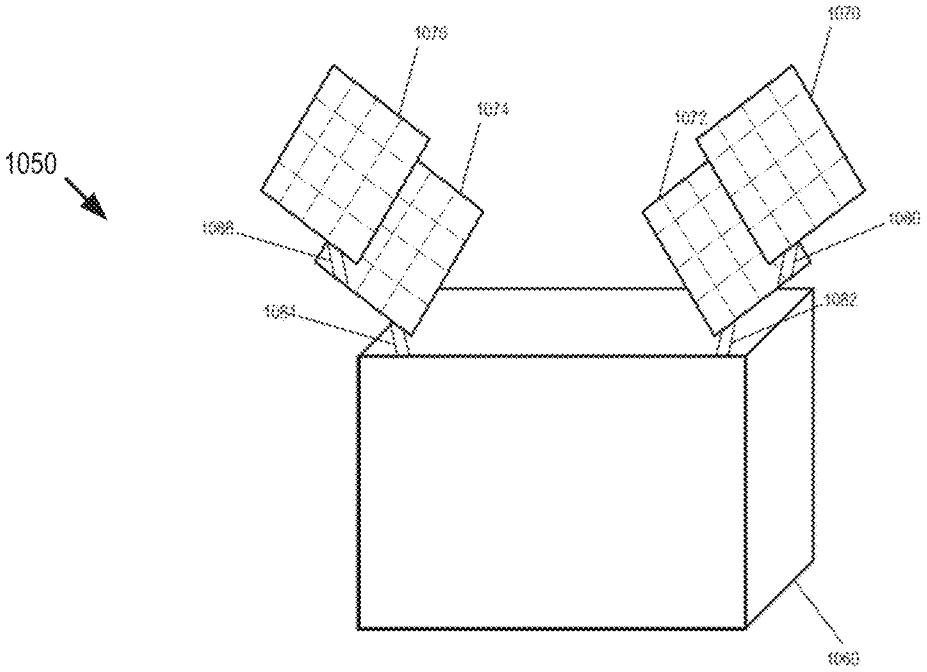
FIG. 10B is a representation of a container, with a plurality of PVs deployed in a multiple tiers that use the container as supporting structure for the deployment.

As discussed above, the PV panels may be removed from the PV container prior to deployment. Various types of PV panels may be removed/deployed. As one example, a tri-fold PV panel may be used. Alternatively, the PV panels may be deployed without removal from the PV container. In such a situation, the PV container itself may provide one or both of: (i) structural support (e.g., the PV container itself functions as the deployment frame for the PV panels); or (ii) electrical connections. For example, FIG. 10A illustrates a representation 1000 of a container 1010, with a plurality of PV subsystems 1020, 1022, 1024, 1026 deployed in a single tier that use the container as supporting structure for the deployment. In one or some embodiments, the top of the container may be removed, with one or more PV subsystems 1020, 1022, 1024, 1026 being folded outward for deployment. As shown, the container 1010 may provide the structural support. Further, wiring integrated with container 1010 may be used to: connect to individual ones of the PV subsystems 1020, 1022, 1024, 1026; and/or serially connect together each of the PV subsystems 1020, 1022, 1024, 1026. As shown, FIGS. 10A-B illustrate gridded PVs FIG. 10B is a representation 1050 of a container, with a plurality of PV subsystems 1070, 1072, 1074, 1076 deployed in a multiple tiers that use the container 1060 as supporting structure for the deployment. As shown, supports 1080, 1082, 1084, 1086 move PV subsystems 1070, 1072, 1074, 1076 from a collapsed position to a deployed position (as shown in FIG. 10B). Supports 1080, 1082, 1084, 1086 may comprise hinges that connect the PV subsystems 1070, 1072, 1074, 1076 to themselves (see support 1080, 1086) or connect the PV subsystems 1070, 1072, 1074, 1076 to the container 1060 (see support 1082, 1084).

In all practical applications, the present technological advancement must be used in conjunction with a computer, programmed in accordance with the disclosures herein. Merely by way of example, various devices disclosed in the present application may comprise a computer or may work in combination with a computer (e.g., executed by a computer), such as, for example, in PCS 104, controls 136 (or control electronics generally), etc. Further, computing functionality may be resident within any of the electronic devices discussed herein. Merely by way of example, FIG. 11 is a diagram of an exemplary computer system 1120 that may be utilized to implement methods, including the flow diagrams, described herein. A central processing unit (CPU) 1122 is coupled to system bus 1123. The CPU 1122 may be any general-purpose CPU, although other types of architectures of CPU 1122 (or other components of exemplary computer system 1120) may be used as long as CPU 1122 (and other components of computer system 1120) supports the operations as described herein. Those of ordinary skill in the art will appreciate that, while only a single CPU 1122 is shown in FIG. 11, additional CPUs may be present. Moreover, the computer system 1120 may comprise a networked, multi-processor computer system that may include a hybrid parallel CPU/GPU system. The CPU 1122 may execute the various logical instructions according to various teachings disclosed herein. For example, the CPU 1122 may execute machine-level instructions for performing processing according to the operational flow described herein.

The computer system 1120 may also include computer components such as non-transitory, computer-readable media. Examples of computer-readable media include computer-readable non-transitory storage media, such as a random-access memory (RAM) 1126, which may be SRAM, DRAM, SDRAM, or the like. The computer system 1120 may also include additional non-transitory, computer-readable storage media such as a read-only memory (ROM) 1128, which may be PROM, EPROM, EEPROM, or the like. RAM 1126 and ROM 1128 hold user and system data and programs, as is known in the art. In this regard, computer-readable media may comprise executable instructions to perform any one, any combination, or all of the computer or electronic functionality described herein. The computer system 1120 may also include an input/output (I/O) adapter 1102, a graphics processing unit (GPU) 1114, a communications adapter 1127, a user interface adapter 1124, a display driver 1116, and a display adapter 1118.

The I/O adapter 1102 may connect additional non-transitory, computer-readable media such as storage device(s) 1112, including, for example, a hard drive, a compact disc (CD) drive, a floppy disk drive, a tape drive, and the like to computer system 1120. The storage device(s) may be used when RAM 1126 is insufficient for the memory requirements associated with storing data for operations of the present techniques. The data storage of the computer system 1120 may be used for storing information and/or other data used or generated as disclosed herein. For example, storage device(s) 1112 may be used to store configuration information or additional plug-ins in accordance with the present techniques. Further, user interface adapter 1124 couples user input devices, such as a keyboard 1125, a pointing device 1121 and/or output devices to the computer system 1120. The display adapter 1118 is driven by the CPU 1122 to control the display on a display device 1104 to, for example, present information to the user such as images generated according to methods described herein.

The architecture of computer system 1120 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1120 may include various plug-ins and library files. Input data may additionally include configuration information.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting models discussed herein may be downloaded or saved to computer storage.

The following example embodiments of the invention are also disclosed:

Embodiment 1

A mobile power generation system comprising:

one or more shipping containers configured for one or more of housing, transportation, or deployment of a renewable hybrid energy system;

one or both of: at least one photovoltaic (PV) subsystem for shipping within the one or more shipping containers and deployment at a deployment site; or at least one battery subsystem for shipping within the one or more shipping containers and storage at the deployment site within the one or more shipping containers;

mechanical structure for shipping of the one or both of the at least one PV subsystem or the at least one battery subsystem within the one or more shipping containers;

at least one power conversion system (PCS) for shipping within the one or more shipping containers and storage at the deployment site within the one or more shipping containers;

mechanical structure for shipping of the at least one PCS within the one or more shipping containers; and at least one load output connector integrated in or positioned on at least one side of the one or more shipping containers, the at least one load output connector being electrically wired to the at least one PCS prior to shipment of the one or more shipping containers to the deployment site and configured to transmit AC power to a load electrically connected to the at least one output connector.

Embodiment 2

The mobile power generation system of embodiment 1: wherein the one or more shipping containers includes at least one chassis, the at least one chassis including a metal portion for electrical connection to earth ground at the deployment site; and wherein the at least one PCS is electrically wired to the at least one chassis prior to shipment of the one or more shipping containers to the deployment site.

Embodiment 3

The mobile power generation system of embodiments 1 or 2: wherein the at least one battery subsystem is electrically wired to the at least one PCS; and wherein the at least one battery subsystem is electrically wired to the at least one chassis prior to shipment of the one or more shipping containers to the deployment site.

Embodiment 4

The mobile power generation system of any of embodiments 1-3: further comprising a DC bus wired within the one or more shipping containers; and wherein both the at least one battery subsystem and the at least one PCS are electrically wired to DC bus prior to shipment of the one or more shipping containers to the deployment site.

Embodiment 5

The mobile power generation system of any of embodiments 1-4: wherein both the at least one PV subsystem and the at least one battery subsystem are housed within a respective shipping container for shipping; and further comprising at least one DC input connector integrated in or positioned on the at least one side of the one or more shipping containers, the at least one DC input connector electrically wired to the DC bus prior to shipment of the one or more shipping containers to the deployment site and configured to transmit DC power, generated by the at least one PV subsystem deployed at the deployment site and electrically cabled to the at least one DC input connector, to the at least one PCS via the DC bus.

Embodiment 6

The mobile power generation system of any of embodiments 1-5: further comprising an AC bus electrically wired within the one or more shipping containers;

wherein both the at least one PCS and the at least one load output connector are electrically wired to the AC bus prior to shipment of the one or more shipping containers to the deployment site; and wherein the AC bus is electrically wired to the at least one chassis.

Embodiment 7

The mobile power generation system of any of embodiments 1-6: further comprising at least one input connector electrically integrated in or positioned on the at least one side of the one or more shipping containers; and wherein the at least one input connector electrically wired to the AC bus prior to shipment of the one or more shipping containers to the deployment site and configured to receive AC power generated by a generator.

Embodiment 8

The mobile power generation system of any of embodiments 1-7: further comprising control electronics for shipping within the one or more shipping containers and storage at the deployment site within the one or more shipping containers;

wherein the control electronics is configured for communication with one or both of the at least one PCS or the at least one battery subsystem prior to shipment of the one or more shipping containers to the deployment site; and wherein the control electronics is configured to control the one or both of the at least one PCS or the at least one battery subsystem during operation at the deployment site.

Embodiment 9

The mobile power generation system of any of embodiments 1-8: further comprising a user interface integrated in or positioned on at least one side of the one or more shipping containers;

wherein the user interface is configured for communication with the control electronics prior to shipment of the one or more shipping containers to the deployment site; and wherein the user interface is configured to perform one or both of: output status of the one or both of the at least one PCS or the at least one battery subsystem during operation at the deployment site; or input one or more commands in order to control at least one aspect of the mobile power generation system.

Embodiment 10

The mobile power generation system of any of embodiments 1-9: further comprising one or more sensors positioned within the one or more shipping containers;

wherein the one or more sensors are configured for the communication with the control electronics prior to shipment of the one or more shipping containers to the deployment site; and wherein, after deployment at the deployment site, the control electronics is configured to control at least a part of the mobile power generation system based on sensor readings generated by the one or more sensors and transmitted via the previously configured communication between the one or more sensors and the control electronics.

Embodiment 11

The mobile power generation system of any of embodiments 1-10: further comprising at least one fan;

wherein the at least one fan is configured for communication with the control electronics prior to shipment of the one or more shipping containers to the deployment site;

wherein the one or more sensors comprises a temperature sensor; and wherein, after deployment at the deployment site, the control electronics is configured to control the fan based on temperature sensor readings generated by the temperature sensor and transmitted via the previously configured communication between the temperature sensor and the control electronics.

Embodiment 12

The mobile power generation system of any of embodiments 1-11: further comprising a user interface integrated in or positioned on at least one side of the one or more shipping containers;

wherein the user interface is configured for communication with the control electronics prior to shipment of the one or more shipping containers to the deployment site;

wherein the user interface is configured to perform one or both of: output status of the one or both of the at least one PCS or the at least one battery subsystem during operation at the deployment site; or input one or more commands in order to control at least one aspect of the mobile power generation system; and wherein a single side of the one or more shipping containers includes a plurality of inlet and outlet vents and the user interface.

Embodiment 13

The mobile power generation system of any of embodiments 1-12: further comprising an uninterruptible power supply (UPS) for shipping within the one or more shipping containers and storage at the deployment site within the one or more shipping containers; and wherein the UPS is electrically wired to the control electronics prior to shipment of the one or more shipping containers to the deployment site.

Embodiment 14

The mobile power generation system of any of embodiments 1-13: wherein the UPS, via electrical wiring, is configured to supply power to the control electronics in order for the control electronics to route power from the at least one battery subsystem to the UPS.

Embodiment 15

The mobile power generation system of any of embodiments 1-14: further comprising one or more power meters positioned in or on the one or more shipping containers;

wherein the one or more power meters are electrically wired prior to shipment of the one or more shipping containers to the deployment site so that power input or power output sensed by the one or more power meters at the deployment site is used to control operation of or by the at least one PCS; and wherein, after deployment at the deployment site, the at least one PCS is configured to control power in at least a part of the mobile power generation system based on one or both of:

the one or more power meters sensing the power input from a generator or other source of power; or the one or more power meters sensing the power output to at least one load.

Embodiment 16

The mobile power generation system of any of embodiments 1-15: wherein the one or more shipping containers includes a first container and a second container;

wherein the first container includes the at least one battery subsystem and the at least one PCS with the at least one battery subsystem is electrically wired to the at least one PCS;

wherein the second container includes the at least one PV subsystem; and wherein the first container further includes at least one DC input connector integrated in or positioned on the at least one side of the first container, the at least one DC input connector electrically wired to the at least one PCS prior to shipment of the one or more shipping containers to the deployment site and configured to transmit DC power, generated by the at least one PV subsystem deployed at the deployment site and electrically cabled to the at least one DC input connector, to the at least one PCS.

Embodiment 17

The mobile power generation system of any of embodiments 1-16: wherein the second container includes at least one deployment system configured to remove the at least one PV subsystem from the second container and to deploy the at least one PV subsystem at the deployment site.

Embodiment 18

A method of performing one or more of housing, transportation, or deployment of a renewable hybrid energy system, the method comprising:

transporting one or more shipping containers to a deployment site, the one or more shipping containers comprising:

one or both of: at least one photovoltaic (PV) subsystem for shipping within the one or more shipping containers and deployment at the deployment site; or at least one battery subsystem for shipping within the one or more shipping containers and storage at the deployment site within the one or more shipping containers;

mechanical structure for shipping of the one or both of the at least one PV subsystem or the at least one battery subsystem within the one or more shipping containers;

at least one power conversion system (PCS) for shipping within the one or more shipping containers and storage at the deployment site within the one or more shipping containers;

mechanical structure for shipping of the at least one PCS within the one or more shipping containers; and at least one load output connector integrated in or positioned on at least one side of the one or more shipping containers, the at least one load output connector being electrically wired to the at least one PCS prior to shipment of the one or more shipping containers to the deployment site and configured to transmit AC power to a load electrically connected to the at least one output connector;

removing the at least one PV subsystem from the one or more shipping containers;

deploying the at least one PV subsystem;

electrically connecting the at least one PV subsystem to the at least one PCS; and electrically connecting a load to the at least one load output connector for the at least one PCS to route AC power to the load.

Embodiment 19

The method of embodiment 18: wherein the one or more shipping containers includes at least one DC input connector integrated in or positioned on the at least one side of the one or more shipping containers, the at least one DC input connector electrically wired to the at least one PCS; and further comprising connecting a cable from the deployed at least one PV subsystem to the at least one DC input connector in order for the at least one PCS to receive power generated by the at least one PV subsystem.

Embodiment 20

The method of embodiments 18 or 19: wherein the one or more shipping containers includes a first container and a second container;

wherein the first container includes the at least one battery subsystem and the at least one PCS with the at least one battery subsystem is electrically wired to the at least one PCS;

wherein the second container includes the at least one PV subsystem;

wherein the at least one PV subsystem is removed from the second container and deployed at the deployment site;

wherein the first container further includes the at least one DC input connector integrated in or positioned on the at least one side of the one or more shipping containers;

wherein the cable is connected from the deployed at least one PV subsystem to the at least one DC input connector on the first container.

Embodiment 21

The method of any of embodiments 18-20: wherein the second container includes at least one deployment system configured to remove the at least one PV subsystem from the second container and to deploy the at least one PV subsystem at the deployment site; and wherein the deployment system from the second container is used to remove and deploy the at least one PV subsystem at the deployment site.

Embodiment 22

The method of any of embodiments 18-21: wherein connecting the cable from the deployed at least one PV subsystem to the at least one DC input connector results in the at least one PCS receiving the power generated by the at least one PV subsystem without additional connection of cabling needed since the at least one DC input connector was previously electrically connected to the at least one PCS prior to shipping.

Embodiment 23

The method of any of embodiments 18-22: wherein the at least one battery subsystem, upon being powered at the deployment site, immediately supplies power to the at least one PCS due to the at least one battery subsystem being previously electrically wired to the at least one PCS prior to shipping of the one or more shipping containers.

Embodiment 24:

The method of any of embodiments 18-23: wherein the one or more shipping containers are shipped with an uninterruptible power supply (UPS) resident therein;

wherein, prior to shipment of the one or more shipping containers, the UPS is electrically wired to one or more electronic devices within the one or more shipping containers; and wherein, after arrival of the one or more shipping containers at the deployment site, the UPS supplies power to the at least one battery subsystem without any further electrical connections being performed.

Embodiment 25

The method of any of embodiments 18-24: wherein the UPS supplies power to control electronics resident within the one or more shipping containers; and wherein, prior to shipment of the one or more shipping containers, the control electronics is electrically wired to the at least one battery subsystem; and wherein, after arrival of the one or more shipping containers at the deployment site, the UPS supplies power via the control electronics to the at least one battery subsystem without any further electrical connections being performed.

Embodiment 26

The method of any of embodiments 18-25: wherein the one or more shipping containers includes a user interface on the at least one side;

wherein, prior to shipment of the one or more shipping containers, the control electronics is electrically wired to the at least one PCS;

wherein, prior to shipment of the one or more shipping containers, the user interface is electrically wired to the control electronics; and wherein, after arrival of the one or more shipping containers at the deployment site, a user receives status of one or both of the at least one battery subsystem or the at least one PCS via the user interface without any further electrical connections being performed.

What is claimed is:

1. A mobile power generation system comprising:

a first container:

configured for one or more of housing, transportation, or deployment of at least one photovoltaic (PV) system;

the at least one PV system within the first container; and a first mechanical structure for shipping of the at least one PV subsystem; and a second container:

configured for one or more of housing, transportation, or deployment of at least one battery subsystem;

the at least one battery subsystem within the second container; and a second mechanical structure for shipping of the at least one battery subsystem;

at least one power conversion system (PCS) for shipping within at least one of the first container or the second container, wherein the at least one PCS is electrically wired to at least one chassis in at least one of the first container or the second container prior to shipment of the first container and the second container to a deployment site;

wherein the at least one PCS is configured to be shipped in the first container or the second container;

wherein, when the at least one PCS is configured to be shipped in the first container:

the first container includes at least one chassis that is electrically wired to the at least one PCS prior to shipment of the first container, the at least one chassis having a metal portion and configured to connect to a stake for insertion into earth to establish earth ground at the deployment site for the at least one chassis;

the first container includes a first container first electrical input integrated into the first container as part of at least one control panel for the first container prior to shipment of the first container to the deployment site and configured to electrically connect with the at least one PV subsystem after deployment;

the first container includes a first container second electrical input integrated into the first container as part of the at least one control panel for the first container;

the second container includes a second container electrical output integrated into the second container as part of at least one control panel for the second container prior to shipment to the deployment site, wired to the at least one battery subsystem and configured to connect to the first container second electrical input in order to route power output to or from the at least one battery subsystem;

the first container first electrical input and the first container second electrical input are prewired to the at least one PCS prior to shipment to the deployment site; and at least one load output connector as part of the at least one control panel for the first container, the at least one load output connector being electrically wired to the at least one PCS prior to shipment of the first container to the deployment site and configured to transmit AC power to a load electrically connected to the at least one load output connector of the at least one control panel for the first container;

wherein, when the at least one PCS is configured to be shipped in the second container:

the second container includes at least one chassis that is electrically wired to the at least one PCS and the at least one battery subsystem prior to shipment of the second container to the deployment site, the at least one chassis having a metal portion and configured to connect to a stake for insertion into earth to establish the earth ground at the deployment site for the at least one chassis;

the second container includes a second container electrical input integrated into the second container as part of at least one control panel for the second container prior to shipment of the second container to the deployment site and configured to electrically connect the power generated by the at least one PV subsystem after deployment;

the second container electrical input and the power output to or from the at least one battery subsystem are prewired to the at least one PCS prior to shipment; and at least one load output connector as part of the at least one control panel for the second container, the at least one load output connector being electrically wired to the at least one PCS prior to shipment of the second container to the deployment site and configured to transmit the AC power to the load electrically connected to the at least one load output connector of the at least one control panel for the second container.

2. The mobile power generation system of claim 1, wherein the at least one battery subsystem is electrically wired to the at least one PCS;

further comprising a DC bus wired within at least one of the first container or the second container; and wherein both the at least one battery subsystem and the at least one PCS are electrically wired to DC bus prior to shipment of the first container and the second container to the deployment site.

3. The mobile power generation system of claim 2, further comprising at least one DC input connector integrated in or positioned on at least one side of at least one of the first container or the second container, the at least one DC input connector electrically wired to the DC bus prior to shipment of the at least one of the first container and the second container to the deployment site and configured to transmit DC power, generated by the at least one PV subsystem deployed at the deployment site and electrically cabled to the at least one DC input connector, to the at least one PCS via the DC bus.

4. The mobile power generation system of claim 2, further comprising an AC bus electrically wired within at least one of the first container or the second container;

wherein both the at least one PCS and the at least one load output connector are electrically wired to the AC bus prior to shipment of the first container and the second container to the deployment site;

wherein the AC bus is electrically wired to the at least one chassis of the at least one of the first container or the second container;

further comprising at least one input connector electrically integrated in or positioned on at least one exterior side of at least one of the first container or the second container; and wherein the at least one input connector is electrically wired to the AC bus prior to shipment of the at least one of the first container or the second container to the deployment site and configured to receive AC power generated by a generator.

5. The mobile power generation system of claim 1, further comprising control electronics for shipping within at least one of the first container or the second container and storage at the deployment site within the at least one of the first container or the second container;

wherein the control electronics is configured for communication with one or both of the at least one PCS or the at least one battery subsystem prior to shipment of the at least one of the first container or the second container to the deployment site;

wherein the control electronics is configured to control the one or both of the at least one PCS or the at least one battery subsystem during operation at the deployment site; and at least one display positioned on an exterior of at least one side of the at least one of the first container or the second container, wherein the at least one display is electrically wired to the control electronics prior to shipment of the at least one of the first container or the second container to the deployment site.

6. The mobile power generation system of claim 5, wherein the display is configured for communication with the control electronics prior to shipment of the at least one of the first container or the second container to the deployment site; and wherein the display is configured to perform one or both of: output status of the one or both of the at least one PCS or the at least one battery subsystem during operation at the deployment site; or input one or more commands in order to control at least one aspect of the mobile power generation system.

7. The mobile power generation system of claim 5, further comprising one or more sensors positioned within at least one of the first container or the second container;

wherein the one or more sensors are configured for the communication with the control electronics prior to shipment of the at least one the first container or the second container to the deployment site; and wherein, after deployment at the deployment site, the control electronics is configured to control at least a part of the mobile power generation system based on sensor readings generated by the one or more sensors and transmitted via a previously configured communication between the one or more sensors and the control electronics.

8. The mobile power generation system of claim 7, further comprising at least one fan;

wherein the at least one fan is configured for communication with the control electronics prior to shipment of the at least one of the first container or the second container to the deployment site;

wherein the one or more sensors comprises a temperature sensor; and wherein, after deployment at the deployment site, the control electronics is configured to control the fan based on temperature sensor readings generated by the temperature sensor and transmitted via the previously configured communication between the temperature sensor and the control electronics.

9. The mobile power generation system of claim 8, wherein the display is configured for communication with the control electronics prior to shipment of the one or more containers to the deployment site;

wherein the display is configured to perform one or both of: output status of the one or both of the at least one PCS or the at least one battery subsystem during operation at the deployment site; or input one or more commands in order to control at least one aspect of the mobile power generation system; and wherein a single side of at least one of the first container or the second container includes a plurality of inlet and outlet vents and the display.

10. The mobile power generation system of claim 5, further comprising an uninterruptible power supply (UPS) for shipping within at least one of the first container or the second container and storage at the deployment site within the at least one of the first container or the second container;

wherein the UPS is electrically wired to the control electronics prior to shipment of the at least one of the first container or the second container to the deployment site; and wherein the UPS, via electrical wiring, is configured to supply power to the control electronics in order for the control electronics to route power from the at least one battery subsystem to the UPS.

11. The mobile power generation system of claim 1, further comprising one or more power meters positioned in or on at least one of the first container or the second container;

wherein the one or more power meters are electrically wired prior to shipment of the at least one of the first container or the second container to the deployment site so that power input or power output sensed by the one or more power meters at the deployment site is used to control operation of or by the at least one PCS; and wherein, after deployment at the deployment site, the at least one PCS is configured to control power in at least a part of the mobile power generation system based on one or both of:

the one or more power meters sensing the power input from a generator or other source of power; or the one or more power meters sensing the power output to at least one load.

12. The mobile power generation system of claim 1, wherein the second container includes at least one DC input connector integrated in or positioned on at least one side of the first container, the at least one DC input connector electrically wired to the at least one PCS prior to shipment of the first container and the second container to the deployment site and configured to transmit DC power, generated by the at least one PV subsystem deployed at the deployment site and electrically cabled to the at least one DC input connector, to the at least one PCS.

13. A method of configuring a renewable hybrid energy system after shipment, the method comprising:

receiving, at a deployment site:

a first container:

configured for one or more of housing, transportation, or deployment of at least one photovoltaic (PV) system;

the at least one PV system within the first container; and a first mechanical structure for shipping of the at least one PV subsystem; and a second container:

configured for one or more of housing, transportation, or deployment of at least one battery subsystem;

the at least one battery subsystem within the second container; and a second mechanical structure for shipping of the at least one battery subsystem;

at least one power conversion system (PCS) for shipping within at least one of the first container or the second container, wherein the at least one PCS is electrically wired to at least one chassis in at least one of the first container or the second container prior to shipment of the first container and the second container to the deployment site;

wherein the at least one PCS is configured to be shipped in the first container or the second container;

wherein, when the at least one PCS is configured to be shipped in the first container:

the first container includes at least one chassis that is electrically wired to the at least one PCS prior to shipment of the first container, the at least one chassis having a metal portion and configured to connect to a stake for insertion into earth to establish earth ground at the deployment site for the at least one chassis;

the first container includes a first container first electrical input integrated into the first container as part of at least one control panel for the first container prior to shipment of the first container to the deployment site and configured to electrically connect with the at least one PV subsystem after deployment;

the first container includes a first container second electrical input integrated into the first container as part of the at least one control panel for the first container;

the second container includes a second container electrical output integrated into the second container as part of at least one control panel for the second container prior to shipment to the deployment site, wired to the at least one battery subsystem and configured to connect to the first container second electrical input in order to route power output to or from the at least one battery subsystem;

the first container first electrical input and the first container second electrical input are prewired to the at least one PCS prior to shipment to the deployment site; and at least one load output connector as part of the at least one control panel for the first container, the at least one load output connector being electrically wired to the at least one PCS prior to shipment of the first container to the deployment site and configured to transmit AC power to a load electrically connected to the at least one load output connector of the at least one control panel for the first container;

wherein, when the at least one PCS is configured to be shipped in the second container:

the second container includes at least one chassis that is electrically wired to the at least one PCS and the at least one battery subsystem prior to shipment of the second container to the deployment site, the at least one chassis having a metal portion and configured to connect to a stake for insertion into earth to establish the earth ground at the deployment site for the at least one chassis;

the second container includes a second container electrical input integrated into the second container as part of at least one control panel for the second container prior to shipment of the second container to the deployment site and configured to electrically connect the power generated by the at least one PV subsystem after deployment;

the second container electrical input and the power output to or from the at least one battery subsystem are prewired to the at least one PCS prior to shipment; and at least one load output connector as part of the at least one control panel for the second container, the at least one load output connector being electrically wired to the at least one PCS prior to shipment of the second container to the deployment site and configured to transmit the AC power to the load electrically connected to the at least one load output connector of the at least one control panel for the second container wherein, when the at least one PCS is configured to be shipped in the first container, at the deployment site:

inserting the stake into the earth to establish the earth ground for the at least one chassis of the first container;

electrically connecting a first container first electrical input with the at least one PV subsystem after deployment; and electrically connecting the at least one load output connector of the at least one control panel for the first container to the load; and wherein, when the at least one PCS is configured to be shipped in the second container, at the deployment site:

inserting the stake into the earth to establish the earth ground for the at least one chassis of the second container;

electrically connecting the second container electrical input to the power generated by the at least one PV subsystem after deployment;

electrically connecting the at least one load output connector of the at least one control panel for the second container to the load.

14. The method of claim 13, wherein the first container includes at least one DC input connector integrated in or positioned on at least one side of the first container, the at least one DC input connector electrically wired to the at least one PCS; and further comprising connecting a cable from the deployed at least one PV subsystem to the at least one DC input connector in order for the at least one PCS to receive power generated by the at least one PV subsystem.

15. The method of claim 14, wherein the second container further includes the at least one DC input connector integrated in or positioned on the at least one side of the second container;

wherein the cable is connected from the deployed at least one PV subsystem to the at least one DC input connector on the first second container.

16. The method of claim 15, wherein the first container includes at least one deployment system configured to remove the at least one PV subsystem from the first container and to deploy the at least one PV subsystem at the deployment site; and wherein the deployment system from the first container is used to remove and deploy the at least one PV subsystem at the deployment site.

17. The method of claim 14, wherein connecting the cable from the deployed at least one PV subsystem to the at least one DC input connector results in the at least one PCS receiving the power generated by the at least one PV subsystem without additional connection of cabling needed since the at least one DC input connector was previously electrically connected to the at least one PCS prior to shipping.

18. The method of claim 17, wherein the at least one battery subsystem, upon being powered at the deployment site, immediately supplies power to the at least one PCS due to the at least one battery subsystem being previously electrically wired to the at least one PCS prior to shipping of the first container and the second container.

19. The method of claim 18, wherein at least one of the first container or the second container is shipped with an uninterruptible power supply (UPS) resident therein;

wherein, prior to shipment of the first container and the second container, the UPS is electrically wired to one or more electronic devices within the at least one of the first container or the second container; and wherein, after arrival of the first container and the second container at the deployment site, the UPS supplies power to the at least one battery subsystem without any further electrical connections being performed.

20. The method of claim 19, wherein the UPS supplies power to control electronics resident within the at least one of the first container or the second container; and wherein, prior to shipment of the first container and the second container, the control electronics is electrically wired to the at least one battery subsystem; and wherein, after arrival of the first container and the second container at the deployment site, the UPS supplies power via the control electronics to the at least one battery subsystem without any further electrical connections being performed.

21. The method of claim 20, wherein at least one of the first container or the second container includes a display on at least one side;

wherein, prior to shipment of the first container and the second container, the control electronics is electrically wired to the at least one PCS;

wherein, prior to shipment of the first container and the second container, the display is electrically wired to the control electronics; and wherein, after arrival of the first container and the second container at the deployment site, a user receives status of one or both of the at least one battery subsystem or the at least one PCS via the display without any further electrical connections being performed.

22. The mobile power generation system of claim 1, wherein the at least one PCS is configured to be shipped in the second container so that:

the second container includes the at least one chassis that is electrically wired to the at least one PCS and the at least one battery subsystem prior to shipment of the second container to the deployment site;

the second container includes the second container electrical input integrated into the second container as part of the at least one control panel for the second container prior to shipment of the second container to the deployment site and configured to electrically connect the power generated by the at least one PV subsystem after deployment;

the second container electrical input and the power output to or from the at least one battery subsystem are prewired to the at least one PCS prior to shipment; and the at least one load output connector of the at least one control panel for the second container is electrically wired to the at least one PCS prior to shipment of the second container to the deployment site and configured to transmit the AC power to the load electrically connected to the at least one load output connector of the at least one control panel for the second container.

23. The mobile power generation system of claim 22, wherein the first container includes the first container first electrical input integrated into the first container as part of the at least one control panel for the first container and configured to electrically connect with the at least one PV subsystem after deployment;

the first container further includes a first container electrical output configured to output at least a part of the power generated by the at least one PV subsystem after deployment; and the second container includes the second container electrical input, integrated into the second container as part of the at least one control panel for the second container, configured to electrically connect to the first container electrical output on the first container in order to route the at least a part of the power generated by the at least one PV subsystem after deployment.

24. The mobile power generation system of claim 1, wherein the at least one PCS is configured to be shipped in the first container so that:

the first container includes the at least one chassis that is electrically wired to the at least one PCS prior to shipment of the first container;

the first container includes the first container first electrical input integrated into the first container as part of the at least one control panel for the first container prior to shipment of the first container to the deployment site and configured to electrically connect with the at least one PV subsystem after deployment;

the first container includes the first container second electrical input integrated into the first container as part of the at least one control panel for the first container;

the second container includes the second container electrical output integrated into the second container as part of the at least one control panel for the second container prior to shipment to the deployment site, wired to the at least one battery subsystem and configured to connect to the first container second electrical input in order to route power output to or from the at least one battery subsystem;

the first container first electrical input and the first container second electrical input are prewired to the at least one PCS prior to shipment to the deployment site; and the at least one load output connector of the at least one control panel for the first container is electrically wired to the at least one PCS prior to shipment of the first container to the deployment site and configured to transmit AC power to the load electrically connected to the at least one load output connector of the at least one control panel for the first container.

* * * * *